(12) United States Patent
Koning et al.

(10) Patent No.: US 11,634,592 B2
(45) Date of Patent: Apr. 25, 2023

(54) POLYMERS, PROCESSES, COMPOSITIONS AND USES

(71) Applicant: COVESTRO (NETHERLANDS) B.V., Geleen (NL)

(72) Inventors: Cornelis Eme Koning, Echt (NL); Theo Veldhuis, Echt (NL); Leendert Jan Molhoek, Echt (NL); Paulus Franciscus Anna Buijsen, Echt (NL); Jan Pieter Drijfhout, Echt (NL)

(73) Assignee: COVESTRO (NETHERLANDS) B.V., Geleen (NL)

(*) Notice: Subject to any disclaimer, the term of this patent is extended or adjusted under 35 U.S.C. 154(b) by 175 days.

(21) Appl. No.: 17/084,602

(22) Filed: Oct. 29, 2020

(65) Prior Publication Data

US 2021/0071012 A1 Mar. 11, 2021

Related U.S. Application Data

(62) Division of application No. 16/304,627, filed as application No. PCT/EP2017/062799 on May 26, 2017, now abandoned.

(30) Foreign Application Priority Data

May 27, 2016 (EP) .................................. 16171747
Feb. 2, 2017 (EP) .................................. 17154451

(51) Int. Cl.
| | |
|---|---|
| *C09D 5/03* | (2006.01) |
| *C08G 63/42* | (2006.01) |
| *C09D 11/104* | (2014.01) |
| *C09D 167/02* | (2006.01) |
| *C09D 167/04* | (2006.01) |
| *C08G 63/16* | (2006.01) |
| *C09D 167/03* | (2006.01) |
| *C08K 5/20* | (2006.01) |

(52) U.S. Cl.
CPC ............... *C09D 5/03* (2013.01); *C08G 63/16* (2013.01); *C08G 63/42* (2013.01); *C08K 5/20* (2013.01); *C09D 11/104* (2013.01); *C09D 167/02* (2013.01); *C09D 167/03* (2013.01); *C09D 167/04* (2013.01); *C08G 2150/20* (2013.01)

(58) Field of Classification Search
CPC ...... C08G 63/16; C08G 63/18; C08G 63/181; C08G 63/199; C08G 63/40; C08G 63/42; C09D 167/00; C09D 167/02; C09D 167/06; C09D 167/07; C09D 5/03; C09D 5/033; C09J 167/00; C09J 167/02; C09J 167/06; C09J 167/07; C08L 67/00; C08L 67/02; C08L 67/06; C08L 67/07; C08J 2367/00; C08J 2367/02; C08J 2367/06; C08J 2367/07; C08K 5/20
See application file for complete search history.

(56) References Cited

U.S. PATENT DOCUMENTS

| | | | |
|---|---|---|---|
| 4,681,975 A | 7/1987 | Hasegawa et al. | |
| 5,026,676 A | 6/1991 | Motika et al. | |
| 5,064,913 A | 11/1991 | Kooijmans | |
| 7,838,076 B2 | 11/2010 | Nakahara et al. | |
| 2010/0120978 A1* | 5/2010 | Minesso | C09D 167/02 524/602 |
| 2018/0030308 A1* | 2/2018 | Stevenson | C09D 167/00 |

FOREIGN PATENT DOCUMENTS

| | | |
|---|---|---|
| EP | 1 788 049 | 5/2007 |
| WO | 2009/025850 | 2/2009 |
| WO | 2016/012254 | 1/2016 |

OTHER PUBLICATIONS

Allnex, Crylcoat 2611-0 Data Sheet (2020).*
International Search Report for PCT/EP2017/062799 dated Jul. 18, 2017, 3 pages.
Written Opinion of the ISA for PCT/EP2017/062799 dated Jul. 18, 2017, 6 pages.

* cited by examiner

*Primary Examiner* — Kregg T Brooks
(74) *Attorney, Agent, or Firm* — The Webb Law Firm

(57) ABSTRACT

The invention relates to a polymer comprising certain specific units. The invention further relates to processes for making the polymer of the invention. The invention further relates to a binder and compositions comprising the polymer, preferably to compositions suitable for paints and coatings. The invention relates in particular to water-borne, solvent-borne and powder coating compositions and preferably to curable water-borne, curable solvent-borne and curable powder coating compositions. The invention further relates to cured compositions. The invention further relates to objects, in particular coatings prepared from the compositions of the invention. The invention further relates to processes for making the compositions of the invention. The invention further relates to articles having coated thereon the compositions of the invention. The invention further relates to articles having coated and cured thereon the compositions of the invention. The invention further relates to various uses of the polymer of the invention, the binder of the invention, the composition of the invention, the cured composition of the invention and various uses of articles having coated and optionally cured thereon the compositions of the invention.

82 Claims, No Drawings

POLYMERS, PROCESSES, COMPOSITIONS AND USES

CROSS-REFERENCE TO RELATED APPLICATIONS

This application is a divisional of U.S. application Ser. No. 16/304,627 filed May 26, 2017 (now abandoned), which is the U.S. national phase of International Application No. PCT/EP2017/062799 filed May 26, 2017 which designated the U.S. and claims priority to EP Patent Application No. 16171747.5 filed May 27, 2016 and EP Patent Application No. 17154451.3 filed Feb. 2, 2017, the entire contents of each of which are hereby incorporated by reference.

FIELD

The invention relates to a polymer comprising certain specific units. The invention further relates to processes for making the polymer of the invention. The invention further relates to a binder and compositions comprising the polymer, preferably to compositions suitable for paints and coatings. The invention relates in particular to water-borne, solvent-borne and powder coating compositions and preferably to curable water-borne, curable solvent-borne and curable powder coating compositions. The invention further relates to cured compositions. The invention further relates to objects, in particular coatings prepared from the compositions of the invention. The invention further relates to processes for making the compositions of the invention. The invention further relates to articles having coated thereon the compositions of the invention. The invention further relates to articles having coated and cured thereon the compositions of the invention. The invention further relates to various uses of the polymer of the invention, the binder of the invention, the composition of the invention, the cured composition of the invention, objects prepared from the compositions of the invention and various uses of articles having coated and optionally cured thereon the compositions of the invention.

BACKGROUND AND SUMMARY

Polymers are a large class of materials consisting of many small molecules (called monomers) that are linked together to form chains of various lengths. Polymers have been used for years in a variety of applications and continue to be used nowadays in a plethora of modern and high-tech applications. One of the major applications for polymers has been that of paints and coatings. Paints are typically liquid or powder compositions that after application to an article are able to form a thin continuous solid film, known in the literature as coatings. Depending on their end use, coatings may be required to exhibit certain particular properties or property. Powder coating compositions (or equally known as powder paints) is a class of paints that are substantially dry, finely divided, free flowing, solid materials at room temperature and at atmospheric pressure, have gained considerable popularity in recent years over liquid coating compositions for a number of reasons. For one powder coatings are user and environmentally friendly materials since they are virtually free of harmful volatile organic solvents carriers that are normally present in liquid coating compositions. Therefore, powder coatings give off little, if any, volatile materials to the environment when cured. This eliminates the solvent emission problems associated with liquid coating compositions such as air pollution and dangers to the health of workers employed in coating operations. Powder coating compositions (or commonly also known as powders) are also clean and convenient to use since they are applied in a clean manner over the substrate because they are in substantially dry solid form. The powders are easily swept up in the event of a spill and do not require special cleaning and spill containment supplies, as do liquid coating compositions. Working hygiene is thus improved. Moreover, powder coating compositions are essentially 100% recyclable and reusable since the sprayed powders can be fully reclaimed and recombined with fresh powder feed. Recycling of liquid coatings during application is often not done, which leads to increased waste and hazardous waste disposal costs. In addition, powder coating compositions are ready to use, i.e., no thinning or dilution is required.

Powder coating compositions are typically finely divided particles of a polymer, and a crosslinker in case of a heat/radiation curable powder coating composition, that also usually contain pigments, fillers, and other additives. After application to the substrate, the individual powder particles are melted in an oven and coalesce to form a continuous film typically known as a powder coating having decorative and protective properties associated with conventional organic coatings. Methods of application of powder coating compositions are considered to be fusion-coating processes; that is, at some time in the coating process the powder particles must be fused or melted. Although this is usually carried out in a convection oven, infrared and induction heating methods have also been used. Therefore, with minor exceptions, powder coatings are factory applied in fixed installations, essentially excluding their use in maintenance applications. Powder coating compositions are typically applied on a substrate via an electrostatic spray process; the powder coating composition is dispersed in an air stream and passed through a corona discharge field where the particles acquire an electrostatic charge. The charged particles are attracted to and deposited on the grounded object to be coated. The object usually at room temperature, is then placed in an oven where the powder melts and forms a powder coating. A hybrid process based on a combination of high voltage electrostatic charging and fluidized-bed application techniques (electrostatic fluidized bed) has evolved, as well as triboelectric spray application methods. Powder coating compositions and their process of application are the preferred coating compositions and process for coating many familiar items such as lawn and garden equipment, patio and other metal furniture, electrical cabinets, lighting, shelving and store fixtures, and many automotive components. Today, powder coating compositions are widely accepted, with thousands of installations in the factories of original equipment manufacturers (OEMS) and custom coating job shops. The preparation of heat-curable powder coating compositions is described by Misev in "Powder Coatings, Chemistry and Technology" (pp. 224-300; 1991, John Wiley).

In a variety of applications such as white goods (e.g. fridges, freezers, washing machines, dishwashers), furniture (e.g. tables, chairs), cable covers, docking stations, tractors, crane, forklifts, bulldozers, coatings with matt finish (matt coatings) are either required or are highly desirable. Typically, high gloss coatings are easier to achieve in respect to matt coatings; the formulation of matt heat-curable (thermosetting) powder coatings poses a series of challenges for the formulator such as poor physical storage stability of the heat-curable powder coating composition, a process for making heat-curable powder coating compositions suitable for matt powder coatings that is expensive and difficult to control, and inconsistency of the matting effect of the powder coatings (large batch-to-batch variation) and high dependency of the curing conditions of the heat-curable powder coating compositions suitable for matt powder coatings. It is particularly a long-felt in the market of heat-curable powder coating compositions the achievement of matt finish by using only one heat-curable powder coating composition [one component (1K) heat-curable powder coating composition] and not a physical blend of two different, separate and distinct heat-curable powder coating compositions [two component (2K) heat-curable powder coating composition]. The use of 1K heat-curable powder coating compositions for matt finish is highly desirable since it combines an array of potential benefits for the coaters and the end-consumers alike; just to mention few, it simplifies the coating application process, increases the capacity of a typical powder coating line, enhances the sustainability of a powder coating solution for a special and highly desirable finish, reduces dramatically the costs for preparing coated articles with matt finish, all of which result to tangible benefits to coaters and end-consumers alike.

Although, 1K heat-curable powder coating compositions suitable for matt finish are highly desirable there is for long an unmet need for this type of compositions. One of the main reasons is that one component heat-curable powder coating compositions suffer from problems arising from the reactive nature of the ingredients, in particular problems of premature curing resulting also in poor physical storage stability. Generally, all ingredients required for curing the composition have to be contained and uniformly distributed in the heat-curable powder coating composition when it is applied to an article. In order to obtain a requisite uniform distribution of the ingredients, the powder must be thoroughly mixed. Melt-mixing, followed by granulation of the mixture has long been a preferred method of mixing. However, melt-mixing has had to be carefully carried out in order to avoid premature curing of unsaturated polyester resins and thermal radical initiators used in said compositions. As a result of efforts to avoid the problem of premature curing of said compositions, the mixing was frequently incomplete, resulting in non-uniform distribution of the ingredients and poor quality coatings.

However, the modern challenges for the formulator of matt powder coatings do not end here. The typical curing temperatures of heat-curable powder coating compositions range from 180 to 225° C. In order to comply with more stringent environmental regulations, there has been increased attention to the development of heat-curable powder coating compositions that can be cured at temperatures lower than 225° C. A decrease in temperature at which a heat-curable powder coating composition can be cured is desired as this is economically, environmentally and technically advantageous. A decrease in curing temperature, while keeping the cure time constant, reduces the energy consumption, which is beneficial both from an ecological and an economical point of view, rendering at the same time this type of heat-curable powder coating compositions attractive to powder coaters since the throughput of their powder coating lines may also be significantly increased. However, powder coatings resulting from heat-curable powder coating compositions that are cured at temperatures lower than 225° C. may however display poor storage stability, and/or poor chemical resistance and/or poor reverse impact resistance, or perform poor in all of them.

WO 2016-012254 A1 (to DSM Assets BV) disclosed a thermosetting powder coating composition B (PCC B) comprising a physical mixture of a thermosetting powder coating composition A (PCC A) with a separate, distinct thermosetting powder coating composition A1 (PCC A1). The PCC B was used to produce matt powder coatings. WO 2016-012254 did not disclose 1K thermosetting powder coating compositions, but rather 2K thermosetting powder coating compositions (p. 16, ll. 25-32). In addition, the polymers (polyesters) of WO 2016-012254 A1 are very different from the polymers of the present invention. Therefore, WO 2016-012254 A1 teaches away from the present invention since it not only suggests very different polymers but also a very different solution as to obtaining matt powder coatings (2K compositions vs. 1K compositions).

U.S. Pat. No. 4,681,975 (to Mitsubishi Monsanto Chemical Company) disclosed liquid polyesters comprising a polybasic acid and a polyhydric alcohol as its monomer constituents, wherein the polyhydric alcohol is composed at least partially of 1,2-butanediol. It is clear that the polymers of U.S. Pat. No. 4,681,975 are very different from the polymers of the present invention. In addition, WO 2009-025850 A2 is absolutely silent as to how to provide matt powder coatings let alone as to how to improve their physical storage stability and maintaining good reverse impact resistance. Therefore, U.S. Pat. No. 4,681,975 not only fails to provide any motivation to one of ordinary skill in the art seeking to achieve matt powder coatings that have enhanced physical storage stability and good reverse impact resistance, but it also teaches away from the present invention by instructing one of ordinary skill in the art to use different polymers than those of the present invention.

EP 1788049 A1 (equivalent to U.S. Pat. No. 7,838,076 B2) (to Kansai Paint Co. Ltd) disclosed a thermosetting aqueous paint comprising an oligomer (A-1) having a specific acid value, hydroxyl value and number average molecular weight and obtained by reacting a compound having at least one hydroxyl group and at least one carboxyl group in a molecule thereof, a monoepoxide compound having along-chain hydrocarbon group, and as necessary a polyvalent carboxylic acid group and/or polyvalent carboxylic acid anhydride, and/or a polyester resin (A-2) obtained by further reacting a polyvalent carboxylic acid and/or a polyvalent carboxylic acid anhydride and/or a polyisocyanate compound with the oligomer and a crosslinking agent (B); and also disclosed a method for forming a paint using this paint. The EP 1788049 A1 is absolutely silent as to the glass transition temperature of its polymers and especially as to how to provide powder coatings that have all of the following very desired properties:
  i) excellent chemical resistance, and
  ii) excellent reverse impact resistance, and
  iii) low gloss 60° (matt finish), and
  iv) (their corresponding 1K powder coating compositions have) good physical storage stability.

Hence, the provision of powder coatings having matt finish and combining excellent chemical resistance, excellent reverse impact resistance wherein said coatings are derived upon heat curing of 1K powder coating compositions at temperatures lower than 225° C. wherein said 1K powder coating compositions have good physical storage stability, poses a serious challenge for a paint formulator and especially for a formulator of heat-curable powder coating compositions.

Therefore, there is an unmet need and a desire for powder coatings that have all of the following very desired properties:
  i) excellent chemical resistance, and
  ii) excellent reverse impact resistance, and
  iii) low gloss 60° (matt finish), and
  iv) (their corresponding 1K powder coating compositions have) good physical storage stability.

It is therefore the object of the invention to provide powder coatings that have all of the just above mentioned properties i) to iv).

DETAILED DESCRIPTION

It was surprisingly found that the object of the invention was achieved by a polymer as described in the claims and as disclosed herein (see Examples and in particular Table 1). The powder coatings prepared from the polymer (or the 1K heat-curable powder compositions that can be cured at 200° C.) of the invention, had a unique combination of:
  i) excellent chemical resistance, and
  ii) excellent reverse impact resistance, and
  iii) low gloss 60° (matt finish), and
  iv) (their corresponding 1K powder coating compositions have) good physical storage stability.

Hence, surprisingly only the inventive polymers (and their 1K powder coating compositions) offered a surprising solution to the problem of improving on the reverse impact resistance (RIR) and the chemical resistance of low gloss (matt) powder coatings by maintaining at the same time a good physical storage stability of their corresponding powder coating compositions.

Broadly in accordance with the invention, there is provided a polymer as described in the claims and as disclosed herein.

Broadly in accordance with the invention, there is provided a process for making a polymer, as said process is described in the claims and as disclosed herein.

Broadly in accordance with the invention, there is provided a binder as described in the claims and as disclosed herein.

Broadly in accordance with the invention, there is provided a composition as described in the claims and as disclosed herein.

Broadly in accordance with the invention, there is provided a cured composition as described in the claims and as disclosed herein.

Broadly in accordance with the invention, there is provided an article as described in the claims and as disclosed herein.

Broadly in accordance with the invention, there are provided various uses as described in the claims and as disclosed herein.

All combinations of minimum and maximum values of the parameters disclosed herein may be used to define the parameter ranges for various preferments or embodiments of the invention.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application can be combined with each other.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 1 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 2 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 3 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 4 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

Definitions

By the term 'functional groups' is meant herein a covalently bonded group of atoms within a molecule, such as for example the carboxylic acid group, or the hydroxyl group or the oxirane group, that determines the chemical behaviour of said entity e.g. molecule, are capable of reacting and/or interacting with functional groups of another monomeric molecule or polymer and are responsible for the characteristic chemical reactions and/or chemical behaviour of those molecules.

By the term 'ionic functional group' is meant herein a functional group that comprises one or both of a cation and an anion. By the term 'ionic monomer' is meant herein an organic monomer able to polymerize and which said monomer comprises ionic functional groups which said ionic functional groups are not consumed (are inert) during the polymerization of said monomer. Exemplary ionic monomers include but are not limited to organic monomers comprising ammonium salt moieties, dicarboxylic sulfonic acids, dicarboxylic sulfonic acid salts, diesters of dicarboxylic sulfonic acids, diesters of dicarboxylic sulfonic acid salts, dicarboxylic phosphonic acids, dicarboxylic phosphonic acid salts, diesters of dicarboxylic phosphonic acids, diesters of dicarboxylic phosphonic acid salts, dicarboxylic sulfonic acid alkali metal salts e.g. 5-sulfoisophthalic acid sodium salt, diesters of dicarboxylic sulfonic acid alkali metal salts, dicarboxylic phosphonic acid alkali metal salts, diesters of dicarboxylic phosphonic acid alkali metal salts, dicarboxylic sulfonic acid amine salts, diesters of dicarboxylic sulfonic acid amine salts, dicarboxylic phosphonic acid amine salts, diesters of dicarboxylic phosphonic acid amine salts, dicarboxylic aromatic sulfonic acids, dicarboxylic aromatic sulfonic acid salts, diesters of dicarboxylic aromatic sulfonic acids, diesters of dicarboxylic aromatic sulfonic acid salts, dicarboxylic aromatic phosphonic acids, dicarboxylic aromatic phosphonic acid salts, diesters of dicarboxylic aromatic phosphonic acids, diesters of dicarboxylic aromatic phosphonic acid salts, dicarboxylic aromatic sulfonic acid alkali metal salts e.g. 5-sulfoisophthalic acid sodium salt, diesters of dicarboxylic aromatic sulfonic acid alkali metal salts, dicarboxylic aromatic phosphonic acid alkali metal salts, diesters of dicarboxylic aromatic phosphonic acid alkali metal salts, dicarboxylic aromatic sulfonic acid amine salts, diesters of dicarboxylic aromatic sulfonic acid amine salts, dicarboxylic aromatic phosphonic acid amine salts, diesters of dicarboxylic aromatic phosphonic acid amine salts.

By the term 'functional polymer' is meant herein a polymer comprising functional groups.

By the term 'acid-functional' (referring to a polymer) is meant a polymer which predominantly has carboxyl functional groups, and has an acid value that is higher than its hydroxyl value. Preferably, an acid-functional polymer has a hydroxyl value (OHV) lower than 14 mg KOH/g, and an acid value (AV) of at least 14, more preferably of at least 14 and at most 500 mg KOH/g. The AV is measured as disclosed herein.

By the term 'hydroxyl-functional' (referring to a polymer) is meant a polymer which predominantly has hydroxyl functional groups, and has a hydroxyl value that is higher than its acid value. Preferably, a hydroxyl-functional polymer has an AV lower than 14 mg KOH/g, and an OHV of at least 14, more preferably of at least 14 and at most 300 mg KOH/g. The OHV is measured as disclosed herein.

By the term 'copolymerizable polymer' is meant herein a functional polymer that is able to react with one or both of Polymer and copolymerizable agent, and said functional polymer is neither a BHA compound, nor an EPX compound. Preferably the copolymerizable polymer is able to react with any copolymerizable agent present in a Composition. An example of copolymerizable polymer is copolymerizable polymer A as the latter is disclosed herein By the term 'Polymer' is meant herein a polymer according to the invention. The term 'Polymer' as used herein includes any and all of its preferments, combinations of its features and ranges as well as combinations of any and all of its preferments with any and all of the combinations of its features and ranges, e.g. the term Polymer includes acid-functional Polymer, PolymerCS, acid-functional PolymerCS, acid-functional PolymerCS P, etc, as each of them is disclosed herein. The Polymer is a functional polymer. The Polymer is able to react with one or both of copolymerizable polymer and copolymerizable agent. Preferably the Polymer is able to react with any copolymerizable agents present in a Composition.

By the term 'copolymerizable agent' is meant herein a compound which is able to react with at least the Polymer, and said compound is selected from the group consisting of BHA compounds, EPX compounds, monomeric compounds comprising functional groups, and mixtures thereof. Preferably the copolymerizable agent is able to react with any one of Polymer and any one of copolymerizable polymers present in a Composition.

By "BHA compound" is meant herein any compound which comprises at least two β-hydroxyalkylamide groups in its structure.

By "EPX compound" is meant herein any compound which comprises at least two oxirane groups in its structure.

By the term 'Composition' is meant herein a composition of matter according to the invention. The term 'Composition' as used herein includes any and all of its preferments, combinations of its features and ranges as well as combinations of any and all of its preferments with any and all of the combinations of its features and ranges. The Composition comprises a Binder. The Composition comprises a Binder and optionally a constituent B.

By the term 'Binder' is meant herein: i) the total of copolymerizable polymer and Polymer and ii) the total of constituent A, contained in a Composition. The term 'Binder' as used herein includes any and all of the its preferments, combinations of its features and ranges as well as combinations of any and all of its preferments with any and all of the combinations of its features and ranges; the Binder is obviously a component of the component of the Composition.

By the term 'constituent A' is meant herein a component of the Composition wherein said component is selected from the group consisting of organic metal salt, thermal initiator, photoinitiator, copolymerizable agent and mixtures thereof. The term 'constituent A' as used herein includes any and all of its preferments, combinations of its features and ranges as well as combinations of any and all of its preferments with any and all of the combinations of its features and ranges.

By the term 'constituent B' is meant herein a component of the Composition wherein said component is selected from the group consisting of pigment, dye, additive and mixtures thereof. The term 'constituent B' as used herein includes any and all of its preferments, combinations of its features and ranges as well as combinations of any and all of its preferments with any and all of the combinations of its features and ranges.

By the term 'organic metal salt' is meant herein a metal salt of an organic acid and mixtures thereof. Preferably the metal of the metal cation of the organic metal salt is selected from the group consisting of Co, Mn, Fe, Ce, V, Pb, Nd, Zr, Bi, Ba, Al, Sr, Ca, Zn, Li, K. More preferably, the metal of the metal cation of the organic metal salt is selected from the group consisting of Co, Mn, Fe, Ce, V, Pb, Nd, Zr, Bi, Ba, Al, Sr, Ca, Zn, Li, K, and the anion is a carboxylate selected from the group consisting of OL1, OL2, OL3 and mixtures thereof, wherein OL1, OL2 and OL3 have the following formulae:

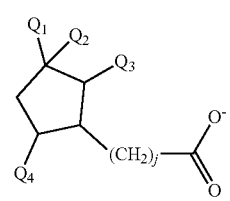

OL1

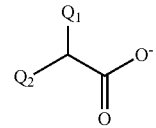

OL2

-continued

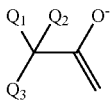

OL3 wherein
j is an integer equal to or higher than 1 and at most 34, and Q1, Q2, Q3, Q4 is each independently selected from the group consisting of H, $CH_3$, $C_2$, $H_5$, $C_3H$, $C_4H_9$ and $C_5$-$C_{20}$ saturated-hydrocarbyl. Preferably in OL1, Q1, Q2, Q3, Q4 is each independently selected from the group consisting of H and $C_1$-$C_{10}$ saturated-hydrocarbyl. Preferably in OL2, Q1 is $C_4H_9$ and Q2 is $C_2H_5$. Preferably in OL3, Q1 is $CH_3$ and Q2 and Q3 is each independently selected from a $C_1$-$C_{10}$ saturated-hydrocarbyl.

By the term 'cyclic ester' is meant herein a chemical compound of the following formula:

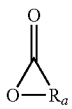

wherein
$R_a$ is a $C_1$-$C_{15}$ optionally-substituted-hydrocarbylene. Preferably $R_a$ is a $C_3$-$C_6$ optionally-substituted-hydrocarbylene, more preferably $R_a$ is a $C_3$-$C_5$ optionally-substituted-hydrocarbylene, even more preferably, $R_a$ is a $C_1$-$C_{15}$ saturated-hydrocarbylene, most preferably $R_a$ is a $C_3$-$C_6$ saturated-hydrocarbylene, especially $R_a$ is a $C_3$-$C_5$ saturated-hydrocarbylene, more especially $R_a$ is a $C_5$ saturated-hydrocarbylene. Exemplary cyclic esters include but are not limited to ε-caprolactone, and lactides. Preferably, the cyclic ester is ε-caprolactone.

By the term 'anhydride group' is meant herein the group of atoms according to the following formula:

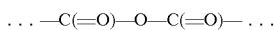

By the term 'unsaturation' is meant herein a cis- or trans-configured carbon-carbon double bond (carbon-carbon double bond unsaturation), or a carbon-carbon triple bond (carbon-carbon triple bond unsaturation).

By the term 'unsaturated' is meant herein that the relevant entity has at least one carbon-carbon double bond and no carbon-carbon triple bond.

By the term 'ethylenic unsaturation' is meant a non-aromatic cis- or trans-configured carbon-carbon double bond unsaturation according to the following formula:

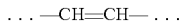

By the term 'ethylenically unsaturated' is meant that the relevant entity comprises one or more ethylenic unsaturations and said entity has neither a carbon-carbon triple bond unsaturation, nor a carbon-carbon double bond unsaturation other than the ethylenic unsaturations.

By the term 'saturated' is meant that the relevant entity does not contain any unsaturation.

By the term 'non-cyclic' is meant that the relevant group or entity does not contain any closed ring structure such as for example a cyclohexane ring, a benzene ring, etc.

By the term 'hydrocarbon' is meant a chemical compound consisting of carbon and hydrogen only.

By the term 'hydrocarbyl' is meant a univalent organic group formed by removing a hydrogen atom from a saturated or unsaturated hydrocarbon. Exemplary hydrocarbyls include but are not limited to methyl, ethyl, phenyl, benzyl.

By the term 'saturated-hydrocarbyl' is meant herein a saturated hydrocarbyl. Exemplary saturated-hydrocarbyls include but are not limited to alkyls such as methyl, ethyl, propyl, butyl, pentyl, hexyl.

By the term 'optionally-substituted-hydrocarbyl' is meant a hydrocarbyl optionally substituted by one or more substituents.

By the term 'acyclic-hydrocarbyl' is meant a non-cyclic optionally substituted hydrocarbyl group that may optionally be ethylenically unsaturated comprising preferably at least one and at most seven, more preferably at least one and at most five, most preferably at least one and at most three ethylenic unsaturations, especially three conjugated ethylenic unsaturations. Preferably the acyclic-hydrocarbyl is non-branched. Preferably the acyclic-hydrocarbyl is not substituted. Preferably the acyclic-hydrocarbyl is non-branched and not substituted.

By the term 'unsaturated-acyclic-hydrocarbyl' is meant a non-cyclic optionally substituted and ethylenically unsaturated hydrocarbyl group comprising at least one and at most seven, more preferably at least one and at most five, most preferably at least one and at most three ethylenic unsaturations, especially three conjugated ethylenic unsaturations. Preferably the unsaturated-acyclic-hydrocarbyl is non-branched. Preferably the unsaturated-acyclic-hydrocarbyl is not substituted. Preferably the unsaturated-acyclic-hydrocarbyl unsaturated fatty acid is non-branched and not substituted. Preferably the unsaturated-acyclic-hydrocarbyl is non-branched and comprises at least one and at most seven, more preferably at least one and at most five, most preferably at least one and at most three ethylenic unsaturations, especially three conjugated ethylenic unsaturations. Preferably the unsaturated-acyclic-hydrocarbyl is not substituted and comprises at least one and at most seven, more preferably at least one and at most five, most preferably at least one and at most three ethylenic unsaturations, especially three conjugated ethylenic unsaturations. Preferably the unsaturated-acyclic-hydrocarbyl is non-branched and not substituted and comprises at least one and at most seven, more preferably at least one and at most five, most preferably at least one and at most three ethylenic unsaturations, especially three conjugated ethylenic unsaturations.

By the term 'hydrocarbylene' is meant a divalent organic group formed by removing two hydrogen atoms from a saturated or unsaturated hydrocarbon, the free valences of which are not engaged in a double bond. Exemplary hydrocarbylene include but are not limited to methylene, 1,3-phenylene.

By the term 'saturated-hydrocarbylene' is meant a saturated hydrocarbylene.

By the term 'optionally-substituted-hydrocarbylene' is meant a hydrocarbylene optionally substituted by one or more substituents.

By the term 'substituent' is meant herein an atom or a group of atoms that replaces one or more hydrogen atoms attached to a parent structure. Exemplary substituents include but are not limited to oxygen, carboxyl, hydroxyl, amino, cyano, methoxy, formyl, imino, etc.

The term 'optionally substituted' and 'optionally substituted by one or more substituents' are used herein interchangeably.

By the term 'oil length' (of a polymer) is meant:

$$\text{Oil length} = \frac{1{,}045 \times \text{weight of fatty acids}}{\text{weight of polymer} - \text{weight of water evolved}} \times 100$$

By the term 'functionality' (abbreviated as f) of a polymer is meant:

$$f = \frac{[M_n \times (AV + OHV)]}{56110}$$

wherein
$M_n$ is the number average molecular weight of the polymer and it is measured as disclosed herein,
AV is the acid value of the polymer and it is measured as disclosed herein,
OHV is the hydroxyl value of the polymer and it is measured as disclosed herein.

By the term 'Molar Ratio Q' (abbreviated as MRQ and referring to a polymer comprising units selected from the group consisting of S1, S2, S3, S4, and combinations thereof, as each of S1, S2, S3 and S4 is disclosed herein) is meant herein:

$$MRQ = \frac{S_{total}}{S_{specific}} = \frac{S_{specific} + S_{rest}}{S_{specific}}$$

wherein
$S_{total} = S_{specific} + S_{rest}$, and
$S_{specific}$ = (total moles S1)+(total moles S2)+(total moles S3)+(total moles S4), and
$S_{rest}$ = the total moles of all the units of a polymer wherein said units are not any one of S1, S2, S3, S4.
The MRQ is by definition equal to or higher than 1.
For example a polymer that has 1 mol of S1 and 1 mol of S2 and 1 mol of S3 and 1 mol of S4 and 4 moles of all the other units apart from S1, S2, S3 and S4 ($S_{rest}$=4), then said polymer has a MRQ=2 (=8/4). A polymer that has 1 mol of S1 and no S2, no S3 and no S4, and 99 moles of all the other units together apart from S1, S2, S3 and S4, then said polymer has MRQ=100 (=100/1).

By the term '$T_g$' is meant herein glass transition temperature and is measured as disclosed herein.

B the term '$M_n$' is meant herein number average molecular weight and is measured as disclosed herein.

By the term '$M_w$' is meant herein weight average molecular weight and is measured as disclosed herein By the term 'polydispersity' (abbreviated as 'D' and referring to a polymer) is meant herein:

$$D = M_w/M_n$$

wherein each of the $M_w$ and the $M_n$ is measured as disclosed herein.

By the term 'mono-epoxide' is meant herein any chemical compound that comprises only one oxirane group.

By the term 'anhydride A' is meant herein any chemical compound—other than trimellitic acid anhydride and citric acid anhydride—, represented by the following formula AY, and mixtures thereof:

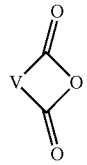

AY wherein V is selected from the group consisting of V1, V2, V3, V4, V5, V6, V7, V8, V9, V10, V11, V12, V13, V14, as each of V1 to V14 is defined below, and wherein the black bold dots shown in each of the formulae of any one of V1 to V14 represent the attachment points of each of V1 to V14 to the AY, wherein each attachment point is a carbon atom,

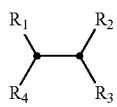

V1

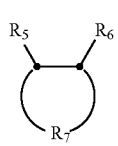

V2

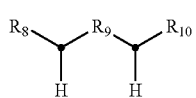

V3

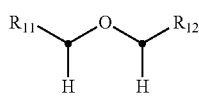

V4

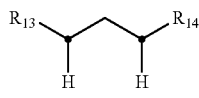

V5

V6

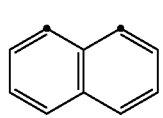

V7

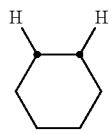

V8

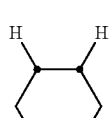

V9

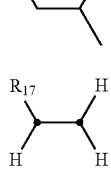

V10

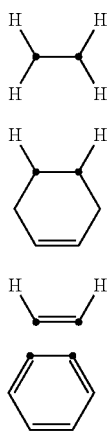

wherein
$R_1, R_2, R_3, R_4, R_5, R_6, R_8, R_{10}, R_{11}, R_{12}, R_{13}, R_{14}, R_{15}, R_{16}$, is each independently selected from the group consisting of H, $CH_3$, and $C_2$-$C_{34}$ optionally-substituted-hydrocarbyl, and $R_7$ is either $CH_2$ or a $C_2$-$C_{34}$ optionally-substituted-hydrocarbylene, and
$R_9$ is a $C_2$-$C_{34}$ optionally-substituted-hydrocarbylene, and $R_{17}$ is a $C_1$-$C_{34}$ optionally-substituted-hydrocarbyl, and with the proviso that none of $R_1$ to $R_{17}$ comprises any anhydride group.

In view of this paragraph, the anhydride A is effectively selected from the group consisting of AYV1, AYV2, AYV3, AYV4, AYV5, AYV6, AYV7, AYV8, AYV9, AYV10, AYV11, AYV12, AYV13, AYV14, and mixtures thereof, with the proviso that each of AYV1 to AYV14 is neither trimellitic acid anhydride nor citric acid anhydride.

By the term 'AYV1' is meant herein an individual anhydride A wherein V is V1. The meaning of each of the terms 'AYV2', 'AYV3', 'AYV4', 'AYV5', 'AYV6', 'AYV7', 'AYV8', 'AYV9', 'AYV10', 'AYV11', 'AYV12', 'AYV13', 'AYV14', is analogous to that of 'AYV1'.

By the term 'organic cosolvent' is meant herein an organic solvent which is at least partially miscible with water. Preferably the cosolvent is completely miscible with water. Exemplary organic cosolvents include but are not limited to ethanol, propanol, butanol, propylene glycol, methoxypropylene glycol, dipropyleneglycol, dipropyleneglycol methylether, dipropyleneglycol dimethylether, ethyl diglycol, ethyl glycol acetate, butyl glycol, butyl glycol acetate, butyl diglycol, butyl diglycol acetate, methoxypropylene glycol acetate, acetone, methyl ethyl ketone.

By the term 'curing' or 'cure' is meant herein the process of becoming 'set' that is to form an irreversibly crosslinked network (the so-called 'cured form' or 'cured composition'), a material that can no longer flow, be melted or dissolved. Herein, the terms 'curing' 'cure' and 'crosslinking' are used interchangeably. The curing of the Composition may take place with or without the use of one or both of heat and radiation. If the curing of the Composition takes place using heat, then the curing is called 'heat curing'. For clarity, the term heat curing does not include ultraviolet (UV) or electron beam induced curing. If the curing of the Composition takes place using radiation i.e. UV and/or electron beam, curing is called 'radiation curing'.

By the term 'curable composition' is meant herein a composition that has the ability to cure at atmospheric pressure without the need to apply one or multiple of heat, radiation and pressure (above or below atmospheric pressure) in any combination, to induce and achieve the curing of the composition; heat, radiation and pressure (above or below atmospheric pressure) are not excluded but are not necessary for the curing of said composition. Thus, the term curable composition includes (and discloses) any one of and all of r.t.-curable, heat-curable and radiation-curable, heat/radiation curable compositions.

By the term 'r.t.-curable composition' is meant herein a composition that has the ability to cure at room temperature and at atmospheric pressure without the need to apply one or multiple of heating above room temperature, radiation and pressure (above or below atmospheric pressure) in any combination, to induce and achieve the curing of the composition; thus, heating above room temperature, radiation and pressure (above or below atmospheric pressure) are not excluded but are not necessary for the curing of said composition.

By the term 'heat-curable composition' is meant herein a composition that has the ability to cure at atmospheric pressure and at a temperature above the room temperature (elevated temperature) and that heating at elevated temperature is necessary to induce and achieve the curing of the composition; radiation and pressure (above or below atmospheric pressure) are not excluded but are not necessary for the curing of said composition.

By the term 'radiation-curable composition is meant herein a composition that has the ability to cure at atmospheric pressure and upon radiation i.e. UV and/or electron beam radiation and that said radiation is necessary to induce and achieve the curing of the composition; heating at elevated temperature and pressure (above or below atmospheric pressure) are not excluded but are not necessary for the curing of said composition.

By the term 'heat/radiation-curable composition is meant herein a composition that can be one or both of a heat-curable and radiation-curable composition.

By the term 'cured composition' is meant herein an object that is derived upon, and/or obtainable by and/or obtained by, and/or resulting from the curing of a composition; in other words a cured composition is a cross-linked composition; said curing may be effected via one or both of heat and radiation, preferably via heat; said object may have any shape, size or form and said object may for example be a coating; by 'coating' is meant herein a cured film that is derived upon, and/or obtainable by and/or obtained by, and/or resulting from partial or full curing of a composition; in other words a coating e.g. a powder coating, is a cured composition in the form of a film.

By the term 'powder' is meant herein, a substantially dry solid substance at room temperature and at atmospheric pressure reduced to a state of fine, loose particles wherein the individual particles have preferably a maximum particle size of at most 200, more preferably of at most 180, even more preferably of at most 160, most preferably of at most 150, especially of at most 140, more especially of at most 130, most especially of at most 120, for example of at most 110, for example of at most 100, for example of at most 90 μm at 23° C. and at atmospheric pressure; the individual particles have preferably a minimum particle size of at least 10, more preferably of at least 15, even more preferably of at least 20, most preferably of at least 25, especially of at least 30, more especially of at least 35, most especially of at least 40, for example of at least 45, for example of at least 50, for example of at least 60, for example of at least 70 μm at room temperature and at atmospheric pressure. A particle is defined as a small object that: a) has mean linear dimensions as described herein after and b) behaves as a whole unit in terms of its transport and properties. The particle size distribution (PSD) of a powder is a list of values or a mathematical function that defines the relative amounts of particles present, sorted according to size. The terms 'particle size' and 'particle size distribution' will be used interchangeably in the context of the invention when used in relation to a powder. The method used to measure the particle size of the heat-curable powder coating compositions of the invention is sieve analysis. According to it, the powder is separated on sieves of different sizes. Thus, the PSD is defined in terms of discrete size ranges: e.g. 'weight % of sample powder has particle size in the range of 75 microns to 90 microns', when sieves of these sizes are used. Preferably, 90 weight % of the heat-curable powder coating composition of the invention has a particle size in the range of 20 to 200 micron. The PSD can be determined for example by the following method: a certain amount of heat-curable powder coating composition, for example 100 g, is brought onto a Fritsch Analysette Spartan sieving apparatus equipped with a 200 micron sieve. The sample is sieved for 15 minutes at a 2.5 mm amplitude. The fraction of the sample which remained on the sieve was weighed after sieving. The fraction of the sample that went through the sieve (sieved fraction) is collected and is placed on a 160 micron sieve and is sieved as mentioned herein above. Once the same measurements (weighing) are performed as mentioned herein above, the same procedure is repeated using sequentially a 140, a 125, a 112, a 100, a 90, a 75, a 50 and a 20 micron sieve; the last sieved fraction with a size smaller than 20 micron is also weighed. Summing up the various weight fractions, this should yield the initial amount of sample, in this example 100 g. The various weight fractions represent the PSD as a list of values representing the relative amounts of particles present, sorted according to sieves used.

By "heat-curable powder compositions" is meant herein, a mixture of components in the form of a powder and which compositions are heat-curable thus they have the ability to form the so-called "cured form" or "cured composition" upon heating and curing at elevated temperatures and atmospheric pressure. For clarity, reference to any one of terms "heat-curable powder coating compositions" is to be understood as uncured heat-curable powder compositions. Heat-curable powder compositions are also known as 'thermosetting powder compositions. Heat-curable powder coating compositions (or equally thermosetting powder coating compositions) are examples of heat-curable powder compositions.

By the term 'one component heat-curable powder coating composition' or '1K heat-curable powder coating composition' or '1K system' is herein meant that all components of the heat-curable powder coating composition are melt-mixed e.g. via extrusion, and form part of one homogeneous powder. Heat-curable powder coating compositions are also known as thermosetting powder coating compositions.

By the term 'two component heat-curable powder coating composition' or '2K heat-curable powder coating composition' or '2K system' is meant herein a heat-curable powder coating composition that is the physical mixture of at least two separate, distinct powders with different chemical compositions; the at least two separate, distinct and different powders are each typically prepared via melt-mixing. The at least two separate, distinct and different powders are physically mixed via for example physical blending to afford the 2K heat-curable powder coating composition, before the latter either being stored or applied and cured onto an article.

By the term 'physical mixture' is meant herein what a skilled person in the art heat-curable powder coatings would understand, that is the elements of the mixture are brought and mixed together without: i) a substantial physical transformation and/or process that involves for example substantial melting, use of any liquid media e.g. organic solvent, water, able to solubilize or disperse the powders, and/or ii) chemical transformation and/or process that involves for example a chemical reaction, taking place.

By the term 'substantially dry' is meant herein that the powder e.g. a powder composition, a heat-curable powder composition, does not comprise any deliberately added water or moisture but the powder may comprise moisture absorbed from the atmosphere or water present as a stabilizer of the peroxides in an amount of up to 30, preferably up to 20, more preferably up to 10, even more preferably up to 5, most preferably up to 3, especially up to 2, more especially up to 1% w/w based on the total weight of the entity to which the term substantially dry refers to; for example if the term substantially dry refers to a powder composition then the % w/w is based on the total weight of the powder composition.

By the term 'photoinitiator' is meant herein any organic or inorganic compound that is capable to generate free radicals, cations or anions upon exposure to UV radiation without the application of heat. Exemplary photoinitiators include but are not limited to:

i) acyl phosphines such as bis-acyl phosphine oxides such as 2,4,6,-trimethylbenzoyl diphenylphosphine oxide, and ii) a-hydroxy ketones, iii) α-cleavage free radical photoinitiators including benzoin and its derivatives such as benzoin ethers such as isobutyl benzoin ether, and benzyl ketals such as benzyl dimethyl ketal, 2-hydroxy-2-methyl-1-phenylpropan-1-one and 4-(2-hydroxyethoxy)phenyl-2-hydroxy-2-propyl ketone, and iii) aryl ketones such as 1-hydroxycyclohexyl phenyl ketone, 2-benzyl-2-dimethylamino-1-(4-morpholinophenyl)-butan-1-one, 2,2-dimethoxy-2-phenylaceto-phenone, mixture of benzophenone and 1-hydroxycyclohexyl phenyl ketone, perfluorinated diphenyl titanocene and 2-methyl-1-(4-(methylthiophenyl)-2-(4-morpholinyl))-1-propanone, and iv) hydrogen abstraction free radical type photoinitiators such as Michler's ketone (4-4'-bisdimethylamino benzophenone), Michler's ethyl ketone (4-4'-bisdiethylamino benzophenone ethyl ketone), benzophenone, thioxanthone, anthroquinone, d,l-camphorquinone, ethyl d,l-ccamphorquinone, ketocoumarin, anthracene and derivatives of each of them, and v) cationic photoiniators such as v-i) diaryliodonium salts, and copper synergists such as diphenyl iodonium hexafluorophosphate, dibenzyl iodonium hexafluorophosphate, dibenzyl iodonium hexafluoroarsinate, and copper acetate, v-ii) triarylsulfonium salts such as triphenyl sulphonium hexafluorophosphate, triphenyl sulphonium tetrafluoroborate, v-iii) dialkylphenacyl-sulfonium salts, ferrocenium salts such as cyclopentadienyl iron(II) hexafluorophosphate, (5-cyclopentadienyl)-bis(2,6-difluoro-3-[pyrr-1-yl]-phenyl titanium v-iv) alpha-sulfonyloxy ketone and v-v) silyl benzyl ethers.

By the term 'thermal initiator' is meant herein any organic or inorganic compound that is capable to generate free radicals at any temperature ranging from −20° C. up to 170° C. without the application of UV radiation. Preferably the thermal initiator has thermally labile groups. Preferably the thermal initiator is selected from the group consisting of peroxide, azo compound and mixtures thereof. Preferably the thermal initiator is a peroxide or a mixture of peroxides. Exemplary azo compounds include but are not limited to azo isobutyronitrile (AIBN), 1,1'-azobis(cyclohexanenitrile), 1,1'-azobis(2,4,4-trimethylpentane). Exemplary peroxides include but are not limited to diacyl peroxides, such as 2-4-diclorobenzyl peroxide, diisononanoyl peroxide, decanoyl peroxide, lauroyl peroxide, succinic acid peroxide, acetyl peroxide, benzoyl peroxide, and diisobutyryl peroxide, acetyl alkylsulfonyl peroxides, such as acetyl cyclohexylsulfonyl peroxide, dialkyl peroxydicarbonates, such as di(n-propyl)peroxy dicarbonate, di(sec-butyl)peroxy dicarbonate, di(2-ethylhexyl)peroxy dicarbonate, diisopropylperoxy dicarbonate, and dicyclohexylperoxy dicarbonate, peroxy esters, such as alpha-cumylperoxy neodecanoate, alpha-cumylperoxy pivalate, t-amyl neodecanoate, t-amylperoxy neodecanoate, t-butylperoxy neodecanoate, t-amylperoxy pivalate, t-butylperoxy pivalate, 2,5-dimethyl-2,5-di(2-ethylhexanoylperoxy)hexane, t-amylperoxy-2-ethyl hexanoate, t-butylperoxy-2-ethyl hexanoate, and t-butylperoxy isobutyrate, azobis, (alkyl nitrile) peroxy compounds, such as 2,2'-azobis-(2,4-dimethylvaleronitrile), azobisisobutyronitrile, and 2,2'-azobis-(2-methylbutyronitrile); t-butyl-peroxymaleic acid, 1,1'-azobis-(1-cyclohexanecarbonitrile). Other thermal initiators, include peroxy ketals, such as 1,1-di(t-butylperoxy)-3,3,5-trimethylcyclohexane, peroxy esters, such as o,o'-t-butyl-o-isopropyl monoperoxy carbonate, 2,5-dimethyl-2,5-di(benzoylperoxy) carbonate, o,o'-t-butyl-o-(2-ethylhexyl)-monoperoxy carbonate, t-butylperoxy acetate, t-butylperoxy benzoate, di-t-butyldiperoxy azelate, and di-t-butyldiperoxy phthalate, dialkylperoxides, such as dicumyl peroxide, 2,5-dimethyl-2,5-di(t-butylperoxy)hexane, t-butyl cumyl peroxide, di-t-butyl peroxide, and 2,5-dimethyl, 2,5-di(t-butylperoxy)hexyne-3, hydroperoxides, such as 2,5-dihydroperoxy-2,5-dimethyl hexane, cumene hydroperoxide, t-butyl hydroperoxide and t-amyl hydroperoxide, ketone peroxides, such as n-butyl-4,4-bis-(t-butylperoxy)valerate, 1,1-di(t-butylperoxy)-3,3,5-trimethyl cyclohexane, 1,1'-di-t-amyl-peroxy cyclohexane, 2,2-di(t-butylperoxy) butane, ethyl-3,3-di(t-butylperoxy)butyrate, and blend of t-butyl peroctoate, and 1,1-di(t-butylperoxy) cyclohexane. Other thermal initiators are o,o'-t-alkyl-o-alkylmonoperoxy carbonates, such as o,o'-t-butyl-o-isopropylmonoperoxy carbonate, p,p'oxybis(benzene sulfonyl) hydrazide, and accelerated azocarbonamide. For clarity, any reference herein to a thermal radical initiator refers to the chemical substance per se and not to mixtures with other chemical substances for example carrier material, as the latter is explained herein. For example when amounts regarding a thermal radical initiator are mentioned herein these amounts are associated to the chemical substance per se and not to its mixture with any carrier material for example water, if they happen to be provided in a mixture form with a carrier material (as carrier material is disclosed herein).

By the term 'peroxy group' is meant herein the group . . . —O—O— . . .

By the term 'azo group' is meant herein the group . . . C—N=N—C . . . , wherein C may be primary (one neighbouring C), secondary (two neighbouring C) or tertiary (three neighbouring C).

By the term 'thermally labile group' is meant herein a peroxy group and an azo group.

By the term 'low bake curing' is meant heat-curing at 200° C. for 15 minutes.

By the term 'matt finish' or 'matt powder coatings' or 'low gloss powder coatings' is meant herein a white powder coating having a thickness of 50±5 μm that is obtained upon low bake curing of a white heat-curable powder coating composition, said white powder coating having a gloss 60°—as gloss 60° is defined and measured herein—of at most 50, preferably at most 48, more preferably at most 46, most preferably at most 45, especially at most 43, more especially at most 41, even more especially at most 40, most especially at most 38, for example at most 37, for example at most 36, for example at most 35, for example at most 33, for example at most 32, for example at most 30, for example at most 28, for example at most 26, for example at most 25, for example at most 24, for example at most 22, for example at most 20, for example at most 18, for example at most 16, for example at most 15, for example at most 12, for example at most 10, for example at most 8, for example at most 6.

By the term 'very low gloss powder coatings' is meant herein a white powder coating having a thickness of 50±5 μm that is obtained upon low bake curing of a white heat-curable powder coating composition, said white powder coating having a gloss 60°—as gloss 60° is defined and measured herein—of at most 20.

By the term 'excellent physical storage stability' (or equally 'excellent storage stability') (when referring to powder coating compositions) is meant herein that a white heat-curable powder coating composition has a physical storage stability (PSS) of at least 9, on a scale from 1 (very poor storage stability) up to 10 (excellent storage stability), as the PSS is defined and measured herein.

By the term 'good physical storage stability' (or equally 'good storage stability') (when referring to powder coating compositions) is meant herein that a white heat-curable powder coating composition has a physical storage stability (PSS) of at least 7 and at most 8, on a scale from 1 (very poor storage stability) up to 10 (excellent storage stability), as the PSS is defined and measured herein.

By the term 'poor physical storage stability' (or equally 'poor storage stability') (when referring to powder coating compositions) is meant herein that a white heat-curable powder coating composition has a physical storage stability (PSS) of at most 6, on a scale from 1 (very poor storage stability) up to 10 (excellent storage stability), as the PSS is defined and measured herein.

By the term 'good reverse impact resistance' (RIR) (or equally 'without compromising the reverse impact resistance') is meant herein that a white heat-curable powder coating composition scored a 'pass' on the relevant test for measuring the reverse impact resistance as this is defined and measured herein.

By the term 'poor reverse impact resistance' (RIR) (or equally 'compromising the reverse impact resistance') is meant herein that a white heat-curable powder coating composition scored a 'fail' on the relevant test for measuring the reverse impact resistance as this is defined and measured herein.

By the term 'excellent chemical resistance' is meant herein a white powder coating having a thickness of 50±5 μm that is obtained upon low bake curing of a white heat-curable powder coating composition, said white powder coating has a chemical resistance of at least 160 ADR, as the chemical resistance is defined and measured herein.

By the term 'good chemical resistance' is meant herein a white powder coating having a thickness of 50±5 μm that is obtained upon low bake curing of a white heat-curable powder coating composition, said white powder coating has a chemical resistance of at least 141 and at most 159 ADR, as the chemical resistance is defined and measured herein.

By the term 'mediocre chemical resistance' is meant herein a white powder coating having a thickness of 50±5 µm that is obtained upon low bake curing of a white heat-curable powder coating composition, said white powder coating has a chemical resistance of at least 100 and at most 140 ADR, as the chemical resistance is defined and measured herein.

By the term 'poor chemical resistance' is meant herein a white powder coating having a thickness of 50±5 µm that is obtained upon low bake curing of a white heat-curable powder coating composition, said white powder coating has a chemical resistance of at most 100 ADR, as the chemical resistance is defined and measured herein.

By the term 'components of a composition' is meant herein constituent elements, their preferred embodiments and combinations thereof, that constitute part of said composition; said components, their preferred embodiments and combinations thereof, should be construed in view of the whole disclosure. For example the Polymer, the Binder, the constituent A, the constituent B are each a component of the Composition.

By the term 'unit' (or equally 'constitutional unit') (both terms referring to a polymer) is meant herein a group of atoms (with pendant atoms or groups, if any) comprising a part of the essential chemical structure of a polymer.

By the term 'S1' (used interchangeably with the term 'S1 unit') (referring to a Polymer) is meant herein a unit represented by the following formula:

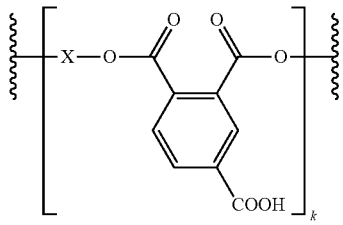

S1 wherein X and k are as disclosed herein and as described in the claims. The term 'S1' comprises any possible variation of said unit ('S1 in any variation' also interchangeable with the terms 'S1' and 'S1 unit'), that is any S1 which results from any combination of X and k including any and all of the preferments of each of X and k and combinations of said preferments. A Polymer may have more than one S1, each of which reads on formula S1—as the latter is disclosed herein—and each of which may have its own unique set of X and k variants as X and K are disclosed herein, said set of X and k variants being different from one S1 unit to another S1 unit.

By the term 'S2' (used interchangeably with the term 'S2 unit') (referring to a Polymer) is meant herein a unit represented by the following formula:

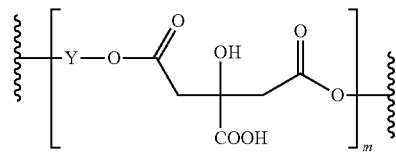

S2 wherein Y and m are as disclosed herein and as described in the claims. The term 'S2' comprises any possible variation of said unit ('S2 in any variation' also interchangeable with the terms 'S2' and 'S2 unit'), that is any S2 which results from any combination of Y and m including any and all of the preferments of each of Y and m and combinations of said preferments. A Polymer may have more than one S2, each of which reads on formula S2—as the latter is disclosed herein—and each of which may have its own unique set of Y and m variants as Y and m are disclosed herein, said set of Y and m variants being different from one S2 unit to another S2 unit.

By the term 'S3' (used interchangeably with the term 'S3 unit') (referring to a Polymer) is meant herein a unit represented by the following formula:

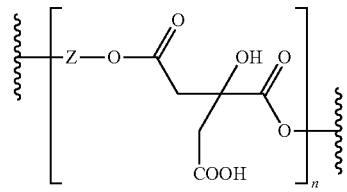

S3 wherein Z and n are as disclosed herein and as described in the claims. The term 'S3' comprises any possible variation of said unit ('S3 in any variation' also interchangeable with the terms 'S3' and 'S3 unit'), that is any S3 which results from any combination of Z and n including any and all of the preferments of each of Z and n and combinations of said preferments. A Polymer may have more than one S3, each of which reads on formula S3—as the latter is disclosed herein—and each of which may have its own unique set of Z and n variants as Z and n are disclosed herein, said set of Z and n variants being different from one S3 unit to another S3 unit.

By the term 'S4' (used interchangeably with the term 'S4 unit') (referring to a Polymer) is meant herein a unit represented by the following formula:

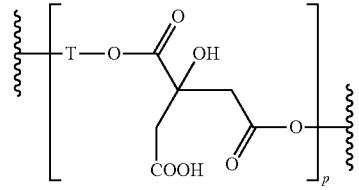

S4 wherein T and p are as disclosed herein and as described in the claims. The term 'S4' comprises any possible variation of said unit ('S4 in any variation' also interchangeable with the terms 'S4' and 'S4 unit'), that is any S4 which results from any combination of T and p including any and all of the preferments of each of T and p and combinations of said preferments. A Polymer may have more than one S4, each of which reads on formula S4—as the latter is disclosed herein—and each of which may have its own unique set of T and p variants as T and p are disclosed herein, said set of T and p variants being different from one S4 unit to another S4 unit.

By the term 'lower than' is meant herein that the relevant maximum boundary value is not included in the range.

By the term 'higher than' is meant herein that the relevant minimum boundary value is not included in the range.

For all upper and lower boundaries of any parameters given herein, the boundary value is included in each range for each parameter. All combinations of minimum and maximum values of the parameters described herein may be used to define the parameter ranges for various embodiments and preferences of the invention.

In the context of the present invention unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying in between the more preferred and the less preferred of said alternatives, is itself preferred to said less preferred value and also to each value lying between said less preferred value and said intermediate value.

By the term 'pph' is meant herein weight parts per hundred weight parts.

By the term 'room temperature' is meant herein a temperature of 23±2° C.

By "(N)IR lamp" denotes herein both a near-IR lamp and an IR lamp.

By the term 'article' is meant herein an individual object or item or element of a class designed to serve a purpose or perform a special function and can stand alone; the article can be in any size, form or shape. A substrate is an example of an article. Preferably, said article is selected from the group consisting of heat-sensitive articles, non-heat sensitive articles and combinations thereof; more preferably said article is selected from the group of non-heat sensitive articles, even more preferably said article is selected from the group consisting of thermoplastic composite, thermoset composite, fibre reinforced composites, sandwich materials e.g. sandwich materials comprising heat sensitive foam core, metal and combinations thereof. Typical examples of non-heat-sensitive articles include glass, ceramic, composite, fiber cement board, or metal, for example aluminum, copper or steel articles, for instance carbon steel, where the main alloying constituent is carbon. Carbon steel usually contains carbon 0.2 and 1.5% w/w based on the total alloy composition and often contains other constituents such as manganese, chromium, nickel, molybdenum, copper, tungsten, cobalt, or silicon, depending on the desired steel properties. Steel has properties similar to iron if the amount of carbon is not too high, for example not more than 1.5% w/w based on the total alloy composition. The steel may be surface treated (treatment with zinc, or zinc phosphate or iron phosphate etc.) or non-surface treated. Heat-sensitive articles for example heat-sensitive substrates, include plastic articles, wood articles for example solid wood, such as for example: hard wood, soft wood, plywood; veneer, particle board, low density fibre board, medium density fibreboard and high density fibreboard, OSB (Oriented Strand Board) wood laminates, chipboard and other articles in which wood is an important constituent, such as for example foil covered wooden articles, engineered wood, plastic modified wood, plastic articles or wood plastic compounds (WPC); articles with cellulosic fibres, for example cardboard or paper articles; textile and leather articles. Examples of plastic articles include unsaturated polyester resin based compositions, ABS (acrylonitrile butadiene styrene), melamine-formaldehyde resins, polycarbonate, polyethylene, polypropylene, ethylene-propylene-diene monomer (EPDM), thermoplastic olefin (TPO), polyurethane (PU), polypropylene oxide (PPO), polyethylene oxide (PEO), polyethyleneterephthalate and nylon, for example polyamide 6,6 and combinations thereof, for example polycarbonate-ABS. Other heat-sensitive articles include objects that are a combination of a non-heat-sensitive part such as metal parts with a heat-sensitive part, such as any one of the aforementioned for example plastic hosing with heavy metal parts, strips for example aluminium frames with heat strips etc. The article can be a domestic furniture, such as tables, chairs, cabinets, etc., bedroom and bathroom furniture, office furniture, contract furniture such as school and child furniture, hospital furniture, restaurant and hotel furniture, kitchen cabinets and furniture, (flat) panels for interior design, interior and exterior windows and doors, interior and exterior window frames and door frames, exterior and interior sidings and flooring, articles for automotive applications, such as interior car parts, wheel covers, bumpers, under the hood parts etc., flexible flooring, sporting goods, cosmetics, audiovisual applications, such as TV sets, computer housing, phones, etc., household appliances and satellite dishes.

The term 'water-borne composition' includes any and all of the following: i) water-reducible composition (also known as aqueous dispersion), that is a polymer solution in water, or a polymer dispersion in water, or a polymer dispersion in mixtures of water and cosolvent, ii) latex, that is a dispersion of solid polymer particles in water, and iii) emulsion, that is a dispersion of liquid into liquid, for example liquid into water.

Any characterization of the physical state e.g. liquid, solid, paste, powder, of an entity such as the Polymer, the Binder, the Composition, refers to said physical form as observed at room temperature and at atmospheric pressure. For example if it is said that the Composition is liquid, this means that the Composition is liquid at room temperature and at atmospheric pressure.

By the term 'catalyst A' is meant herein a chemical compound selected from the group consisting of the chemical compounds disclosed in i) to xxxi), as each of i) to xxxi) is disclosed below:

i) Phenoxide systems: include any one of the various catalysts described in any one of: D. J. Darensbourg, M. W. Holtcamp; Macromolecules, 28 (1995), p. 7577; D. J. Darensbourg, M. W. Holtcamp, G. E. Struck, M. S. Zimmer, S. A. Niezgoda, P. Rainey, J. B. Robertson, J. D. Draper, J. H. Reibenspies; J. Am. Chem. Soc., 121 (1999), p. 107; C. Koning, J. Wildeson, R. Parton, B. Plum, P. Steeman, D. J. Darensbourg; Polymer, 42 (2001), p. 3995; D. J. Darensbourg, J. R. Wildeson, J. C. Yarbrough, J. H. Reibenspies; J. Am. Chem. Soc., 122 (2000), p. 12487; D. J. Darensbourg, M. S. Zimmer, P. Rainey, D. L. Larkins; Inorg. Chem., 39 (2000), p. 1578.

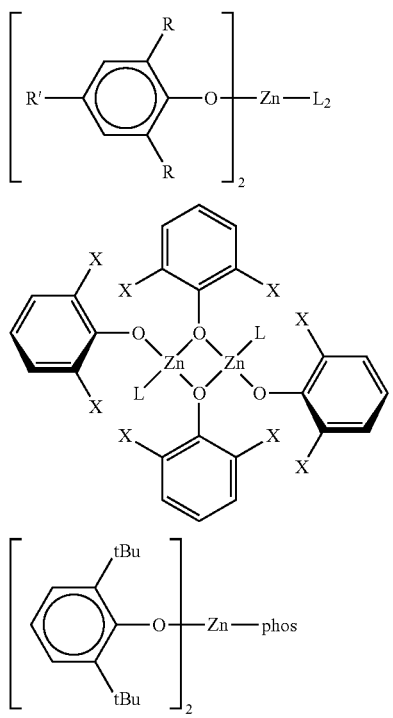

R = Ph, $^t$Bu, $^i$Pr, Me, H, F
R' = Me, H
L = Et$_2$O, THF, Pyridine a: X = F, L = THF,
b: X = Cl, L = THF,
c: X = Br, L = THF,
d: X = F, L = PCy$_3$ phos = PPh$_2$Me, PCy$_3$ ii) Schiff base zinc complex; mononuclear bis-salicylamidinato zinc catalysts: include any one of the various catalysts described in any one of: Donald J. Darensbourg, Patrick Rainey, and, and Jason Yarbrough; Inorganic chemistry 2001, 40(5), 986-993; Yonghang Xu, Min Xiao, Shuanjin Wang, Mei Pana and Yuezhong Meng; Polym. Chem. 2014, 5, 3838-3846. A typical example of this type of catalyst has the following formula:

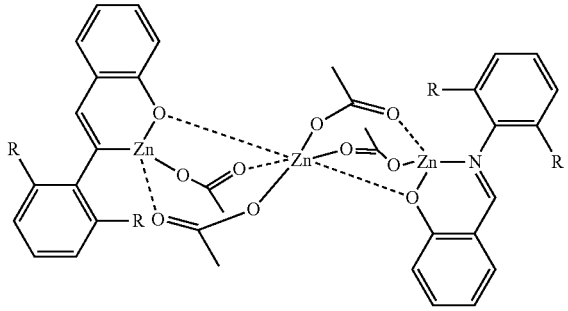

Zn$_3$(OAc)$_4$(L$_n$)$_2$ iii) Porphyrin systems (mononuclear and dinuclear metal complexes): include any one of the various catalysts described in any one of: Aida, T.; Maekawa, Y.; Asano, S.; Inoue, S. Macromolecules 1988, 21, 1195; Mang, S.; Cooper, A. I.; Colclough, M. E.; Chauhan, N.; Holmes, A. B. Macromolecules 2000, 33, 303; Darensbourg, D. J.; Yarbrough, J. C.; Ortiz, C.; Fang, C. C. J. Am. Chem. Soc. 2003, 125, 7586; Qin, Z. Q., Thomas, C. M., Lee, S., Coates, G. W. Angew. Chem. Int. Ed. 2003, 42, 5484; Paddock, R. L.; Nguyen, S. Macromolecules 2005, 38, 6251; Sugimoto, H.; Ohshima, H.; Inoue, S. J. Polym. Sci., Part A 2003, 41, 3549; Anderson, C. E., Vagin, S. I., Hammann, M., Zimmermann, L. and Rieger, B. (2013), Copolymerisation of Propylene Oxide and Carbon Dioxide by Dinuclear Cobalt Porphyrins. ChemCatChem, 5: 3269-3280. A typical example of this type of catalyst has the following formula:

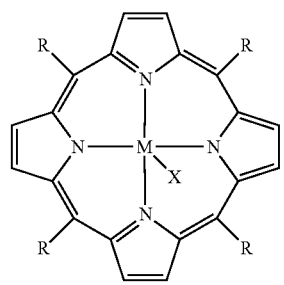

M = Al, Cr, Co, Mn
X = Cl, Br, OAc

These catalysts may be used together with aco-catalysts also described in the above citations. A typical example of aco-catalyst has the following formula:

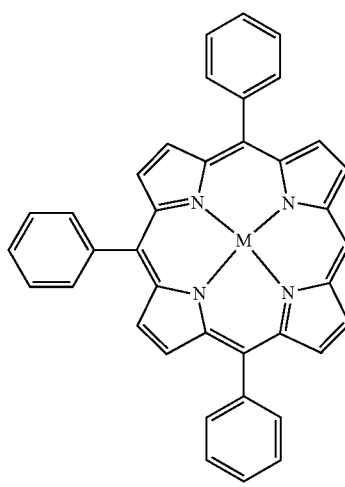
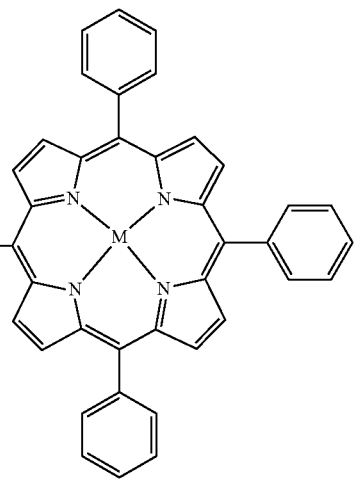

iv) β-oxo-δ-diimine (BODDI) systems (potential catalysts): include any one of the various catalysts described in any one of: Scott D Allen, David R Moore, Emil B Lobkovsky, Geoffrey W Coates, Journal of Organometallic Chemistry, Volume 683, Issue 1, 7 Oct. 2003, pp. 137-148. A typical example of this type of catalyst has the following formula:

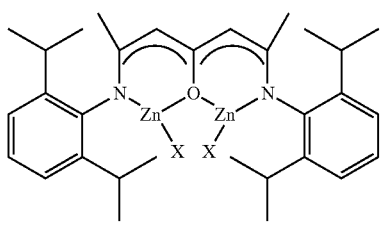

X = —OAc v) Trost's intramolecular dinuclear zinc complex: include any one of the various catalysts described in Y. Xiao, Z. Wang, K. Ding, Chem. Eur. J. (2005), p. 3668. A typical example of this type of catalyst has the following formula:

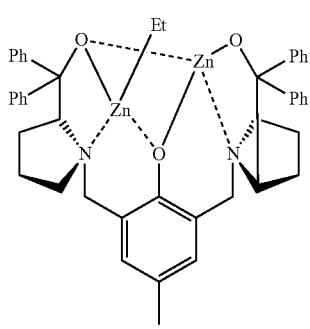

L¹Zn₂Et (semi-aza-crown)

vi) 'open' anilido-aldimine dinuclear zinc complex: include any one of the various catalysts described in any one of: B. Y. Lee, H. Y. Kwon, S. Y. Lee, S. J. Na, S. Han, H. Yun, H. Lee, Y.-W. Park; J. Am. Chem. Soc., 127 (2005), p. 3031; T. Bok, H. Yun, B. Y. Lee; Inorg. Chem., 45 (2006), p. 4228. A typical example of this type of catalyst has the following formula:

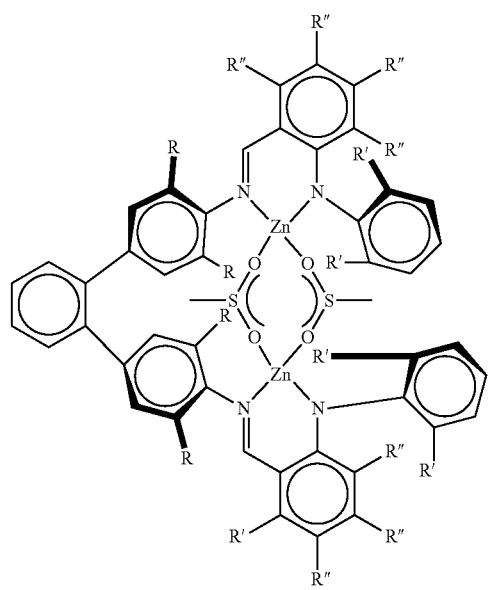

R = Me, Et, iPr
R' = Me, Et, iPr
R" = H, F vii) Dinuclear xanthdim complexes: include any one of the various catalysts described in M. F. Pilz, C. Limberg, B. B. Lazarov, K. C. Hultzsch, B. Ziemer; Organometallics, 26 (2007), p. 3668. A typical example of this type of catalyst has the following formula:

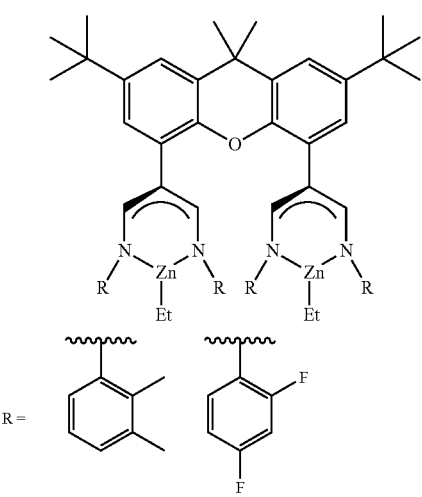

viii) Bridged dinuclear Zn-BDI complexes: include any one of the various catalysts described in D. Piesik, S. Range, S. Harder; Organometallics, 27 (2008), p. 6178. A typical example of this type of catalyst has the following formula:

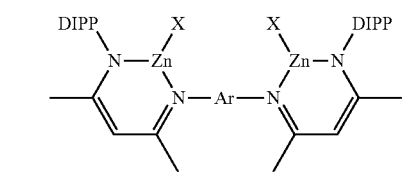

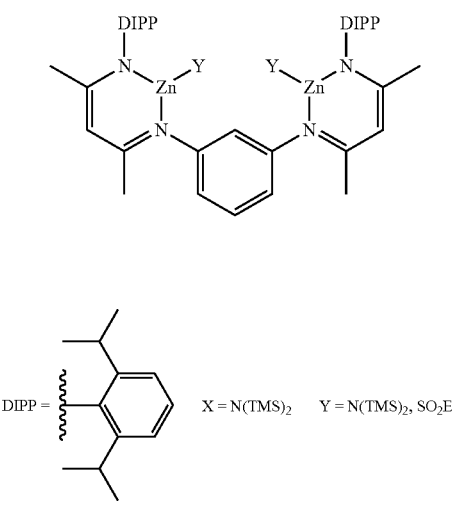

ix) reduced Robson-type dinuclear metal complexes: include any one of the various catalysts described in any one of: M. R. Kember, P. D. Knight, P. T. Reung, C. K. Williams; Angew. Chem., 121 (2009), p. 949; M. R. Kember, A. J. P. White, C. K. Williams; Inorg. Chem., 48 (2009), p. 9535; M. R. Kember, A. J. P. White, C. K. Williams; Macromolecules, 43 (2010), p. 2291; A. Buchard, M. R. Kember, K. Sandeman, C. K. Williams, Chem. Commun. 46 (2010); Michael R. Kember and Charlotte K. Williams; Journal of the American Chemical Society 2012 134 (38), 15676-15679. A typical example of this type of catalyst has the following formula:

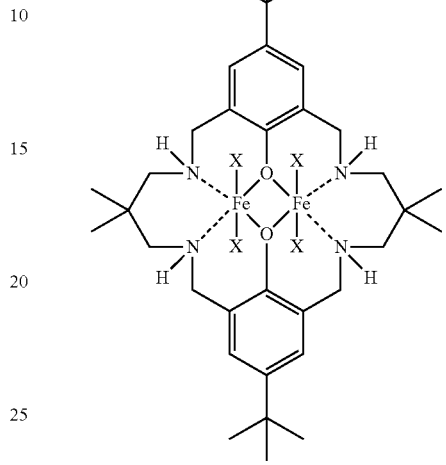

X = Cl x) Mononuclear tetraamine-iron complex: include any one of the various catalysts described in J. E. Dengler, M. W. Lehenmeier, S. Klaus, C. E. Anderson, E. Herdtweck, B. Rieger, Eur. J. Inorg. Chem. (2011) pp. 336-343. A typical example of this type of catalyst has the following formula:

xi) Immobilized salen and BDI systems: include any one of the various catalysts described in any one of: L. P. C. Nielsen, C. P. Stevenson, D. G. Blackmond, E. N. Jacobsen; J. Am. Chem. Soc., 126 (2004), p. 1360; K. Yu, C. W. Jones; Organometallics, 22 (2003), p. 2571; M. Alvaro, C. Baleizao, D. Das, E. Carbonell, J. Garcia; J. Catal., 228 (2004), p. 254; M. Alvaro, C. Baleizao, E. Carbonell, M. E. Ghoul, H. García, B. Gigante; Tetrahedron, 61 (2005), p. 12131. A typical example of this type of catalyst has the following formula:

xii) Zn(POSS) family (Polyhedral Oligomeric Silsesquioxane): include any one of the various catalysts described in any one of: Robbert Duchateau, Wouter J. van Meerendonk, Saskia Huijser, Bastiaan B. P. Staal, Marcus A. van Schilt, Gijsbert Gerritsen, Auke Meetsma, Cor E. Koning, Maartje F. Kemmere, and Jos T. F. Keurentjes; Organometallics 2007 26 (17), 4204-4211. A typical example of this type of catalyst has the following formula:

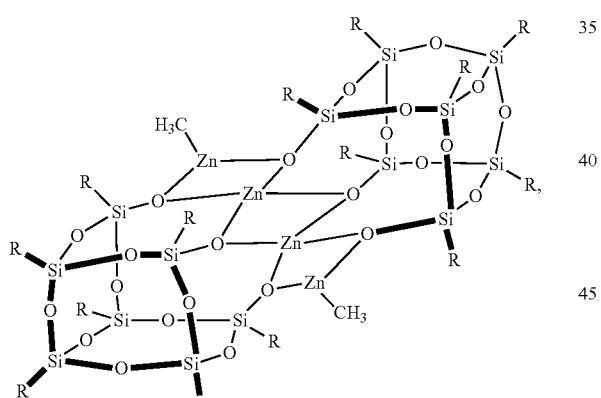

R = i-C$_4$H$_9$ xiii) Flexibly Tethered Dinuclear Zinc Complexes: include any one of the various catalysts described in any one of: Lehenmeier, M. W., Kissling, S., Altenbuchner, P. T., Bruckmeier, C., Deglmann, P., Brym, A.-K. and Rieger, B. (2013), 'Flexibly Tethered Dinuclear Zinc Complexes: A Solution to the Entropy Problem in CO$_2$/Epoxide Copolymerization Catalysis?', Angew. Chem. Int. Ed., 52, 9821-9826. A typical example of this type of catalyst has the following formula:

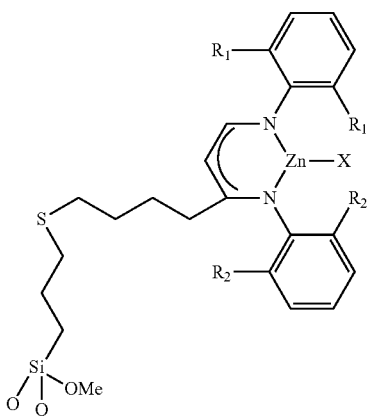

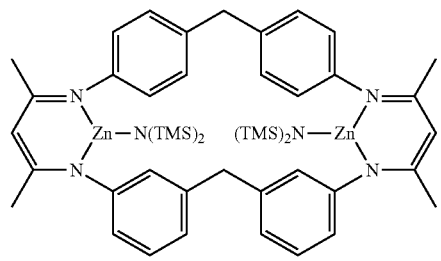

xiv) Metal-[N$_2$O$_2$] complexes (based on 1,2-phenylene-diimino-2-acrylate ligand): include any one of the various catalysts described in any one of: Fuchs, M. A., Altesleben, C., Zevaco, T. A. and Dinjus, E. (2013), An Efficient Homogeneous Chloro-Aluminum-[N$_2$O$_2$] Catalyst for the Coupling of Epoxides with Carbon Dioxide. Eur. J. Inorg. Chem., 2013, 4541-4545; M. A. Fuchs, S. Staudt, C. Altesleben, O. Walter, T. A. Zevaco and E. Dinjusa, Dalton Trans., 2014, 43, 2344-2347. A typical example of this type of catalyst has the following formula:

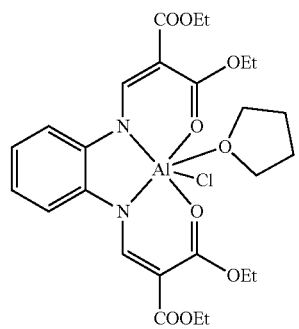

xv) Double metal cyanides: include any one of the various catalysts described in any one of: Sun, X.-K., Zhang, X.-H., Wei, R.-J., Du, B.-Y., Wang, Q., Fan, Z.-Q. and Qi, G.-R. (2012), J. Polym. Sci. A Polym. Chem., 50, 2924-2934; Donald J. Darensbourg, M. Jason Adams, Jason C. Yarbrough, and, and Andrea L. Phelps; Inorganic Chemistry 2003, 42 (24), 7809-7818. A typical example of this type of catalyst has the following formula:

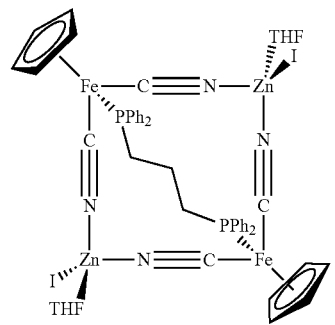

[CpFe(μ-CN)$_2$ZnI(THF)]$_2$(μ-dppp)
DMC of iron and zinc

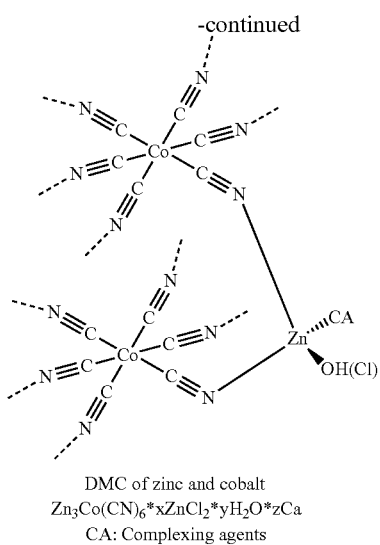

DMC of zinc and cobalt
Zn$_3$Co(CN)$_6$*xZnCl$_2$*yH$_2$O*zCa
CA: Complexing agents xvi) Dinuclear (Salen)MX (or Salan, Salophen): include any one of the various catalysts described in any one of: K. Nakano, S. Hashimotoa, K. Nozaki; Chem. Sci., 1 (2010), p. 369; S. I. Vagin, R. Reichardt, S. Klaus, B. Rieger; J. Am. Chem. Soc., 132 (2010), p. 14367. Typical examples of this type of catalyst have the following formulae:

xvii) zinc dicarboxylates: include any one of the various catalysts described in U.S. Pat. No. 5,026,676 A. A typical example of this type of catalyst has the following formula:

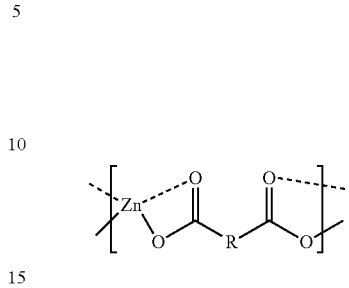

xviii) amino-triphenolate aluminum metal complexes e.g. wherein the metal is Fe or Al (see an example of said metal complex below wherein the metal is Al) with PPN-halogen co-catalyst e.g. wherein the halogen is Cl or Br or I (see an example of said co-catalyst below wherein the halogen is Cl), as disclosed in Peña Carrodeguas, L.; González-Fabra, J.; Castro-Gómez, F.; Bo, C.; Kleij, A. W., Chemistry-A European Journal, 13 Apr. 2015, 21(16):6115-6122).

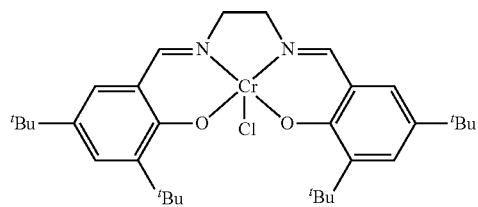

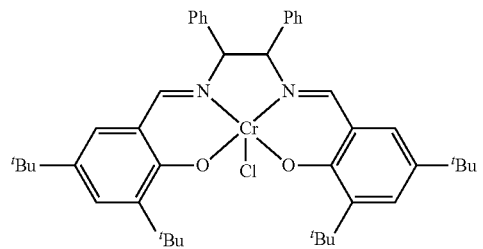

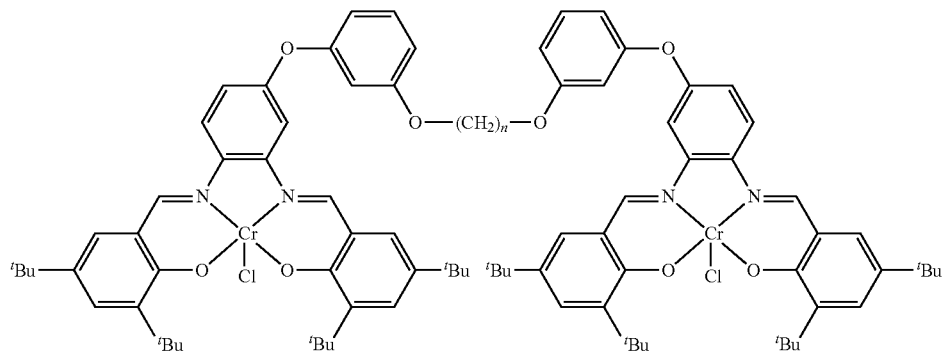

n = 3, 6

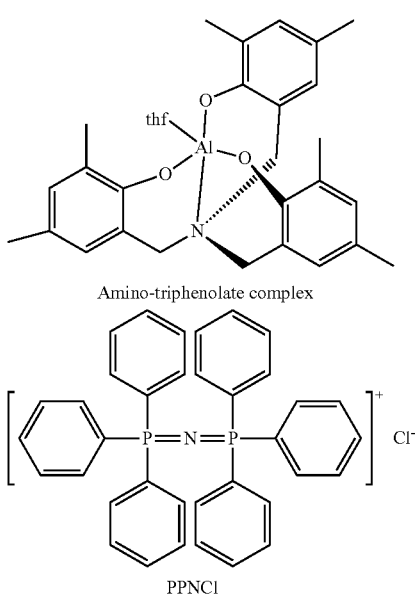

Amino-triphenolate complex

PPNCl xix) β-diketiminato zinc complexes as disclosed in any one and all of the following scientific publications: Ming Cheng, Emil B. Lobkovsky and Geoffrey W. Coates, Journal of the American Chemical Society 1998, 120 (42), 11018-11019; Cheng, M.; Darling, N. A.; Lobkovsky, E. B.; Coates, G. W. Chem. Commun. 2000, 2007-2008; Ming Cheng, David R. Moore, Joseph J. Reczek, Bradley M. Chamberlain, Emil B. Lobkovsky, and, and Geoffrey W. Coates; Journal of the American Chemical Society 2001, 123 (36), 8738-8749.

xx) (Et-BDI)Zn[N(SiMe$_3$)$_2$ is a zinc β-diiminate complex having the following formula

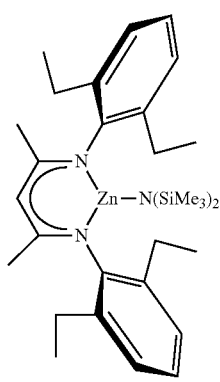

xxi) catalysts described in WO 2009/025850 A2 to G. W. Coates et al.

xxii) catalysts described in Shyeni Paul, Yunqing Zhu, Charles Romain, Rachel Brooks, Prabhjot K. Saini and Charlotte K. Williams in Chem. Commun., 2015, 51, 6459.

xxiii) catalysts described in Jozef Lust and ZdenM Mahdsek, Makromol. Chem. 181, 545-555 (1980) 545, (describing i.e. cetyl trimethylammonium bromide).

xxiv) catalysts described in Lin Qiang, Guo Zhifang, Pan Lisha and Xiang Xue in Catalysis Communications 64 (2015), pp. 114-118.

xxv) catalysts described in Elham Hosseini Nejad, Anita Paoniasari, Carlo G. W. van Melis, Cor E. Koning, and Rob Duchateau in Macromolecules 2013, 46, 631-637.

xxvi) catalysts described in Xue-Ke Sun, Xing-Hong Zhang, Shang Chen, Bin-Yang Du, Qi Wang, Zhi-Qiang Fan and Guo-Rong Qi in Polymer 51 (2010), pp. 5719-5725.

xxvii) tertiary amines e.g. supplied under Armeen®.

xxviii) ammonium salts e.g. hexadecyltrimethylammonium bromide, tetramethyl ammonium bromide, tetramethyl ammonium fluoride, tetramethyl ammonium acetate, tetramethyl ammonium chloride, cetyltrimethylammonium chloride or cetyltrimethylammonium bromide.

xxix) phosphines e.g. triphenylphosphine.

xxx) phosphonium salts e.g. triphenyl ethyl ammonium phosphine.

xxxi) potassium acetate and potassium methoxide, potassium stearate, potassium octanoate, sodium chloride, potassium chloride, cesium acetate, sodium acetate, lithium acetate, titanium(IV)isopropoxide, titanium (IV)butoxide, potassium hydroxide, triazabicyclodecene.

Certain moieties, species, groups, units, compounds, polymers, materials, mixtures, compositions and/or formulations which comprise and/or are used in some or all of the invention as described herein may exist as one or more different forms such as any of those in the following non exhaustive list: tautomers e.g. keto and/or enol forms; isomers such as constitutional (structural) isomers, stereoisomers (spatial isomers) such as i) enantiomers, and ii) diastereomers (geometric isomers) such as cis/trans, E/Z and R/S isomers and conformers such as rotamers; tautomers. The invention comprises and/or uses all such forms which are effective as defined herein.

The term 'suitable for' (for example with reference to any process, use, method, application, preparation, product, material, formulation, compound, composition, monomer, oligomer, polymer precursor, and/or polymers of the present invention and/or described herein as appropriate) will be understood to refer to those features of the invention which if used in the correct manner provide the required properties to that which they are added and/or incorporated to be of utility as described herein. Such utility may be direct for example where a material has the required properties for the aforementioned uses and/or indirect for example where a material has use as a synthetic intermediate and/or diagnostic tool in preparing other materials of direct utility. As used herein these terms also denote that a functional group is compatible with producing suitable end products.

The term 'comprising' as used herein means that the list that immediately follows is non-exhaustive and may or may not include any other additional suitable items, for example one or more further feature(s), component(s) and/or substituent(s) as appropriate. The term 'comprising' will be used interchangeably with the term 'containing'. 'Substantially comprising' or 'essentially consisting of' as used herein means a component or list of component(s) is present in a given material in an amount greater than or equal to about 90% w/w, preferably greater than or equal to 95% w/w, more preferably greater than or equal to 98% w/w, even more preferably greater than or equal to 99% w/w of the total amount of the given material.

By the term 'consisting of' (or equally 'consists of') when referring to a composition (of matter) is meant herein that the list that follows is exhaustive and does not include additional items.

By the term a 'polymer consisting of' or equally a 'polymer consists of' (referring to a polymer according to the invention as disclosed herein) is meant herein that the MRQ of said polymer is at least 1 and at most 1.2, preferably at least 1 and at most 1.1, preferably at least 1 and at most 1.08, more preferably at least 1 and at most 1.06, even more preferably at least 1 and at most 1.05, most preferably at least 1 and at most 1.04, especially at least 1 and at most 1.03, more especially at least 1 and at most 1.02, most especially at least 1 and at most 1.01. For example if a 'polymer consists of' one or more S1 units, is meant herein that said polymer comprises one or more S1 units and the MRQ of said polymer is at least 1 and at most 1.1, preferably at least 1 and at most 1.08, more preferably at least 1 and at most 1.06, even more preferably at least 1 and at most 1.05, most preferably at least 1 and at most 1.04, especially at least 1 and at most 1.03, more especially at least 1 and at most 1.02, most especially at least 1 and at most 1.01. For example if a 'polymer consists of': i) one or more S1 units, and ii) one or more S2 units, is meant herein that said polymer comprises: i) one or more S1 units and ii) one or more S2 units and that the MRQ of said polymer is at least 1 and at most 1.1, preferably at least 1 and at most 1.08, more preferably at least 1 and at most 1.06, even more preferably at least 1 and at most 1.05, most preferably at least 1 and at most 1.04, especially at least 1 and at most 1.03, more especially at least 1 and at most 1.02, most especially at least 1 and at most 1.01. Equally, any reference to a Polymer having a MRQ of at least 1 and at most 1.1, preferably at least 1 and at most 1.08, more preferably at least 1 and at most 1.06, even more preferably at least 1 and at most 1.05, most preferably at least 1 and at most 1.04, especially at least 1 and at most 1.03, more especially at least 1 and at most 1.02, most especially at least 1 and at most 1.01, signifies that said Polymer consists of those units to which said Polymer is associated with as the case may be.

By the term 'PolymerCS' is meant herein a Polymer that has a MRQ of at least 1 and at most 1.2, preferably at least 1 and at most 1.1, preferably at least 1 and at most 1.08, more preferably at least 1 and at most 1.06, even more preferably at least 1 and at most 1.05, most preferably at least 1 and at most 1.04, especially at least 1 and at most 1.03, more especially at least 1 and at most 1.02, most especially at least 1 and at most 1.01.

It will be understood that the total sum of any quantities expressed herein as percentages cannot (allowing for rounding errors) exceed 100%. However where a list of monomers used for the preparation of the Polymer or where a list of components of the Binder, or of the Composition is non-exhaustive, the sum of the percentage for each of such components may be less than 100% to allow a certain percentage for additional amount(s) of any additional component(s) that may not be explicitly described herein.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in the Definitions section can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

Unless the context clearly indicates otherwise, as used herein plural forms of the terms herein (for example Polymer, Composition, Binder, copolymerizable agent, heteroatom, unsaturation, ethylenic unsaturation, etc.) are to be construed as including the singular form and vice versa.

For clarity, any reference herein to the amounts of organic metal salt, thermal initiator, and photoinitiator refers to the chemical substances per se (neat chemical substance) and not to their mixtures with any carrier material for example water, silica, etc., or their solutions in other chemical substances for example organic solvents, in which they are typically being supplied in the market.

The wavy lines shown in any one the formulae shown in section 1 of the description signify that the molecular structure of the part of the Polymer beyond the point indicated by the wavy line is unimportant and it is not specified.

The decimal separator in numbers (also known as the radix character) is indicated with a comma (','). The group of thousands in a number is indicated with a period ('.').

1. The Polymer of the Invention ('Polymer')

Any and all of the polymers disclosed in this section are collectively referred to—in the whole of the application—as the Polymer. By 'Polymer' is meant herein a polymer according to the invention. The term 'Polymer' as used herein includes any and all of its preferments, combinations of its features and ranges as well as combinations of any and all of its preferments with any and all of the combinations of its features and ranges. Thus, any and all of the polymers disclosed in this section includes any and all of their preferments, combinations of their features and ranges as well as combinations of any and all of their preferments with any and all of the combinations of their features and ranges, are collectively referred to—in the whole of the application—as the Polymer.

The Polymer may be solid or liquid.

Preferably the polymer has one or both of: i) functional groups and ii) ionic functional groups. Thus, preferably the Polymer is one or both of: i) a functional polymer and ii) an ionic polymer.

Preferably, the Polymer is able to react with one or both of copolymerizable polymer and copolymerizable agent.

Preferably, the Polymer is able to self-crosslink.

1.1 Broadly in accordance with the invention, there is provided a polymer having:
  a) an acid value (AV) measured titrimetrically according to ISO 2114 of at least 105 and at most 180 mg KOH/g, and
  b) a glass transition temperature ($T_g$) measured via Differential Scanning Calorimetry as described in the description of at least 30 and at most 140° C.

and wherein the polymer comprises one or more units selected from the group consisting of S1, S2, S3 S4, and combinations thereof, wherein each of S1, S2, S3, and S4 is represented by the following corresponding formula:

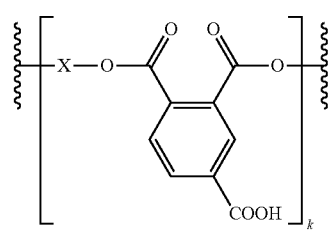

S1

-continued

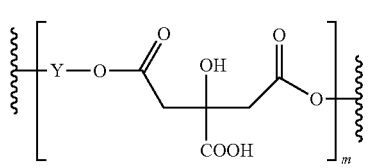 S2

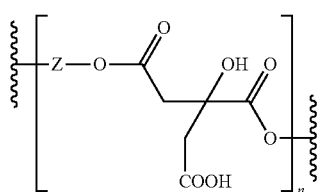 S3

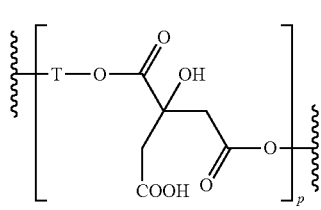 S4 wherein
- i) k is an integer equal to or higher than 0, and
- ii) m is an integer equal to or higher than 0, and
- iii) n is an integer equal to or higher than 0, and
- iv) p is an integer equal to or higher than 0, and
- v) the sum of k, m, n and p is equal to or higher than 1, and
- vi) X is selected from the group consisting of L4, L6, L7, L8, L9, L10, L11, L12, L13, L18, L19, L20, L23, L24, L25, L26, L27, L28, L29, L30, and L31 as each of L4 to L31 is defined below, and wherein the black bold dots shown in the formulae of any one of L4 to L31 represent the attachment points of each of L4 to L31 to the S1, and wherein the attachment points are carbon atoms,
- vii) Y is selected from the group consisting of L4, L6, L7, L8, L9, L10, L11, L12, L13, L18, L19, L20, L23, L24, L25, L26, L27, L28, L29, L30, and L31 as each of L4 to L31 is defined below, and wherein the black bold dots shown in the formulae of any one of L4 to L31 represent the attachment points of each of L4 to L31 to the S2, and wherein the attachment points are carbon atoms,
- viii) Z is selected from the group consisting of L4, L6, L7, L8, L9, L10, L11, L12, L13, L18, L19, L20, L23, L24, L25, L26, L27, L28, L29, L30, and L31 as each of L4 to L31 is defined below, and wherein the black bold dots shown in the formulae of any one of L4 to L31 represent the attachment points of each of L4 to L31 to the S3, and wherein the attachment points are carbon atoms,
- ix) T is selected from the group consisting of L4, L6, L7, L8, L9, L10, L11, L12, L13, L18, L19, L20, L23, L24, L25, L26, L27, L28, L29, L30, and L31 as each of L4 to L31 is defined below, and wherein the black bold dots shown in the formulae of any one of L4 to L31 represent the attachment points of each of L4 to L31 to the S4, and wherein the attachment points are carbon atoms,

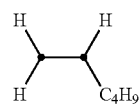 L4

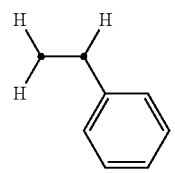 L6

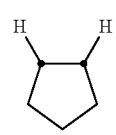 L7

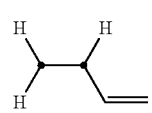 L8

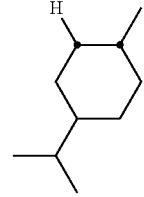 L9

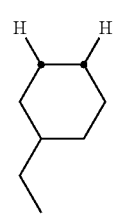 L10

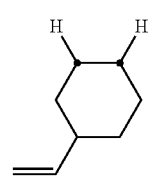 L11

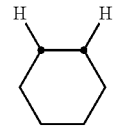 L12

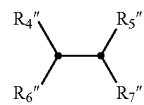 L13

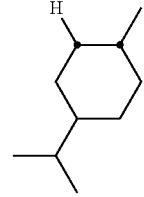 L18

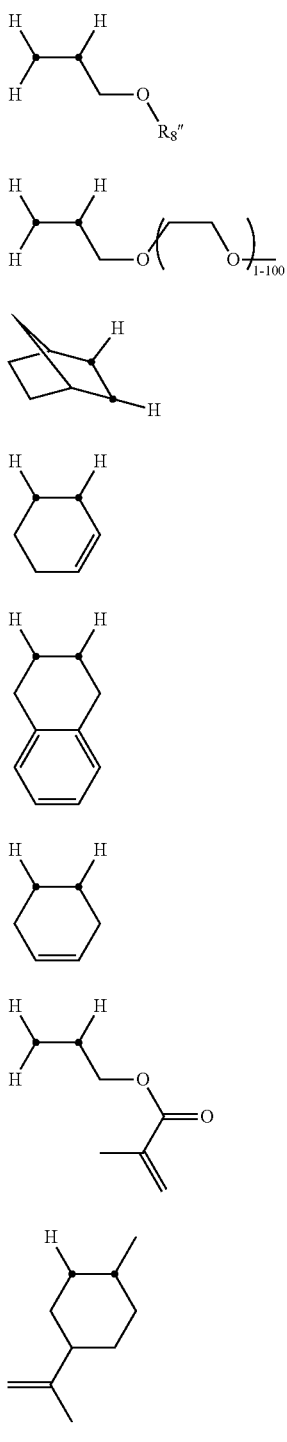

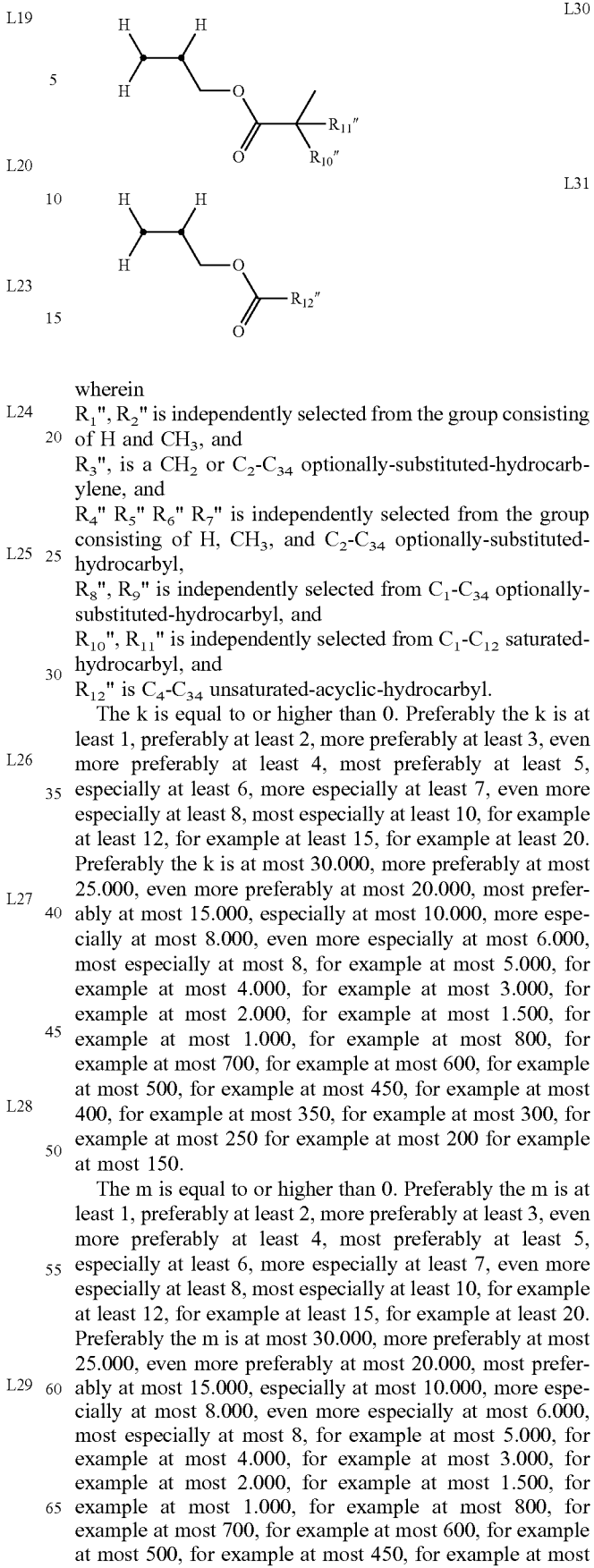

wherein $R_1''$, $R_2''$ is independently selected from the group consisting of H and $CH_3$, and $R_3''$, is a $CH_2$ or $C_2$-$C_{34}$ optionally-substituted-hydrocarbylene, and $R_4''$ $R_5''$ $R_6''$ $R_7''$ is independently selected from the group consisting of H, $CH_3$, and $C_2$-$C_{34}$ optionally-substituted-hydrocarbyl, $R_8''$, $R_9''$ is independently selected from $C_1$-$C_{34}$ optionally-substituted-hydrocarbyl, and $R_{10}''$, $R_{11}''$ is independently selected from $C_1$-$C_{12}$ saturated-hydrocarbyl, and $R_{12}''$ is $C_4$-$C_{34}$ unsaturated-acyclic-hydrocarbyl.

The k is equal to or higher than 0. Preferably the k is at least 1, preferably at least 2, more preferably at least 3, even more preferably at least 4, most preferably at least 5, especially at least 6, more especially at least 7, even more especially at least 8, most especially at least 10, for example at least 12, for example at least 15, for example at least 20. Preferably the k is at most 30.000, more preferably at most 25.000, even more preferably at most 20.000, most preferably at most 15.000, especially at most 10.000, more especially at most 8.000, even more especially at most 6.000, most especially at most 8, for example at most 5.000, for example at most 4.000, for example at most 3.000, for example at most 2.000, for example at most 1.500, for example at most 1.000, for example at most 800, for example at most 700, for example at most 600, for example at most 500, for example at most 450, for example at most 400, for example at most 350, for example at most 300, for example at most 250 for example at most 200 for example at most 150.

The m is equal to or higher than 0. Preferably the m is at least 1, preferably at least 2, more preferably at least 3, even more preferably at least 4, most preferably at least 5, especially at least 6, more especially at least 7, even more especially at least 8, most especially at least 10, for example at least 12, for example at least 15, for example at least 20. Preferably the m is at most 30.000, more preferably at most 25.000, even more preferably at most 20.000, most preferably at most 15.000, especially at most 10.000, more especially at most 8.000, even more especially at most 6.000, most especially at most 8, for example at most 5.000, for example at most 4.000, for example at most 3.000, for example at most 2.000, for example at most 1.500, for example at most 1.000, for example at most 800, for example at most 700, for example at most 600, for example at most 500, for example at most 450, for example at most 400, for example at most 350, for example at most 300, for example at most 250 for example at most 200 for example at most 150.

The n is equal to or higher than 0. Preferably the n is at least 1, preferably at least 2, more preferably at least 3, even more preferably at least 4, most preferably at least 5, especially at least 6, more especially at least 7, even more especially at least 8, most especially at least 10, for example at least 12, for example at least 15, for example at least 20. Preferably the n is at most 30.000, more preferably at most 25.000, even more preferably at most 20.000, most preferably at most 15.000, especially at most 10.000, more especially at most 8.000, even more especially at most 6.000, most especially at most 8, for example at most 5.000, for example at most 4.000, for example at most 3.000, for example at most 2.000, for example at most 1.500, for example at most 1.000, for example at most 800, for example at most 700, for example at most 600, for example at most 500, for example at most 450, for example at most 400, for example at most 350, for example at most 300, for example at most 250 for example at most 200 for example at most 150.

The p is equal to or higher than 0. Preferably the p is at least 1, preferably at least 2, more preferably at least 3, even more preferably at least 4, most preferably at least 5, especially at least 6, more especially at least 7, even more especially at least 8, most especially at least 10, for example at least 12, for example at least 15, for example at least 20. Preferably the p is at most 30.000, more preferably at most 25.000, even more preferably at most 20.000, most preferably at most 15.000, especially at most 10.000, more especially at most 8.000, even more especially at most 6.000, most especially at most 8, for example at most 5.000, for example at most 4.000, for example at most 3.000, for example at most 2.000, for example at most 1.500, for example at most 1.000, for example at most 800, for example at most 700, for example at most 600, for example at most 500, for example at most 450, for example at most 400, for example at most 350, for example at most 300, for example at most 250 for example at most 200 for example at most 150.

The p is equal to or higher than 0. Preferably the p is at least 1, preferably at least 2, more preferably at least 3, even more preferably at least 4, most preferably at least 5, especially at least 6, more especially at least 7, even more especially at least 8, most especially at least 10, for example at least 12, for example at least 15, for example at least 20. Preferably the p is at most 30.000, more preferably at most 25.000, even more preferably at most 20.000, most preferably at most 15.000, especially at most 10.000, more especially at most 8.000, even more especially at most 6.000, most especially at most 8, for example at most 5.000, for example at most 4.000, for example at most 3.000, for example at most 2.000, for example at most 1.500, for example at most 1.000, for example at most 800, for example at most 700, for example at most 600, for example at most 500, for example at most 450, for example at most 400, for example at most 350, for example at most 300, for example at most 250 for example at most 200 for example at most 150.

The sum of k, m, n and p (abbreviated as KMNP) is equal to or higher than 1. Preferably the KMNP is at least 2, more preferably at least 3, even more preferably at least 4, most preferably at least 5, especially at least 6, more especially at least 7, even more especially at least 8, most especially at least 10, for example at least 12, for example at least 15, for example at least 20. Preferably the KMNP is at most 30.000, more preferably at most 25.000, even more preferably at most 20.000, most preferably at most 15.000, especially at most 10.000, more especially at most 8.000, even more especially at most 6.000, most especially at most 8, for example at most 5.000, for example at most 4.000, for example at most 3.000, for example at most 2.000, for example at most 1.500, for example at most 1.000, for example at most 800, for example at most 700, for example at most 600, for example at most 500, for example at most 450, for example at most 400, for example at most 350, for example at most 300, for example at most 250 for example at most 200 for example at most 150.

1.2 Preferably the polymer comprises: i) at least one or more S1 units wherein each S1 is as disclosed in paragraph 1.1, and ii) at least one or more units selected from the group consisting of S2, S3 and S4, and combinations thereof, wherein each S2, each S3 and each S4 is as disclosed in paragraph 1.1.

1.3 Preferably the polymer comprises: i) at least one or more S1 units wherein each S1 is as disclosed in paragraph 1.1, and ii) at least one or more S2 units, wherein each S2 is as disclosed in paragraph 1.1

1.4 Preferably the polymer comprises: i) at least one or more S1 units wherein each S1 is as disclosed in paragraph 1.1, and ii) at least one or more S3 units wherein each S3 is as disclosed in paragraph 1.1.

1.5 Preferably the polymer comprises: i) at least one or more S1 units wherein each S1 is as disclosed in paragraph 1.1, and ii) at least one or more S4 units wherein each S4 is as disclosed in paragraph 1.1.

1.6 Preferably the polymer comprises: i) at least one or more S2 units wherein each S2 is as disclosed in paragraph 1.1, and ii) at least one or more units selected from the group consisting of S1, S3 and S4, and combinations thereof, wherein each S1, each S3 and each S4 is as disclosed in paragraph 1.1.

1.7 Preferably the polymer comprises: i) at least one or more S2 units wherein each S2 is as disclosed in paragraph 1.1, and ii) at least one or more S3 units, wherein each S3 is as disclosed in paragraph 1.1.

1.8 Preferably the polymer comprises: i) at least one or more S2 units wherein each S2 is as disclosed in paragraph 1.1, and ii) at least one or more S4 units wherein each S4 is as disclosed in paragraph 1.1.

1.9 Preferably the polymer comprises: i) at least one or more S3 units wherein each S3 is as disclosed in paragraph 1.1, and ii) at least one or more units selected from the group consisting of S1, S2 and S4, and combinations thereof, wherein each S1, each S2 and each S4 is as disclosed in paragraph 1.1.

1.10 Preferably the polymer comprises: i) at least one or more S3 units wherein each S3 is as disclosed in paragraph 1.1, and ii) at least one or more units S4 wherein each S4 is as disclosed in paragraph 1.1.

1.11 Preferably the polymer comprises: i) at least one or more S4 units wherein each S4 is as disclosed in paragraph 1.1, and ii) at least one or more units selected from the group consisting of S1, S2 and S3 and combinations thereof, wherein each S1, each S2 and each S3 is as disclosed in paragraph 1.1.

1.12 Preferably the polymer comprises: i) at least one or more units selected from the group consisting of S1, S2, and combinations thereof, wherein each S1 and each S2 is as disclosed in paragraph 1.1, and ii) at least one or more S3 in any possible combination with S1 and S2, wherein each of S3 is as disclosed in paragraph 1.1.

1.13 Preferably the polymer comprises: i) at least one or more units selected from the group consisting of S1, S2, and combinations thereof, wherein each S1 and each S2 is as disclosed in paragraph 1.1, and ii) at least one or more S4 units in any possible combination with S1 and S2, wherein each S4 is as disclosed in paragraph 1.1.

1.14 Preferably the polymer comprises: i) at least one or more units selected from the group consisting of S1, S3 and combinations thereof, wherein each S1 and each S3 is as disclosed in paragraph 1.1, and ii) at least one or more S2 units in any possible combination with S1 and S3, wherein each S2 is as disclosed in paragraph 1.1.

1.15 Preferably the polymer comprises: i) at least one or more units selected from the group consisting of S1, S3, and combination thereof, wherein each S1 and each S3 is as disclosed in paragraph 1.1, and ii) at least one or more units S4 units in any possible combination with S1 and S3, wherein each S4 is as disclosed in paragraph 1.1.

1.16 Preferably the polymer comprises: i) at least one or more units selected from the group consisting of S1, S4, and combinations thereof, wherein each S1 and each S4 is as disclosed in paragraph 1.1, and ii) at least one or more S2 units in any possible combination with S1 and S4, wherein each S2 is as disclosed in paragraph 1.1.

1.17 Preferably the polymer comprises: i) at least one or more units selected from the group consisting of S1, S4, and combinations thereof, wherein each S1 and each S4 is as disclosed in paragraph 1.1, and ii) at least one or more S3 units in any possible combination with S1 and S4, wherein each S3 is as disclosed in paragraph 1.1.

1.18 Preferably the polymer comprises: i) at least one or more units selected from the group consisting of S2, S3, and combinations thereof, wherein each S2 and each S3 is as disclosed in paragraph 1.1, and ii) at least one or more S1 units in any possible combination with S2 and S3, wherein each S1 is as disclosed in paragraph 1.1.

1.19 Preferably the polymer comprises: i) at least one or more units selected from the group consisting of S2, S3, and combinations thereof, wherein each S2 and each S3 is as disclosed in paragraph 1.1, and ii) at least one or more S4 units in any possible combination with S2 and S3, wherein each S4 is as disclosed in paragraph 1.1.

1.20 Preferably the polymer comprises: i) at least one or more units selected from the group consisting of S3, S4, and combinations thereof, wherein each S3 and each S4 is as disclosed in paragraph 1.1, and ii) at least one or more S1 units in any possible combination with S3 and S4, wherein each S1 is as disclosed in paragraph 1.1.

1.21 Preferably the polymer comprises: i) at least one or more units selected from the group consisting of S3, S4, and combinations thereof, wherein each S3 and each S4 is as disclosed in paragraph 1.1, and ii) at least one or more S2 units in any possible combination with S3 and S4, wherein each S2 is as disclosed in paragraph 1.1.

1.22 Preferably the polymer comprises: i) at least one or more of units S1, wherein each S1 is as disclosed in paragraph 1.1, and ii) at least one or more of units S2, wherein each S2 is as disclosed in paragraph 1.1, and iii) at least one or more units S3, wherein each S3 is as disclosed in paragraph 1.1, and iv) at least one or more units S4, wherein each S4 is as disclosed in paragraph 1.1 and wherein i) and ii) and iii) and iv) may exist in any possible combination.

1.23 Preferably the polymer comprises at least one or more units selected from the group consisting of S2, S3, S4, and combinations thereof, wherein each S2 and each S3 and each S4 is as disclosed in paragraph 1.1, and wherein the polymer does not comprise any S1 units.

1.24 Preferably the polymer comprises at least one or more units selected from the group consisting of S1, S3, S4, and combinations thereof, wherein each S1 and each S3 and each S4 is as disclosed in paragraph 1.1, and wherein the polymer does not comprise any S2 units.

1.25 Preferably the polymer comprises at least one or more units selected from the group consisting of S1, S2, S4, and combinations thereof, wherein each S1 and each S2 and each S4 is as disclosed in paragraph 1.1, and wherein the polymer does not comprise any S3 units.

1.26 Preferably the polymer comprises at least one or more units selected from the group consisting of S1, S2, S3, and combinations thereof, wherein each S1 and each S2 and each S3 is as disclosed in paragraph 1.1, and wherein the polymer does not comprise any S4 units.

1.27 Preferably the polymer comprises at least one or more S1 units wherein each S1 is as disclosed in paragraph 1.1, and wherein the polymer does not comprise any one of S2, S3 and S4 units.

1.28 Preferably the polymer comprises at least one or more S2 units wherein each S2 is as disclosed in paragraph 1.1, and wherein the polymer does not comprise any one of S1, S3 and S4 units.

1.29 Preferably the polymer comprises at least one or more S3 units wherein each S3 is as disclosed in paragraph 1.1, and wherein the polymer does not comprise any one of S1, S2 and S4 units.

1.30 Preferably the polymer comprises at least one or more S4 units wherein each S4 is as disclosed in paragraph 1.1, and wherein the polymer does not comprise any one of S1, S2 and S3 units.

1.31 Preferably the polymer comprises: i) one or more S1 units wherein each S1 is as disclosed in paragraph 1.1, and ii) one or more S2 units wherein each S2 is as disclosed in paragraph 1.1, and wherein at least one S1 and at least one S2 are directly connected to each other as shown below:

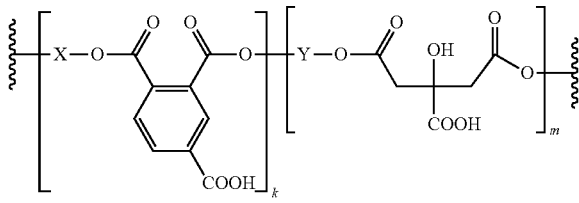

Any one of the preferments disclosed for S1 in paragraph 1.1 may be combined with any one of the preferments disclosed for S2 paragraph 1.1. Any one of the preferments disclosed for the polymer in any one of the paragraphs 1.1 to 1.30 and are in connection with S1 and S2, can be combined with the disclosure in this paragraph.

1.32 Preferably the polymer comprises: i) one or more S1 units wherein each S1 is as disclosed in paragraph 1.1, and ii) one or more S3 units wherein each S3 is as disclosed in paragraph 1.1, and wherein at least one S1 and at least one S3 are directly connected to each other as shown below:

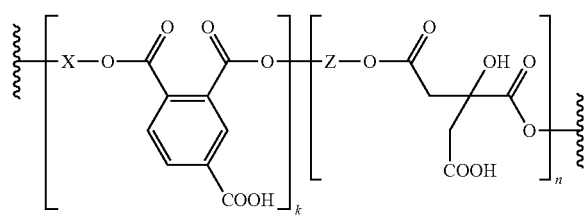

Any one of the preferments disclosed for S1 in paragraph 1.1 may be combined with any one of the preferments disclosed for S3 paragraph 1.1. Any one of the preferments disclosed for the polymer in any one of the paragraphs 1.1 to 1.30 and are in connection with S1 and S3, can be combined with the disclosure in this paragraph.

1.33 Preferably the polymer comprises: i) one or more S1 units wherein each S1 is as disclosed in paragraph 1.1, and ii) one or more S4 units wherein each S4 is as disclosed in paragraph 1.1, and wherein at least one S1 and at least one S4 are directly connected to each other as shown below:

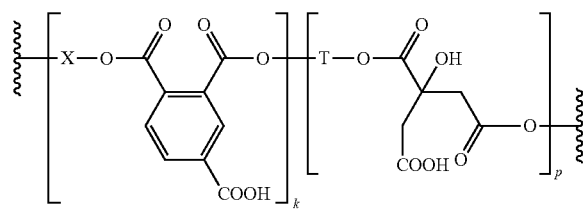

Any one of the preferments disclosed for S1 in paragraph 1.1 may be combined with any one of the preferments disclosed for S4 paragraph 1.1. Any one of the preferments disclosed for the polymer in any one of the paragraphs 1.1 to 1.30 and are in connection with S1 and S4, can be combined with the disclosure in this paragraph.

1.34 Preferably the polymer is as disclosed in any one of paragraphs 1.1 to 1.33, wherein the polymer has a MRQ of at least 1 and at most 1.000.

1.35 Preferably the polymer is as disclosed in any one of paragraphs 1.1 to 1.33, wherein the polymer has a MRQ of at least 1 and at most 200.

1.36 Preferably the polymer is as disclosed in any one of paragraphs 1.1 to 1.33, wherein the polymer has a MRQ of at least 1 and at most 100.

1.37 Preferably the polymer is as disclosed in any one of paragraphs 1.1 to 1.33, wherein the polymer has a MRQ of at least 1 and at most 25.

1.38 Preferably the polymer is as disclosed in any one of paragraphs 1.1 to 1.33, wherein the polymer has a MRQ of at least 1 and at most 22.

1.39 Preferably the polymer is as disclosed in any one of paragraphs 1.1 to 1.33, wherein the polymer has a MRQ of at least 1 and at most 17.

1.40 Preferably the polymer is as disclosed in any one of paragraphs 1.1 to 1.33, wherein the polymer has a MRQ of at least 1 and at most 15.

1.41 Preferably the polymer is as disclosed in any one of paragraphs 1.1 to 1.33, wherein the polymer has a MRQ of at least 1 and at most 13.

1.42 Preferably the polymer is as disclosed in any one of paragraphs 1.1 to 1.33, wherein the polymer has a MRQ of at least 1 and at most 11.

1.43 Preferably the polymer is as disclosed in any one of paragraphs 1.1 to 1.33, wherein the polymer has a MRQ of at least 1 and at most 9.

1.44 Preferably the polymer is as disclosed in any one of paragraphs 1.1 to 1.33, wherein the polymer has a MRQ of at least 1 and at most 7.5.

1.45 Preferably the polymer is as disclosed in any one of paragraphs 1.1 to 1.33, wherein the polymer has a MRQ of at least 1 and at most 6.

1.46 Preferably the polymer is as disclosed in any one of paragraphs 1.1 to 1.33, wherein the polymer has a MRQ of at least 1 and at most 5.

1.47 Preferably the polymer is as disclosed in any one of paragraphs 1.1 to 1.33, wherein the polymer has a MRQ of at least 1 and at most 4.3.

1.48 Preferably the polymer is as disclosed in any one of paragraphs 1.1 to 1.33, wherein the polymer has a MRQ of at least 1 and at most 3.8.

1.49 Preferably the polymer is as disclosed in any one of paragraphs 1.1 to 1.33, wherein the polymer has a MRQ of at least 1 and at most 3.5.

1.50 Preferably the polymer is as disclosed in any one of paragraphs 1.1 to 1.33, wherein the polymer has a MRQ of at least 1 and at most 3.2.

1.51 Preferably the polymer is as disclosed in any one of paragraphs 1.1 to 1.33, wherein the polymer has a MRQ of at least 1 and at most 2.5.

1.52 Preferably the polymer is as disclosed in any one of paragraphs 1.1 to 1.33, wherein the polymer has a MRQ of at least 1 and at most 2.

1.53 Preferably the polymer is as disclosed in any one of paragraphs 1.1 to 1.33, wherein the polymer has a MRQ of at least 1 and at most 1.7, preferably at most 1.5.

1.54 Preferably the polymer is as disclosed in any one of paragraphs 1.1 to 1.33, wherein the polymer has a MRQ of at least 1 and at most 1.3.

1.55 Preferably the polymer is as disclosed in any one of paragraphs 1.1 to 1.33, wherein the polymer has a MRQ of at least 1 and at most 1.2.

1.56 Preferably the polymer is as disclosed in any one of paragraphs 1.1 to 1.33, wherein the polymer has a MRQ of at least 1 and at most 1.08.

1.57 Preferably the polymer is as disclosed in any one of paragraphs 1.1 to 1.33, wherein the polymer has a MRQ of at least 1 and at most 1.05 preferably at most 1.03.

1.58 Preferably the polymer is as disclosed in any one of paragraphs 1.1 to 1.33, wherein the polymer has a MRQ of at least 1 and at most 1.02.

1.59 Preferably the polymer is as disclosed in any one of paragraphs 1.1 to 1.33, wherein the polymer has a MRQ of at least 1 and at most 1.01.

1.60 Preferably the polymer is as disclosed in any one of paragraphs 1.1 to 1.33, wherein the polymer has a MRQ equal to 1.

1.61 Preferably the polymer consists of units selected from the group consisting of S1, S2, S3, S4 and combinations thereof, wherein each S1, each S2, each S3 and each S4 is as disclosed in paragraph 1.1.

1.62 Preferably the polymer consists of: i) at least one or more S1 units wherein each S1 is as disclosed in paragraph 1.1, and ii) at least one or more units selected from the group consisting of S2, S3 and S4, and combinations thereof, wherein each S2, each S3 and each S4 is as disclosed in paragraph 1.1.

1.63 Preferably the polymer consists of: i) at least one or more S1 units wherein each S1 is as disclosed in paragraph 1.1, and ii) at least one or more S2 units, wherein each S2 is as disclosed in paragraph 1.1

1.64 Preferably the polymer consists of: i) at least one or more S1 units wherein each S1 is as disclosed in paragraph 1.1, and ii) at least one or more S3 units wherein each S3 is as disclosed in paragraph 1.1.

1.65 Preferably the polymer consists of: i) at least one or more S1 units wherein each S1 is as disclosed in paragraph 1.1, and ii) at least one or more S4 units wherein each S4 is as disclosed in paragraph 1.1.

1.66 Preferably the polymer consists of: i) at least one or more S2 units wherein each S2 is as disclosed in paragraph 1.1, and ii) at least one or more units selected from the group consisting of S1, S3 and S4, and combinations thereof, wherein each S1, each S3 and each S4 is as disclosed in paragraph 1.1.

1.67 Preferably the polymer consists of: i) at least one or more S2 units wherein each S2 is as disclosed in paragraph 1.1, and ii) at least one or more S3 units, wherein each S3 is as disclosed in paragraph 1.1.

1.68 Preferably the polymer consists of: i) at least one or more S2 units wherein each S2 is as disclosed in paragraph 1.1, and ii) at least one or more S4 units wherein each S4 is as disclosed in paragraph 1.1.

1.69 Preferably the polymer consists of: i) at least one or more S3 units wherein each S3 is as disclosed in paragraph 1.1, and ii) at least one or more units selected from the group consisting of S1, S2 and S4, and combinations thereof, wherein each S1, each S2 and each S4 is as disclosed in paragraph 1.1.

1.70 Preferably the polymer consists of: i) at least one or more S3 units wherein each S3 is as disclosed in paragraph 1.1, and ii) at least one or more units S4 wherein each S4 is as disclosed in paragraph 1.1.

1.71 Preferably the polymer consists of: i) at least one or more S4 units wherein each S4 is as disclosed in paragraph 1.1, and ii) at least one or more units selected from the group consisting of S1, S2 and S3 and combinations thereof, wherein each S1, each S2 and each S3 is as disclosed in paragraph 1.1.

1.72 Preferably the polymer consists of: i) at least one or more units selected from the group consisting of S1, S2, and combinations thereof, wherein each S1 and each S2 is as disclosed in paragraph 1.1, and ii) at least one or more S3 in any possible combination with S1 and S2, wherein each of S3 is as disclosed in paragraph 1.1.

1.73 Preferably the polymer consists of: i) at least one or more units selected from the group consisting of S1, S2, and combinations thereof, wherein each S1 and each S2 is as disclosed in paragraph 1.1, and ii) at least one or more S4 units in any possible combination with S1 and S2, wherein each S4 is as disclosed in paragraph 1.1.

1.74 Preferably the polymer consists of: i) at least one or more units selected from the group consisting of S1, S3 and combinations thereof, wherein each S1 and each S3 is as disclosed in paragraph 1.1, and ii) at least one or more S2 units in any possible combination with S1 and S3, wherein each S2 is as disclosed in paragraph 1.1.

1.75 Preferably the polymer consists of: i) at least one or more units selected from the group consisting of S1, S3, and combination thereof, wherein each S1 and each S3 is as disclosed in paragraph 1.1, and ii) at least one or more units S4 units in any possible combination with S1 and S3, wherein each S4 is as disclosed in paragraph 1.1.

1.76 Preferably the polymer consists of: i) at least one or more units selected from the group consisting of S1, S4, and combinations thereof, wherein each S1 and each S4 is as disclosed in paragraph 1.1, and ii) at least one or more S2 units in any possible combination with S1 and S4, wherein each S2 is as disclosed in paragraph 1.1.

1.77 Preferably the polymer consists of: i) at least one or more units selected from the group consisting of S1, S4, and combinations thereof, wherein each S1 and each S4 is as disclosed in paragraph 1.1, and ii) at least one or more S3 units in any possible combination with S1 and S4, wherein each S3 is as disclosed in paragraph 1.1.

1.78 Preferably the polymer consists of: i) at least one or more units selected from the group consisting of S2, S3, and combinations thereof, wherein each S2 and each S3 is as disclosed in paragraph 1.1, and ii) at least one or more S1 units in any possible combination with S2 and S3, wherein each S1 is as disclosed in paragraph 1.1.

1.79 Preferably the polymer consists of: i) at least one or more units selected from the group consisting of S2, S3, and combinations thereof, wherein each S2 and each S3 is as disclosed in paragraph 1.1, and ii) at least one or more S4 units in any possible combination with S2 and S3, wherein each S4 is as disclosed in paragraph 1.1.

1.80 Preferably the polymer consists of: i) at least one or more units selected from the group consisting of S3, S4, and combinations thereof, wherein each S3 and each S4 is as disclosed in paragraph 1.1, and ii) at least one or more S1 units in any possible combination with S3 and S4, wherein each S1 is as disclosed in paragraph 1.1.

1.81 Preferably the polymer consists of: i) at least one or more units selected from the group consisting of S3, S4, and combinations thereof, wherein each S3 and each S4 is as disclosed in paragraph 1.1, and ii) at least one or more S2 units in any possible combination with S3 and S4, wherein each S2 is as disclosed in paragraph 1.1.

1.82 Preferably the polymer consists of: i) at least one or more of units S1, wherein each S1 is as disclosed in paragraph 1.1, and ii) at least one or more of units S2, wherein each S2 is as disclosed in paragraph 1.1, and iii) at least one or more units S3, wherein each S3 is as disclosed in paragraph 1.1, and iv) at least one or more units S4, wherein each S4 is as disclosed in paragraph 1.1 and wherein i) and ii) and iii) and iv) may exist in any possible combination.

1.83 Preferably the polymer consists of at least one or more units selected from the group consisting of S2, S3, S4, and combinations thereof, wherein each S2 and each S3 and each S4 is as disclosed in paragraph 1.1, and wherein the polymer does not comprise any S1 units.

1.84 Preferably the polymer consists of at least one or more units selected from the group consisting of S1, S3, S4, and combinations thereof, wherein each S1 and each S3 and each S4 is as disclosed in paragraph 1.1, and wherein the polymer does not comprise any S2 units.

1.85 Preferably the polymer consists of at least one or more units selected from the group consisting of S1, S2, S4, and combinations thereof, wherein each S1 and each S2 and each S4 is as disclosed in paragraph 1.1, and wherein the polymer does not comprise any S3 units.

1.86 Preferably the polymer consists of at least one or more units selected from the group consisting of S1, S2, S3, and combinations thereof, wherein each S1 and each S2 and each S3 is as disclosed in paragraph 1.1, and wherein the polymer does not comprise any S4 units.

1.87 Preferably the polymer consists of at least one or more units S1 wherein each S1 is as disclosed in paragraph 1.1.

1.88 Preferably the polymer consists of at least one or more units S2 wherein each S2 is as disclosed in paragraph 1.1.

1.89 Preferably the polymer consists of at least one or more units S3 wherein each S3 is as disclosed in paragraph 1.1.

1.90 Preferably the polymer consists of at least one or more units S4 wherein each S4 is as disclosed in paragraph 1.1.

1.91 Preferably the polymer consists of: i) one or more S1 units wherein each S1 is as disclosed in paragraph 1.1, and ii) one or more S2 units wherein each S2 is as disclosed in paragraph 1.1, and wherein at least one S1 and at least one S2 are directly connected to each other as shown below:

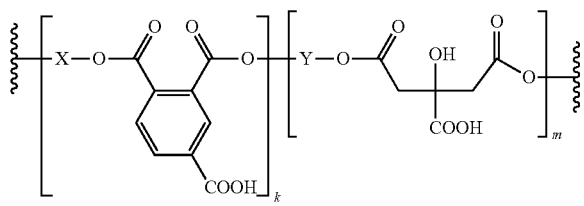

Any one of the preferments disclosed for S1 in paragraph 1.1 may be combined with any one of the preferments disclosed for S2 paragraph 1.1. Any one of the preferments disclosed for the polymer in any one of the paragraphs 1.1 to 1.30 and are in connection with S1 and S2, can be combined with the disclosure in this paragraph 1.92 Preferably the polymer consists of: i) one or more S1 units wherein each S1 is as disclosed in paragraph 1.1, and ii) one or more S3 units wherein each S3 is as disclosed in paragraph 1.1, and wherein at least one S1 and at least one S3 are directly connected to each other as shown below:

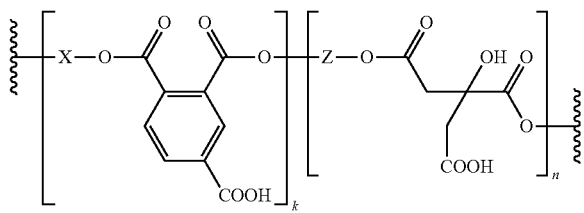

Any one of the preferments disclosed for S1 in paragraph 1.1 may be combined with any one of the preferments disclosed for S3 paragraph 1.1. Any one of the preferments disclosed for the polymer in any one of the paragraphs 1.1 to 1.30 and are in connection with S1 and S3, can be combined with the disclosure in this paragraph.

1.93 Preferably the polymer consists of: i) one or more S1 units wherein each S1 is as disclosed in paragraph 1.1, and ii) one or more S4 units wherein each S4 is as disclosed in paragraph 1.1, and wherein at least one S1 and at least one S4 are directly connected to each other as shown below:

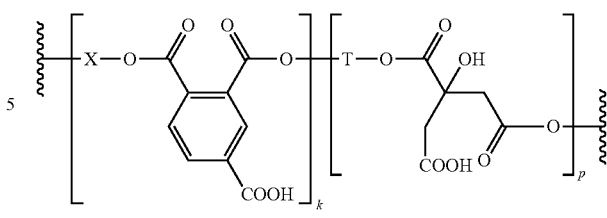

Any one of the preferments disclosed for S1 in paragraph 1.1 may be combined with any one of the preferments disclosed for S4 paragraph 1.1. Any one of the preferments disclosed for the polymer in any one of the paragraphs 1.1 to 1.30 and are in connection with S1 and S4, can be combined with the disclosure in this paragraph.

1.94 Preferably the polymer is as disclosed in any one of paragraphs 1.1 to 1.93 and wherein
X is selected from the group consisting of L4, L6, L7, L8, L9, L10, L11, L12, L13, L18, L19, L20, L23, L24, L25, L26, L27, L28, L29, L30, and L31, and
Y is selected from the group consisting of L4, L6, L7, L8, L9, L10, L11, L12, L13, L18, L19, L20, L23, L24, L25, L26, L27, L28, L29, L30, and L31, and
Z is selected from the group consisting of L4, L6, L7, L8, L9, L10, L11, L12, L13, L18, L19, L20, L23, L24, L25, L26, L27, L28, L29, L30, and L31, and
T is selected from the group consisting of L4, L6, L7, L8, L9, L10, L11, L12, L13, L18, L19, L20, L23, L24, L25, L26, L27, L28, L29, L30, and L31.

1.95 Preferably the polymer is as disclosed in any one of paragraphs 1.1 to 1.93 and wherein
X is selected from the group consisting of L4, L6, L7, L8, L9, L10, L11, L12, L13, L18, L19, L20, L23, L24, L25, L26, L27, L28, L29, L30, and L31, and
Y is selected from the group consisting of L4, L6, L7, L8, L9, L10, L11, L12, L13, L18, L19, L20, L23, L24, L25, L26, L27, L28, L29, L30, and L31, and
Z is selected from the group consisting of L4, L6, L7, L8, L9, L10, L11, L12, L13, L18, L19, L20, L23, L24, L25, L26, L27, L28, L29, L30, and L31, and
T is selected from the group consisting of L4, L6, L7, L8, L9, L10, L11, L12, L13, L18, L19, L20, L23, L24, L25, L26, L27, L28, L29, L30, and L31.

1.96 Preferably the polymer is as disclosed in any one of paragraphs 1.1 to 1.93 and wherein
X is selected from the group consisting of L4, L6, L7, L8, L9, L10, L11, L12, L13, L18, L19, L20, L23, L24, L25, L26, L27, L28, L29, L30, and L31, and
Y is selected from the group consisting of L4, L6, L7, L8, L9, L10, L11, L12, L13, L18, L19, L20, L23, L24, L25, L26, L27, L28, L29, L30, and L31, and
Z is selected from the group consisting of L4, L6, L7, L8, L9, L10, L11, L12, L13, L18, L19, L20, L23, L24, L25, L26, L27, L28, L29, L30, and L31, and
T is selected from the group consisting of L4, L6, L7, L8, L9, L10, L11, L12, L13, L18, L19, L20, L23, L24, L25, L26, L27, L28, L29, L30, and L31.

1.97 Preferably the polymer is as disclosed in any one of paragraphs 1.1 to 1.93 and wherein
X is selected from the group consisting of L6, L7, L8, L9, L10, L11, L12, L13, L18, L19, L20, L23, L24, L25, L26, L27, L28, L29, L30, and L31, and
Y is selected from the group consisting of L6, L7, L8, L9, L10, L11, L12, L13, L18, L19, L20, L23, L24, L25, L26, L27, L28, L29, L30, and L31, and Z is selected from the group consisting of L6, L7, L8, L9, L10, L11, L12, L13, L18, L19, L20, L23, L24, L25, L26, L27, L28, L29, L30, and L31, and T is selected from the group consisting of L6, L7, L8, L9, L10, L11, L12, L13, L18, L19, L20, L23, L24, L25, L26, L27, L28, L29, L30, and L31.

1.98 Preferably the polymer is as disclosed in any one of paragraphs 1.1 to 1.93 and wherein
X is selected from the group consisting of L6, L7, L8, L9, L10, L11, L12, L13, L18, L19, L20, L23, L24, L25, L26, L27, L28, L29, L30, and L31, and
Y is selected from the group consisting of L6, L7, L8, L9, L10, L11, L12, L13, L18, L19, L20, L23, L24, L25, L26, L27, L28, L29, L30, and L31, and
Z is selected from the group consisting of L6, L7, L8, L9, L10, L11, L12, L13, L18, L19, L20, L23, L24, L25, L26, L27, L28, L29, L30, and L31, and
T is selected from the group consisting of L6, L7, L8, L9, L10, L11, L12, L13, L18, L19, L20, L23, L24, L25, L26, L27, L28, L29, L30, and L31.

1.99 Preferably the polymer is as disclosed in any one of paragraphs 1.1 to 1.93 and wherein
X is selected from the group consisting of L7, L8, L9, L10, L11, L12, L13, L18, L19, L20, L23, L24, L25, L26, L27, L28, L29, L30, and L31, and
Y is selected from the group consisting of L7, L8, L9, L10, L11, L12, L13, L18, L19, L20, L23, L24, L25, L26, L27, L28, L29, L30, and L31, and
Z is selected from the group consisting of L7, L8, L9, L10, L11, L12, L13, L18, L19, L20, L23, L24, L25, L26, L27, L28, L29, L30, and L31, and
T is selected from the group consisting of L7, L8, L9, L10, L11, L12, L13, L18, L19, L20, L23, L24, L25, L26, L27, L28, L29, L30, and L31.

1.99 Preferably the polymer is as disclosed in any one of paragraphs 1.1 to 1.93 and wherein
X is selected from the group consisting of L8, L9, L10, L11, L12, L13, L18, L19, L20, L23, L24, L25, L26, L27, L28, L29, L30, and L31, and
Y is selected from the group consisting of L8, L9, L10, L11, L12, L13, L18, L19, L20, L23, L24, L25, L26, L27, L28, L29, L30, and L31, and
Z is selected from the group consisting of L8, L9, L10, L11, L12, L13, L18, L19, L20, L23, L24, L25, L26, L27, L28, L29, L30, and L31, and
T is selected from the group consisting of L8, L9, L10, L11, L12, L13, L18, L19, L20, L23, L24, L25, L26, L27, L28, L29, L30, and L31.

1.100 Preferably the polymer is as disclosed in any one of paragraphs 1.1 to 1.93 and wherein
X is selected from the group consisting of L9, L10, L11, L12, L13, L18, L19, L20, L23, L24, L25, L26, L27, L28, L29, L30, and L31, and
Y is selected from the group consisting of L9, L10, L11, L12, L13, L18, L19, L20, L23, L24, L25, L26, L27, L28, L29, L30, and L31, and
Z is selected from the group consisting of L9, L10, L11, L12, L13, L18, L19, L20, L23, L24, L25, L26, L27, L28, L29, L30, and L31, and
T is selected from the group consisting of L9, L10, L11, L12, L13, L18, L19, L20, L23, L24, L25, L26, L27, L28, L29, L30, and L31.

1.101 Preferably the polymer is as disclosed in any one of paragraphs 1.1 to 1.93 and wherein
X is selected from the group consisting of L10, L11, L12, L13, L18, L19, L20, L23, L24, L25, L26, L27, L28, L29, L30, and L31, and
Y is selected from the group consisting of L10, L11, L12, L13, L18, L19, L20, L23, L24, L25, L26, L27, L28, L29, L30, and L31, and
Z is selected from the group consisting of L10, L11, L12, L13, L18, L19, L20, L23, L24, L25, L26, L27, L28, L29, L30, and L31, and
T is selected from the group consisting of L10, L11, L12, L13, L18, L19, L20, L23, L24, L25, L26, L27, L28, L29, L30, and L31.

1.102 Preferably the polymer is as disclosed in any one of paragraphs 1.1 to 1.93 and wherein
X is selected from the group consisting of L11, L12, L13, L18, L19, L20, L23, L24, L25, L26, L27, L28, L29, L30, and L31, and
Y is selected from the group consisting of L11, L12, L13, L18, L19, L20, L23, L24, L25, L26, L27, L28, L29, L30, and L31, and
Z is selected from the group consisting of L11, L12, L13, L18, L19, L20, L23, L24, L25, L26, L27, L28, L29, L30, and L31, and
T is selected from the group consisting of L11, L12, L13, L18, L19, L20, L23, L24, L25, L26, L27, L28, L29, L30, and L31.

1.103 Preferably the polymer is as disclosed in any one of paragraphs 1.1 to 1.93 and wherein
X is selected from the group consisting of L12, L13, L18, L19, L20, L23, L24, L25, L26, L27, L28, L29, L30, and L31, and
Y is selected from the group consisting of L12, L13, L18, L19, L20, L23, L24, L25, L26, L27, L28, L29, L30, and L31, and
Z is selected from the group consisting of L12, L13, L18, L19, L20, L23, L24, L25, L26, L27, L28, L29, L30, and L31, and
T is selected from the group consisting of L12, L13, L18, L19, L20, L23, L24, L25, L26, L27, L28, L29, L30, and L31.

1.104 Preferably the polymer is as disclosed in any one of paragraphs 1.1 to 1.93 and wherein
X is selected from the group consisting of L13, L18, L19, L20, L23, L24, L25, L26, L27, L28, L29, L30, and L31, and
Y is selected from the group consisting of L13, L18, L19, L20, L23, L24, L25, L26, L27, L28, L29, L30, and L31, and
Z is selected from the group consisting of L13, L18, L19, L20, L23, L24, L25, L26, L27, L28, L29, L30, and L31, and
T is selected from the group consisting of L13, L18, L19, L20, L23, L24, L25, L26, L27, L28, L29, L30, and L31.

1.105 Preferably the polymer is as disclosed in any one of paragraphs 1.1 to 1.93 and wherein
X is selected from the group consisting of L18, L19, L20, L23, L24, L25, L26, L27, L28, L29, L30, and L31, and
Y is selected from the group consisting of L18, L19, L20, L23, L24, L25, L26, L27, L28, L29, L30, and L31, and
Z is selected from the group consisting of L18, L19, L20, L23, L24, L25, L26, L27, L28, L29, L30, and L31, and
T is selected from the group consisting of L18, L19, L20, L23, L24, L25, L26, L27, L28, L29, L30, and L31.

1.109 Preferably the polymer is as disclosed in any one of paragraphs 1.1 to 1.93 and wherein
X is selected from the group consisting of L18, L19, L20, L23, L24, L25, L26, L27, L28, L29, L30, and L31, and
Y is selected from the group consisting of L18, L19, L20, L23, L24, L25, L26, L27, L28, L29, L30, and L31, and
Z is selected from the group consisting of L18, L19, L20, L23, L24, L25, L26, L27, L28, L29, L30, and L31, and
T is selected from the group consisting of L18, L19, L20, L23, L24, L25, L26, L27, L28, L29, L30, and L31.

1.110 Preferably the polymer is as disclosed in any one of paragraphs 1.1 to 1.93 and wherein
X is selected from the group consisting of L19, L20, L23, L24, L25, L26, L27, L28, L29, L30, and L31, and
Y is selected from the group consisting of L19, L20, L23, L24, L25, L26, L27, L28, L29, L30, and L31, and
Z is selected from the group consisting of L19, L20, L23, L24, L25, L26, L27, L28, L29, L30, and L31, and
T is selected from the group consisting of L19, L20, L23, L24, L25, L26, L27, L28, L29, L30, and L31.

1.111 Preferably the polymer is as disclosed in any one of paragraphs 1.1 to 1.93 and wherein
X is selected from the group consisting of L20, L23, L24, L25, L26, L27, L28, L29, L30, and L31, and
Y is selected from the group consisting of L20, L23, L24, L25, L26, L27, L28, L29, L30, and L31, and
Z is selected from the group consisting of L20, L23, L24, L25, L26, L27, L28, L29, L30, and L31, and
T is selected from the group consisting of L20, L23, L24, L25, L26, L27, L28, L29, L30, and L31.

1.114 Preferably the polymer is as disclosed in any one of paragraphs 1.1 to 1.93 and wherein
X is selected from the group consisting of L23, L24, L25, L26, L27, L28, L29, L30, and L31, and
Y is selected from the group consisting of L23, L24, L25, L26, L27, L28, L29, L30, and L31, and
Z is selected from the group consisting of L23, L24, L25, L26, L27, L28, L29, L30, and L31, and
T is selected from the group consisting of L23, L24, L25, L26, L27, L28, L29, L30, and L31.

1.115 Preferably the polymer is as disclosed in any one of paragraphs 1.1 to 1.93 and wherein
X is selected from the group consisting of L24, L25, L26, L27, L28, L29, L30, and L31, and
Y is selected from the group consisting of L24, L25, L26, L27, L28, L29, L30, and L31, and
Z is selected from the group consisting of L24, L25, L26, L27, L28, L29, L30, and L31, and
T is selected from the group consisting of L24, L25, L26, L27, L28, L29, L30, and L31.

1.116 Preferably the polymer is as disclosed in any one of paragraphs 1.1 to 1.93 and wherein
X is selected from the group consisting of L12, L13, L24, L25, L26, L27, L28, L29, L30, and L31, and
Y is selected from the group consisting of L12, L13, L24, L25, L26, L27, L28, L29, L30, and L31, and
Z is selected from the group consisting of L12, L13, L24, L25, L26, L27, L28, L29, L30, and L31, and
T is selected from the group consisting of L12, L13, L24, L25, L26, L27, L28, L29, L30, and L31.

1.117 Preferably the polymer is as disclosed in any one of paragraphs 1.1 to 1.93 and wherein
X is selected from the group consisting of L25, L26, L27, L28, L29, L30, and L31, and
Y is selected from the group consisting of L25, L26, L27, L28, L29, L30, and L31, and
Z is selected from the group consisting of L25, L26, L27, L28, L29, L30, and L31, and
T is selected from the group consisting of L25, L26, L27, L28, L29, L30, and L31.

1.118 Preferably the polymer is as disclosed in any one of paragraphs 1.1 to 1.93 and wherein
X is selected from the group consisting of L26, L27, L28, L29, L30, and L31, and
Y is selected from the group consisting of L26, L27, L28, L29, L30, and L31, and
Z is selected from the group consisting of L26, L27, L28, L29, L30, and L31, and
T is selected from the group consisting of L26, L27, L28, L29, L30, and L31.

1.119 Preferably the polymer is as disclosed in any one of paragraphs 1.1 to 1.93 and wherein
X is selected from the group consisting of L27, L28, L29, L30, and L31, and
Y is selected from the group consisting of L27, L28, L29, L30, and L31, and
Z is selected from the group consisting of L27, L28, L29, L30, and L31, and
T is selected from the group consisting of L27, L28, L29, L30, and L31.

1.120 Preferably the polymer is as disclosed in any one of paragraphs 1.1 to 1.93 and wherein
X is selected from the group consisting of L28, L29, L30, and L31, and
Y is selected from the group consisting of L28, L29, L30, and L31, and
Z is selected from the group consisting of L28, L29, L30, and L31, and
T is selected from the group consisting of L28, L29, L30, and L31.

1.121 Preferably the polymer is as disclosed in any one of paragraphs 1.1 to 1.93 and wherein
X is selected from the group consisting of L29, L30, and L31, and
Y is selected from the group consisting of L29, L30, and L31, and
Z is selected from the group consisting of L29, L30, and L31, and
T is selected from the group consisting of L29, L30, and L31.

1.122 Preferably the polymer is as disclosed in any one of paragraphs 1.1 to 1.93 and wherein
X is selected from the group consisting of L28, L30, and L31, and
Y is selected from the group consisting of L28, L30, and L31, and
Z is selected from the group consisting of L28, L30, and L31, and
T is selected from the group consisting of L28, L30, and L31.

1.123 Preferably the polymer is as disclosed in any one of paragraphs 1.1 to 1.93 and wherein
X is selected from the group consisting of L30, and L31, and
Y is selected from the group consisting of L30, and L31, and
Z is selected from the group consisting of L30, and L31, and
T is selected from the group consisting of L30, and L31.

1.124 Preferably the polymer is as disclosed in any one of paragraphs 1.1 to 1.93 and wherein
X is L30, and
Y is L30, and
Z is L30, and
T is L30.

1.125 Preferably the polymer is as disclosed in any one of paragraphs 1.1 to 1.93 and wherein
X is L31, and
Y is L31, and
Z is L31, and
T is L31.

1.126 Preferably the polymer is as disclosed in any one of paragraphs 1.1 to 1.93 and wherein
X is selected from the group consisting of L12, L13, L30, and L31, and Y is selected from the group consisting of L12, L13, L30, and L31, and Z is selected from the group consisting of L12, L13, L30, and L31, and T is selected from the group consisting of L12, L13, L30, and L31.

1.127 Preferably the polymer is as disclosed in any one of paragraphs 1.1 to 1.93 and wherein X is selected from the group consisting of L12, L13, L28, L29, L30 and L31, and Y is selected from the group consisting of L12, L13, L28, L29, L30 and L31. and Z is selected from the group consisting of L12, L13, L28, L29, L30 and L31, and T is selected from the group consisting of L12, L13, L28, L29, L30 and L31.

1.128 Preferably the polymer is as disclosed in anyone of paragraphs 1.1 to 1.127 wherein the polymer has:

i) a $M_n$ of at least $10^3$ and at most $5\times10^4$, more preferably of at least $2\times10^3$ and at most $4\times10^4$, even more preferably of at least $5\times10^3$ and at most $2\times10^4$, and ii) a D of at least 1.1 and at most 10, preferably at most 8, preferably at most 6, preferably at most 5, preferably at least 1.1 and at most 3, and iii) a $T_g$ of at least 30 and at most 140, preferably at least 40 and at most 95° C., more preferably at least 40 and at most 85, most preferably at least 40 and at most 80° C., and iv) an AV of at least 105 and at most 180, preferably of at least 110 and at most 170 mg KOH/g, and v) an OHV of at least 0 and at most 350, preferably at most 250, more preferably at most 150 mg KOH/g, and vi) an f of at least 0.2 and at most 50, and preferably the polymer has a MRQ of at least 1 and at most 1.2.

1.129 Preferably the polymer is as disclosed in paragraph 1.128 wherein

X is selected from the group consisting of L12, L13, L28, L29, L30 and L31, and

Y is selected from the group consisting of L12, L13, L28, L29, L30 and L31, and

Z is selected from the group consisting of L12, L13, L28, L29, L30 and L31, and

T is selected from the group consisting of L12, L13, L28, L29, L30 and L31.

1.130 Preferably the polymer is as disclosed in paragraph 1.128 wherein

X is selected from the group consisting of L28, L29, L30 and L31, and

Y is selected from the group consisting of L28, L29, L30 and L31, and

Z is selected from the group consisting of L28, L29, L30 and L31, and

T is selected from the group consisting of L28, L29, L30 and L31.

1.131 Preferably the polymer is as disclosed in paragraph 1.128 wherein

X is selected from the group consisting of L30 and L31, and

Y is selected from the group consisting of L30 and L31, and

Z is selected from the group consisting of L30 and L31, and

T is selected from the group consisting of L30 and L31.

1.132 Preferably the polymer is as disclosed in any one of paragraphs 1.128 to 1.131 wherein the polymer is ionic.

1.133 Preferably the polymer is as disclosed in anyone of paragraphs 1.1 to 1.127 wherein the polymer has:

i) a $M_n$ of at least $8\times10^2$ and at most $10^4$, more preferably of at least $10^3$ and at most $6\times10^3$, even more preferably of at least $10^3$ and at most $5\times10^3$, and ii) a D of at least 1.1 and at most 10, preferably at most 8, preferably at most 6, preferably at most 4, preferably at least 1.2 and at most 10, preferably at most 3, and iii) a $T_g$ of at least 30 and at most 140, preferably at least 25 and at most 140, more preferably at least 30 and at most 120, most preferably at least 40 and at most 110, especially at least 45 and at most 100, more especially at least 40 and at most 95° C., most especially at least 40 and at most 85, for example at least 40 and at most 80° C., and iv) an AV of at least 105 and at most 180, preferably of at least 110 and at most 170 mg KOH/g, and v) an OHV of at least 0 and at most 350, preferably at most 250, more preferably at most 150 mg KOH/g, and vi) an f of at least 3 and at most 25, preferably at least 7 and at most 18, and preferably the polymer has a MRQ of at least 1 and at most 1.2.

1.134 Preferably the polymer is as disclosed in paragraph 1.133 wherein

X is selected from the group consisting of L12, L13, L24, L25, L26, L27, L28, L29, L30, and L31, and Y is selected from the group consisting of L12, L13, L24, L25, L26, L27, L28, L29, L30, and L31, and Z is selected from the group consisting of L12, L13, L24, L25, L26, L27, L28, L29, L30, and L31, and T is selected from the group consisting of L12, L13, L24, L25, L26, L27, L28, L29, L30, and L31.

1.135 Preferably the polymer is as disclosed in paragraph 1.133 wherein

X is selected from the group consisting of L24, L25, L26, L27, L28, L29, L30, and L31, and Y is selected from the group consisting of L24, L25, L26, L27, L28, L29, L30, and L31, and Z is selected from the group consisting of L24, L25, L26, L27, L28, L29, L30, and L31, and T is selected from the group consisting of L24, L25, L26, L27, L28, L29, L30, and L31.

1.136 Preferably the polymer is as disclosed in paragraph 1.133 wherein

X is selected from the group consisting of L30 and L31, and

Y is selected from the group consisting of L30 and L31, and

Z is selected from the group consisting of L30 and L31, and

T is selected from the group consisting of L30 and L31.

1.137 Preferably the polymer is as disclosed in any one of paragraphs 1.133 to 1.136 wherein the polymer is ionic.

1.138 Preferably the polymer is as disclosed in any one of paragraphs 1.1 to 1.137 and wherein the polymer is ionic.

1.139 Preferably the polymer is as disclosed in any one of paragraphs 1.1 to 1.138, wherein said polymer has a MRQ of at least 1 and at most 1.2.

1.140 Preferably the polymer is as disclosed in any one of paragraphs 1.1 to 1.139.

The Polymer may be ionic (ionic Polymer or equally the Polymer may be an ionic polymer), that is the Polymer comprises pendant ionic functional groups in its macromolecular structure. An ionic Polymer may be prepared by any one of the following ways or any combination thereof: i) neutralizing at least some of the functional groups of the Polymer e.g. carboxylic acid groups, with amines or other organic or inorganic bases, or ii) reacting or interacting at least some of the functional groups of the Polymer with an emulsifying agent (also known as emulsifier) as the latter is commonly known in the art, or iii) copolymerizing at least the monomers making up one or both of S1 and S2, with at least an ionic monomer as the latter is disclosed herein. Ionic Polymers are particularly preferred for water-borne Compositions, e.g. water-reducible Compositions, emulsions.

Emulsifying agents are compounds that have both a hydrophilic and a lipophilic part in the chemical structure and are typically classified according to their: a) chemical structure e.g. ionic, non-ionic, or other sub-classification indicative of its origin or chemical make-up, or b) mechanism of action e.g. monomolecular, multi-molecular, etc. Exemplary emulsifiers include but are not limited to tragacanth, sodium lauryl sulfate, sodium dioctyl sulfosuccinate, and sorbitan esters and their ethoxylates under the trademarks Span® and Tween®.

The Polymer may have a linear, or branched, or dendritic macromolecular structure. A Polymer having a linear macromolecular structure is referred herein as a 'linear Polymer'. A Polymer having a branched macromolecular structure is referred herein as a 'branched Polymer'. A Polymer having a dendritic macromolecular structure is referred herein as a 'dendritic Polymer'. Linear and branched types of polymers are as described in A. Rudin, P. Choi 'The Elements of Polymer Science and Engineering', J. Wiley & Sons, $3^{rd}$ edition, 2013, Ch. 1, paragraph 1.6, whilst dendritic polymers are as described in C. Gao, D. Yan 'Hyperbranched polymers: from synthesis to applications', Prog. Polym. Sci., 29 (2004) 183-275. According to C. Gao and D. Yan in their above mentioned publication the class of dendritic macromolecular structures consists of six sub-classes: a) dendrons and dendrimers, b) linear-dendritic hybrids, c) dendri-grafts or dendronized polymers, d) hyperbranched polymers, e) multi-arm star polymers, hypergrafts of hypergrafted polymers. The term 'dendritic' (referring to a polymer or macromolecular structure) as used herein encompasses collectively any and all of the above mentioned subclasses a) to e). Preferably, the Polymer does not have a dendritic macromolecular structure, thus preferably the Polymer is not a dendritic Polymer. More preferably the Polymer is linear or branched, even more preferably the Polymer is branched. Here, it is emphasized that linear or branched Polymers are mostly preferred for use in the Binder and in the Composition.

Preferably the Polymer has a functionality of at least 0.0001; preferably the Polymer has a functionality of at most 100. Preferably the Polymer has a functionality of at most 90, more preferably at most 80, even more preferably at most 70, most preferably at most 60, especially at most 50, more especially at most 40, even more especially at most 30, most especially at most 25, for example at most 20, for example at most 18, for example at most 16, for example at most 15, for example at most 14, for example at most 12, for example at most 10 for example at most 9, for example at most 8, for example at most 7, for example at most 6, for example at most 5. Preferably the Polymer has a functionality of at least 0.0005, more preferably at least 0.001, even more preferably at least 0.01, most preferably at least 0.1, especially at least 0.2, more especially at least 0.3, even more especially at least 0.4, most especially at least 0.5, for example at least 0.6, for example at least 0.7, for example at least 0.8, for example at least 0.9, for example at least 1, for example at least 1.01, for example at least 1.03, for example at least 1.04, for example at least 1.05, for example at least 1.06, for example at least 1.07, for example at least 1.08, for example at least 1.09, for example at least 1.1, for example at least 1.12, for example at least 1.15, for example at least 1.17, for example at least 1.19, for example at least 1.2 for example at least 1.4, for example at least 1.6, for example at least 1.8, for example at least 2. Preferably the Polymer has a functionality of at least 1 and at most 5, more preferably the Polymer has a functionality of at least 2 and at most 5, most preferably the Polymer has a functionality of at least 3 and at most 7.

The Polymer has a MRQ of at least 1. Preferably the Polymer has a MRQ of at most 100.000. Preferably the Polymer has a MRQ of at least 1 and at most 100.000. More preferably the Polymer has a MRQ of at most 10.000, even more preferably at most 1.000, most preferably at most 200, especially at most 100, more especially at most 25, even more especially at most 22, most especially at most 17, for example at most 15, for example at most 13, for example at most 11, for example at most 9, for example at most 7.5, for example at most 6, for example at most 5, for example at most 4.3, for example at most 3.8, for example at most 3.5, for example at most 3.2, for example at most 3.2, for example at most 3.2, for example at most 3.2, for example at most 3, for example at most 2.8, for example at most 2.6, for example at most 2.5, for example at most 2.4, for example at most 2.3, for example at most 2.2, for example at most 2.1, for example at most 2, for example at most 1.9, for example at most 1.8, for example at most 1.7, for example at most 1.6, for example at most 1.5, for example at most 1.4, for example at most 1.3, for example at most 1.2, for example at most 1.1, for example at most 1.08, for example at most 1.05, for example at most 1.03, for example at most 1.02, for example at most 1.01, for example the MRQ is 1. Preferably the Polymer has a MRQ of at least 1 and at most 15, more preferably of at least 1 and at most 10, even more preferably of at least 1 and at most 8, most preferably of at least 1 and at most 6, especially of at least 1 and at most 5, more especially of at least 1 and at most 3, even more especially of at least 1 and at most 2.5, most especially of at least 1 and at most 2, for example of at least 1 and at most 1.5, for example of at least 1 and at most 1.1, for example of at least 1 and at most 1.08, for example of at least 1 and at most 1.05, for example of at least 1 and at most 1.03, for example of at least 1 and at most 1.02, for example of at least 1 and at most 1.01.

Preferably the Polymer has a $M_n$ of at least $3\times10^2$ Da; preferably the Polymer has a $M_n$ of at most $10^7$ Da. Preferably the Polymer has a $M_n$ of at least $3.5\times10^2$ at most $10^7$ Da. Preferably the Polymer has a $M_n$ of at most $5\times10^6$, more preferably at most $4\times10^6$, even more preferably at most $3\times10^6$, most preferably at most $2\times10^6$, especially at most $10^6$, more especially at most $7\times10^5$, even more especially at most $6\times10^5$, most especially at most $5\times10^5$, for example at most $4\times10^5$, for example at most $3\times10^5$, for example at most $2\times10^5$, for example at most $1.5\times10^5$, for example at most $10^5$, for example at most $9\times10^4$, for example at most $8\times10^4$ for example at most $7\times10^4$, for example at most $6.5\times10^4$, for example at most $6\times10^4$, for example at most $5\times10^4$, for example at most $4\times10^4$, for example at most $3.5\times10^4$, for example at most $3\times10^4$ Da. Preferably the Polymer has a $M_n$ of at least $4\times10^2$, more preferably at least $5\times10^2$, even more preferably at least $6\times10^2$, most preferably at least $7\times10^2$, especially at least $8\times10^2$, more especially at least $9\times10^2$, even more especially at least $10^3$, most especially at least $1.1\times10^3$, for example at least $1.2\times10^3$, for example at least $1.3\times10^3$, for example at least $1.4\times10^3$, for example at least $1.5\times10^3$, for example at least $1.6\times10^3$, for example at least $1.7\times10^3$, for example at least $1.8\times10^3$ for example at least $1.9\times10^3$, for example at least $2\times10^3$, for example at least $2.1\times10^3$, for example at least $2.2\times10^3$ Da.

The Polymer has a polydispersity (D) of at least 1.

Preferably the Polymer has a polydispersity of at most 40. Preferably the Polymer has a D of at most 20, more preferably at most 15, even more preferably at most 12, most preferably at most 10, especially at most 9.5, more especially at most 9, even more especially at most 8.5, most especially at most 8, for example at most 7.8, for example at most 7.5, for example at most 7.2, for example at most 7, for example at most 6.8, for example at most 6.6, for example at most 6.5 for example at most 6.4, for example at most 6.3, for example at most 6.2, for example at most 6.1, for example at most 6, for example at most 5.9, for example at most 5.8 for example at most 5.7 for example at most 5.6. Preferably the Polymer has a D of at least 1.01, more preferably at least 1.02, even more preferably at least 1.03, most preferably at least 1.04, especially at least 1.05, more especially at least 1.06, even more especially at least 1.07, most especially at least 1.08, for example at least 1.09, for example at least 1.1, for example at least 1.12, for example at least 1.15, for example at least 1.17, for example at least 1.19, for example at least 1.2. Preferably the polymer has a polydispersity of at least 1.05 and at most 5, more preferably at least 1.1 and at most 4, even more preferably at least 1.1 and at most 3, most preferably at least 1.1 and at most 2.

The Polymer P has a $T_g$ of at least 30 and at most 140° C.; preferably the Polymer P has a $T_g$ of at most 95° C. Preferably the Polymer P has a $T_g$ of at least 35 and at most 140° C. Preferably the Polymer P has a $T_g$ of at most 95, more preferably at most 90, even more preferably at most 85, most preferably at most 80, especially at most 75° C. Preferably the Polymer P has a $T_g$ of at least 35, more preferably at least 40, even more preferably at least 45° C. Preferably the Polymer P has a $T_g$ of at least 40 and at most 95, more preferably of at least 40 and at most 85° C., even more preferably of at least 40 and at most 80, most preferably of at least 40 and at most 75° C.

The Polymer has an AV of at least 105 and at most 180 mg KOH/g. Preferably the Polymer has an AV of at least 105 and at most 175, more preferably at most 170, most preferably at most 165, especially at most 160 mg KOH/g. Preferably the Polymer has an AV of at least 110 and at most 180, more preferably at most 175, most preferably at most 170, especially at most 165, more especially at most 160 mg KOH/g. Preferably the Polymer has an AV of at least 115 and at most 180, more preferably at most 175, most preferably at most 170, especially at most 165, more especially at most 160 mg KOH/g. Preferably the Polymer has an AV of at least 120 and at most 180, more preferably at most 175, most preferably at most 170, especially at most 165, more especially at most 160 mg KOH/g. Preferably the Polymer has an AV of at least 125 and at most 180, more preferably at most 175, most preferably at most 170, especially at most 165, more especially at most 160 mg KOH/g. Preferably the Polymer has an AV of at least 130 and at most 180, more preferably at most 175, most preferably at most 170, especially at most 165, more especially at most 160 mg KOH/g. Preferably the Polymer has an AV of at least 130 and at most 170 mg KOH/g.

The Polymer may have an OHV of 0 mg KOH/g. Preferably the Polymer has an OHV of at least 0.01 mg KOH/g. Preferably the Polymer has an OHV of at most 300 mg KOH/g. Preferably the Polymer has an OHV of at least 0 and at most 300 mg KOH/g. Preferably the Polymer has an OHV of at least 0.01 and at most 300 mg KOH/g. Preferably the Polymer has an OHV of at most 250, more preferably at most 200, even more preferably at most 180, most preferably at most 160, especially at most 140, more especially at most 120, even more especially at most 100, most especially at most 90, for example at most 80, for example at most 60, for example at most 50 for example at most 40, for example at most 30, for example at most 20, for example at most 13, for example at most 12, for example at most 10, for example at most 8, for example at most 6, for example at most 5, for example at most 4, for example at most 3, for example at most 2, for example at most 1 mg KOH/g. Preferably the Polymer has an OHV of at least 0.1, more preferably at least 0.5, even more preferably at least 0.7, most preferably at least 0.8, especially at least 1 mg KOH/g. Preferably, the Polymer has an OHV of at least 0 and at most 13, more preferably at least 0.001 and at most 13.

Preferably the Polymer is acid-functional. Preferably the Polymer is PolymerCS. Preferably the Polymer is acid-functional PolymerCS.

The acid-functional Polymer has a $T_g$ of at least 30 and at most 140° C.; preferably the acid-functional Polymer P has a $T_g$ of at most 95° C. Preferably the acid-functional Polymer has a $T_g$ of at least 35 and at most 140° C. Preferably the acid-functional Polymer has a $T_g$ of at most 95, more preferably at most 90, even more preferably at most 85, most preferably at most 80, especially at most 75° C. Preferably the acid-functional Polymer has a $T_g$ of at least 35, more preferably at least 40, even more preferably at least 45° C. Preferably the acid-functional Polymer has a $T_g$ of at least 40 and at most 95, more preferably of at least 40 and at most 85° C., even more preferably of at least 40 and at most 80, most preferably of at least 40 and at most 75° C.

The acid-functional Polymer has an AV of at least 105 and at most 180 mg KOH/g. Preferably the acid-functional Polymer has an AV of at least 105 and at most 175, more preferably at most 170, most preferably at most 165, especially at most 160 mg KOH/g. Preferably the acid-functional Polymer has an AV of at least 110 and at most 180, more preferably at most 175, most preferably at most 170, especially at most 165, more especially at most 160 mg KOH/g. Preferably the acid-functional Polymer has an AV of at least 115 and at most 180, more preferably at most 175, most preferably at most 170, especially at most 165, more especially at most 160 mg KOH/g. Preferably the acid-functional Polymer has an AV of at least 120 and at most 180, more preferably at most 175, most preferably at most 170, especially at most 165, more especially at most 160 mg KOH/g. Preferably the acid-functional Polymer has an AV of at least 125 and at most 180, more preferably at most 175, most preferably at most 170, especially at most 165, more especially at most 160 mg KOH/g. Preferably the acid-functional Polymer has an AV of at least 130 and at most 180, more preferably at most 175, most preferably at most 170, especially at most 165, more especially at most 160 mg KOH/g. Preferably the acid-functional Polymer has an AV of at least 130 and at most 170 mg KOH/g.

The acid-functional Polymer CS has a $T_g$ of at least 30 and at most 140° C.; preferably the acid-functional Polymer CS has a $T_g$ of at most 95° C. Preferably the acid-functional Polymer CS has a $T_g$ of at least 35 and at most 140° C. Preferably the acid-functional Polymer CS has a $T_g$ of at most 95, more preferably at most 90, even more preferably at most 85, most preferably at most 80, especially at most 75° C. Preferably the acid-functional Polymer CS has a $T_g$ of at least 35, more preferably at least 40, even more preferably at least 45° C. Preferably the acid-functional Polymer CS has a $T_g$ of at least 40 and at most 95, more preferably of at least 40 and at most 85° C., even more preferably of at least 40 and at most 80, most preferably of at least 40 and at most 75° C.

The acid-functional Polymer CS has an AV of at least 105 and at most 180 mg KOH/g. Preferably the acid-functional Polymer CS has an AV of at least 105 and at most 175, more preferably at most 170, most preferably at most 165, especially at most 160 mg KOH/g. Preferably the acid-functional Polymer CS has an AV of at least 110 and at most 180, more preferably at most 175, most preferably at most 170, especially at most 165, more especially at most 160 mg KOH/g. Preferably the acid-functional Polymer CS has an AV of at least 115 and at most 180, more preferably at most 175, most preferably at most 170, especially at most 165, more especially at most 160 mg KOH/g. Preferably the acid-functional Polymer CS has an AV of at least 120 and at most 180, more preferably at most 175, most preferably at most 170, especially at most 165, more especially at most 160 mg KOH/g. Preferably the acid-functional Polymer CS has an AV of at least 125 and at most 180, more preferably at most 175, most preferably at most 170, especially at most 165, more especially at most 160 mg KOH/g. Preferably the acid-functional Polymer CS has an AV of at least 130 and at most 180, more preferably at most 175, most preferably at most 170, especially at most 165, more especially at most 160 mg KOH/g. Preferably the acid-functional Polymer CS has an AV of at least 130 and at most 170 mg KOH/g.

Preferably the acid-functional Polymer has a OHV lower than 14 mg KOH/g, and an AV of at least 105 and at most 180, more preferably at least 110 and at most 175, even more preferably at least 120 and at most 170 mg KOH/g, most preferably at least 130 and at most 170 mg KOH/g.

Preferably the acid-functional PolymerCS P has a OHV lower than 14 mg KOH/g, and an AV of at least 105 and at most 180, more preferably at least 110 and at most 175, even more preferably at least 120 and at most 170 mg KOH/g, most preferably at least 130 and at most 170 mg KOH/g.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 1 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

2. The Process for Making the Polymer

The Polymer may be prepared via a variety of processes as explained in this section. The processes disclosed in section 2 are not meant to be exhaustive.

2.1 Broadly in accordance with the invention, there is provided a process for preparing a Polymer, comprising the steps of:

a. providing:

a-i) a mono-epoxide selected from the group consisting of E4, E6, E7, E8, E9, E10, E11, E12, E13, E18, E19, E20, E23, E24, E25, E26, E27, E28, E29, E30, E31 and mixtures thereof, as each of E4 to E31 is represented by the following corresponding formula:

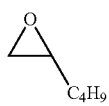

E4

-continued

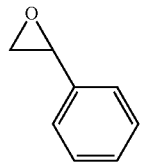

E6

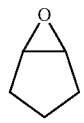

E7

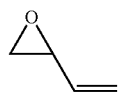

E8

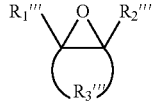

E9

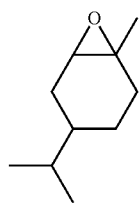

E10

E11

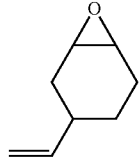

E12

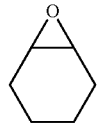

E13

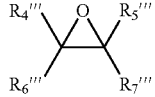

E18

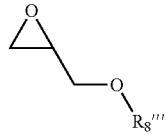

E19

-continued

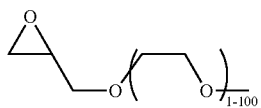

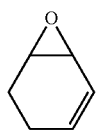

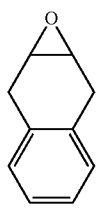

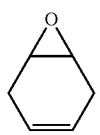

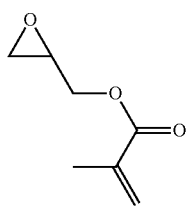

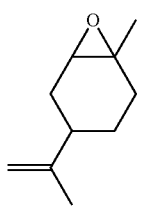

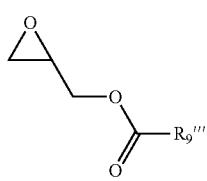

-continued

E20

E23

E24

E25 wherein
$R_1'''$, $R_2'''$ is independently selected from the group consisting of H and $CH_3$, and
$R_3'''$, is a $CH_2$ or $C_2$-$C_{34}$ optionally-substituted-hydrocarbylene, and
$R_4'''$ $R_5'''$ $R_6'''$ $R_7'''$ is independently selected from the group consisting of H, $CH_3$, and $C_2$-$C_{34}$ optionally-substituted-hydrocarbyl, E26 $R_8'''$, $R_9'''$ is independently selected from $C_1$-$C_{34}$ optionally-substituted-hydrocarbyl, and
$R_{10}'''$, $R_{11}'''$ is independently selected from $C_1$-$C_{12}$ saturated-hydrocarbyl, and
$R_{12}'''$ is $C_4$-$C_{34}$ unsaturated-acyclic-hydrocarbyl,
and wherein none of $R_1'''$ to $R_{12}'''$ comprises any anhydride E27 group.
a-ii) a reagent A selected from the group consisting of trimellitic acid anhydride, trimellitic acid, citric acid anhydride, citric acid and mixtures thereof, and
a-iii) optionally a catalyst A, and
a-iv) optionally an organic solvent, and
a-v) optionally a reagent B selected from the group comprising of anhydride A, cyclic ester and mixtures thereof, and
b. charging a-i) to a-v) provided in step a. into a reaction vessel to form a reaction mixture, and
c. polymerizing the reaction mixture,
c-i) at a temperature of at least 60 and at most 200° C., preferably at least 80 and at most 180° C., more preferably at least 90 and at most 170° C., even more preferably at least 100 and at most 160° C. most preferably at least 105 and at most 155° C., especially at least 110 and at most 145° C., and
c-ii) for a time of at least 0.5 hours and at most 200 hours, preferably for at least 0.5 hours and at most 100 hours, more preferably for at least 0.5 and at most 80 hours, even more preferably of at least 0.5 and at most 60 hours, most preferably of at least 0.5 and at most 48 hours, especially of at least 0.5 and at most 36 hours, more especially of at least 0.5 and at most 24 hours, most especially at least 0.5 hours and at most 12 hours, for example at least 0.5 hours and at most 10 hours, for example at least 0.5 hours and at most 8 hours, for example at least 0.5 hours and at most 6 hours, for example at least 0.5 hours and at most 4 hours, for example at least 0.5 hours and at most 3 hours, for example at least 0.5 hours and at most 2 hours, and
c-iii) removing water by applying vacuum, if water is formed during the polymerization of the reaction mixture, and c-iv) optionally applying pressure with the proviso that vacuum and pressure are not applied at the same time, said pressure being at least 0.001 and at most 50 MPa, more preferably at least 0.01 and at most 5, even more preferably at least 0.1 and at most 1 MPa, to afford the Polymer, and d. discharging the Polymer from the reaction vessel and collecting said Polymer.

The molar ratio L between the moles of monoepoxide as defined in a-i) and the moles of reagent A as defined in a-ii), Molar ratio $L$=moles of monoepoxide/moles of reagent $A$ is at least 0.1 preferably at least 0.3, and at most 2.9, preferably at most 2.8. Preferably the molar ratio L is at least 0.9 and at most 1.1, more preferably the molar ratio L is 1.

The selection of the mono-epoxide and reagent A used in the above process determines at least the type of the X, Y, Z and T and the type of S1, S2, S3 and S4 units of the Polymer.

The process described in this paragraph used for the preparation of the Polymer favors the reaction between anhydrides and epoxides over a typical esterification reaction. For example, evidence for the presence of the carboxylic acid group contained in units S1, S2, S3 and S4 is also shown in the Examples (see example referring to polymer PEX1).

2.2 Preferably the process is as disclosed in paragraph 2.1 wherein the mono-epoxide is selected from the group consisting of E2, E3, E4, E6, E7, E8, E9, E10, E11, E12, E13, E18, E19, E20, E23, E24, E25, E26, E27, E28, E29, E30, E31 and mixtures thereof.

2.3 Preferably the process is as disclosed in paragraph 2.1 wherein the mono-epoxide is selected from the group consisting of E3, E4, E6, E7, E8, E9, E10, E11, E12, E13, E18, E19, E20, E23, E24, E25, E26, E27, E28, E29, E30, E31 and mixtures thereof.

2.4 Preferably the process is as disclosed in paragraph 2.1 wherein the mono-epoxide is selected from the group consisting of E4, E6, E7, E8, E9, E10, E11, E12, E13, E18, E19, E20, E23, E24, E25, E26, E27, E28, E29, E30, E31 and mixtures thereof.

2.5 Preferably the process is as disclosed in paragraph 2.1 wherein the mono-epoxide is selected from the group consisting of E6, E7, E8, E9, E10, E11, E12, E13, E18, E19, E20, E23, E24, E25, E26, E27, E28, E29, E30, E31 and mixtures thereof.

2.6 Preferably the process is as disclosed in paragraph 2.1 wherein the mono-epoxide is selected from the group consisting of E6, E7, E8, E9, E10, E11, E12, E13, E18, E19, E20, E23, E24, E25, E26, E27, E28, E29, E30, E31 and mixtures thereof.

2.7 Preferably the process is as disclosed in paragraph 2.1 wherein the mono-epoxide is selected from the group consisting of E7, E8, E9, E10, E11, E12, E13, E18, E19, E20, E23, E24, E25, E26, E27, E28, E29, E30, E31 and mixtures thereof.

2.8 Preferably the process is as disclosed in paragraph 2.1 wherein the mono-epoxide is selected from the group consisting of E8, E9, E10, E11, E12, E13, E18, E19, E20, E23, E24, E25, E26, E27, E28, E29, E30, E31 and mixtures thereof.

2.9 Preferably the process is as disclosed in paragraph 2.1 wherein the mono-epoxide is selected from the group consisting of E9, E10, E11, E12, E13, E18, E19, E20, E23, E24, E25, E26, E27, E28, E29, E30, E31 and mixtures thereof.

2.10 Preferably the process is as disclosed in paragraph 2.1 wherein the mono-epoxide is selected from the group consisting of E10, E11, E12, E13, E18, E19, E20, E23, E24, E25, E26, E27, E28, E29, E30, E31 and mixtures thereof.

2.11 Preferably the process is as disclosed in paragraph 2.1 wherein the mono-epoxide is selected from the group consisting of E11, E12, E13, E18, E19, E20, E23, E24, E25, E26, E27, E28, E29, E30, E31 and mixtures thereof.

2.12 Preferably the process is as disclosed in paragraph 2.1 wherein the mono-epoxide is selected from the group consisting of E12, E13, E18, E19, E20, E23, E24, E25, E26, E27, E28, E29, E30, E31 and mixtures thereof.

2.13 Preferably the process is as disclosed in paragraph 2.1 wherein the mono-epoxide is selected from the group consisting of E13, E18, E19, E20, E23, E24, E25, E26, E27, E28, E29, E30, E31 and mixtures thereof.

2.14 Preferably the process is as disclosed in paragraph 2.1 wherein the mono-epoxide is selected from the group consisting of E18, E19, E20, E23, E24, E25, E26, E27, E28, E29, E30, E31 and mixtures thereof.

2.15 Preferably the process is as disclosed in paragraph 2.1 wherein the mono-epoxide is selected from the group consisting of E15, E16, E17, E18, E19, E20, E23, E24, E25, E26, E27, E28, E29, E30, E31 and mixtures thereof.

2.16 Preferably the process is as disclosed in paragraph 2.1 wherein the mono-epoxide is selected from the group consisting of E16, E17, E18, E19, E20, E23, E24, E25, E26, E27, E28, E29, E30, E31 and mixtures thereof.

2.17 Preferably the process is as disclosed in paragraph 2.1 wherein the mono-epoxide is selected from the group consisting of E17, E18, E19, E20, E23, E24, E25, E26, E27, E28, E29, E30, E31 and mixtures thereof.

2.18 Preferably the process is as disclosed in paragraph 2.1 wherein the mono-epoxide is selected from the group consisting of E18, E19, E20, E23, E24, E25, E26, E27, E28, E29, E30, E31 and mixtures thereof.

2.19 Preferably the process is as disclosed in paragraph 2.1 wherein the mono-epoxide is selected from the group consisting of E19, E20, E23, E24, E25, E26, E27, E28, E29, E30, E31 and mixtures thereof.

2.20 Preferably the process is as disclosed in paragraph 2.1 wherein the mono-epoxide is selected from the group consisting of E20, E23, E24, E25, E26, E27, E28, E29, E30, E31 and mixtures thereof.

2.21 Preferably the process is as disclosed in paragraph 2.1 wherein the mono-epoxide is selected from the group consisting of E23, E24, E25, E26, E27, E28, E29, E30, E31 and mixtures thereof.

2.22 Preferably the process is as disclosed in paragraph 2.1 wherein the mono-epoxide is selected from the group consisting of E22, E23, E24, E25, E26, E27, E28, E29, E30, E31 and mixtures thereof.

2.23 Preferably the process is as disclosed in paragraph 2.1 wherein the mono-epoxide is selected from the group consisting of E23, E24, E25, E26, E27, E28, E29, E30, E31 and mixtures thereof.

2.24 Preferably the process is as disclosed in paragraph 2.1 wherein the mono-epoxide is selected from the group consisting of E24, E25, E26, E27, E28, E29, E30, E31 and mixtures thereof.

2.25 Preferably the process is as disclosed in paragraph 2.1 wherein the mono-epoxide is selected from the group consisting of E12, E13, E24, E25, E26, E27, E28, E29, E30, E31 and mixtures thereof.

2.26 Preferably the process is as disclosed in paragraph 2.1 wherein the mono-epoxide is selected from the group consisting of E25, E26, E27, E28, E29, E30, E31 and mixtures thereof.

2.27 Preferably the process is as disclosed in paragraph 2.1 wherein the mono-epoxide is selected from the group consisting of E26, E27, E28, E29, E30, E31 and mixtures thereof.

2.28 Preferably the process is as disclosed in paragraph 2.1 wherein the mono-epoxide is selected from the group consisting of E27, E28, E29, E30, E31 and mixtures thereof.

2.29 Preferably the process is as disclosed in paragraph 2.1 wherein the mono-epoxide is selected from the group consisting of E28, E29, E30, E31 and mixtures thereof.

2.30 Preferably the process is as disclosed in paragraph 2.1 wherein the mono-epoxide is selected from the group consisting of E29, E30, E31 and mixtures thereof.

2.31 Preferably the process is as disclosed in paragraph 2.1 wherein the mono-epoxide is selected from the group consisting of E30, E31 and mixtures thereof.

2.32 Preferably the process is as disclosed in paragraph 2.1 wherein the mono-epoxide is E30.

2.33 Preferably the process is as disclosed in paragraph 2.1 wherein the mono-epoxide is E31.

2.34 Preferably the process is as disclosed in paragraph 2.1 wherein the mono-epoxide is selected from the group consisting of E28, E30, E31 and mixtures thereof.

2.35 Preferably the process is as disclosed in paragraph 2.1 wherein the mono-epoxide is selected from the group consisting of E12, E13, E30, E31 and mixtures thereof.

2.36 Preferably the process is as disclosed in paragraph 2.1 wherein the mono-epoxide is selected from the group consisting of E12, E13, E28, E29, E30, E31 and mixtures thereof.

2.37 Preferably the process is as disclosed in any one of paragraphs 2.1 to 2.36.

If desired, additives such anti-oxidants, flow additives, tribo additives can be added to the polymer obtained by the process as disclosed in 2.37 whilst the polymer is in the reaction vessel and prior the polymer is discharged as mentioned herein; this addition typically takes place at temperatures in the range of 60-210° C. or in the range of 80-195° C. If said additives are mixed within the polymer, a reasonable amount of time to ensure proper mixing of the additive into the polymer is carried out; for example the mixing can last from 15 to 60 min at temperatures in the range of 80-195° C.; subsequently, the polymer is ready for being discharged and collected.

Broadly in accordance with the invention there is provided a Polymer obtained by any one of the processes disclosed in this section, thus any one of processes disclosed in any one of paragraphs 2.1 to 2.37.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 1 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

3. The Composition of the Invention ('Composition)

The composition of the invention ('Composition') comprises the binder of the invention ('Binder') and may optionally comprise a constituent B. Thus, the Binder and the constituent B—when the latter is present—are components of the Composition.

The Composition may be liquid or solid. if the Composition is liquid, then the Composition is preferably water-borne or solvent-borne, more preferably the Composition is water-borne, even more preferably the Composition is a water reducible composition, or a latex composition or an emulsion, most preferably the Composition is a water reducible composition or an emulsion, especially the Composition is a water reducible composition. When the Composition is solid, then the Composition is preferably in the form of distinct particles (particulate composition) or a paste, more preferably is a powder or a paste, more preferably is a powder.

By 'Binder' is meant herein the total of functional polymers and the total of constituent A contained in a Composition; the Binder is obviously a component of the component of the Composition.

By 'constituent A' is meant herein a component of the Composition wherein said component is selected from the group consisting of organic metal salt, thermal initiator, photoinitiator, copolymerizable agent and mixtures thereof. In other words the constituent A is selected from the group consisting of organic metal salt, thermal initiator, photoinitiator, copolymerizable agent and mixtures thereof.

Preferably the Composition comprises the Binder in an amount of at least 1 and at most 100 pph Composition. Preferably, the Composition comprises the Binder in an amount of at least 5, more preferably at least 10, even more preferably at least 20, most preferably at least 30, especially at least 40, more especially at least 45, even more especially at least 50, most especially at least 60, for example at least 70, for example at least 75, for example at least 80, for example at least 85, for example at least 90, for example at least 92, for example at least 94, for example at least 96, for example at least 97, for example at least 98, for example at least 99 pph Composition. Preferably the Composition comprises the Binder in an amount of at most 100, more preferably at most 98, even more preferably at most 97, most preferably at most 96, especially at most 94, more especially at most 92, even more especially at most 90, most especially at most 85, for example at most 80, for example at most 75, for example at most 70, for example at most 60, for example at most 50, for example at most 45, for example at most 40, for example at most 35, for example at most 30, for example at most 20, for example at most 15 pph Composition.

Preferably the Composition is the Binder.

The Binder may be liquid or solid. When the Binder is liquid, then the Binder is preferably water-borne or solvent-borne, more preferably the Binder is a water reducible Binder, or a latex Binder or an emulsion. When the Binder is solid, then the Binder is preferably in the form of distinct particles (particulate Binder) or a paste, more preferably is a powder or a paste, more preferably is a powder. When the Composition is liquid, then the Binder is preferably water-borne or solvent-borne, more preferably the Binder is a water reducible Binder, or a latex, or an emulsion. When the Composition is solid, then the Binder is preferably in the form of distinct particles (particulate Binder) or a paste, more preferably is a powder or a paste, more preferably is a powder.

Preferably, the Binder comprises the Polymer in an amount of at least 1 and at most 99.999 pph Binder.

Preferably, the Binder comprises the Polymer in an amount of at least 5, more preferably at least 10, even more preferably at least 20, most preferably at least 30, especially at least 40, more especially at least 45, even more especially at least 50, most especially at least 60, for example at least 70, for example at least 75, for example at least 80, for example at least 85, for example at least 90, for example at least 92, for example at least 94, for example at least 96, for example at least 97, for example at least 98, for example at least 99 pph Binder. Preferably the Binder comprises the Polymer in an amount of at most 99, more preferably at most 98, even more preferably at most 97, most preferably at most 96, especially at most 94, more especially at most 92, even more especially at most 90, most especially at most 85, for example at most 80, for example at most 75, for example at most 70, for example at most 60, for example at most 50, for example at most 45, for example at most 40, for example at most 35, for example at most 30, for example at most 20, for example at most 15 pph Binder.

Preferably, the Binder comprises the constituent A in an amount of at least 0.001 and at most 90 pph Binder. Preferably, the Binder comprises the constituent A in an amount of at least 0.05, more preferably at least 1, even more preferably at least 2, most preferably at least 3, especially at least 4, more especially at least 5, even more especially at least 6, most especially at least 7, for example at least 8, for example at least 9, for example at least 10, for example at least 15, for example at least 20, for example at least 22, for example at least 25, for example at least 30, for example at least 35, for example at least 40, for example at least 45 pph Binder. Preferably the Binder comprises the constituent A in an amount of at most 90, more preferably at most 85, even more preferably at most 80, most preferably at most 75, especially at most 70, more especially at most 65, even more especially at most 60, most especially at most 55, for example at most 50, for example at most 45, for example at most 40, for example at most 35, for example at most 30, for example at most 25, for example at most 20, for example at most 15, for example at most 12, for example at most 9, for example at most pph Binder.

Preferably, the Binder comprises an organic metal salt in an amount of at least 0.0005 and at most 5 pph Binder. Preferably, the Binder comprises an organic metal salt in an amount of at least 0.001, and at most 4 pph Binder, more preferably at least 0.002 and at most 3 pph Binder, even more preferably at least 0.003 and at most 2 pph Binder, most preferably at least 0.004 and at most 1 pph Binder, especially at least 0.005 and at most 0.5 pph Binder.

Preferably, the Binder comprises a photoinitiator in an amount of at least 0.001 and at most 15 pph Binder. Preferably, the Binder comprises a photoinitiator in an amount of at least 0.1, and at most 10 pph Binder, more preferably at least 0.5 and at most 5 pph Binder.

Preferably, the Binder comprises a thermal initiator in an amount of least 0.001 and at most 20 pph Binder. Preferably, the Binder comprises a thermal initiator in an amount of at least 0.1, and at most 15 pph Binder, more preferably at least 0.5 and at most 12 pph Binder, even more preferably of at least 1 and at most 10 pph Binder.

Preferably, the Binder comprises a copolymerizable agent in an amount of at least 0.01 and at most 90 pph Binder. Preferably, the Binder comprises a copolymerizable agent in an amount of at least 0.5, more preferably at least 1, even more preferably at least 2, most preferably at least 3, especially at least 4, more especially at least 5, even more especially at least 6, most especially at least 7, for example at least 8, for example at least 9, for example at least 10, for example at least 15, for example at least 20, for example at least 22, for example at least 25, for example at least 30, for example at least 35, for example at least 40, for example at least 45 pph Binder. Preferably the Binder comprises a copolymerizable agent in an amount of at most 90, more preferably at most 85, even more preferably at most 80, most preferably at most 75, especially at most 70, more especially at most 65, even more especially at most 60, most especially at most 55, for example at most 50, for example at most 45, for example at most 40, for example at most 35, for example at most 30, for example at most 25, for example at most 20, for example at most 15, for example at most 10, for example at most 9, for example at most 8 pph Binder.

The Binder maybe liquid or solid. When the Binder is liquid, then the Binder is preferably an emulsion, or an aqueous solution, or an aqueous dispersion, or a solution in an organic solvent, or a dispersion in an organic solvent, or an aqueous solution containing an organic cosolvent, or an aqueous dispersion containing an organic cosolvent. When the Binder is solid, then the Binder is preferably in the form of distinct particles (particulate Binder) or a paste, more preferably is a powder or a paste, more preferably is a powder.

Preferably the Composition comprises the Binder in an amount of at least 1 and at most 100 pph Composition, and wherein the Binder comprises:

a) a Polymer in an amount of at least 1 and at most 99.999 pph Binder, and b) a constituent A in an amount of at least 0.001 and at most 90 pph.

Preferably the Composition comprises the Binder in an amount of at least 1 and at most 100 pph Composition, and wherein the Binder comprises:

a) a Polymer in an amount of at least 1 and at most 99 pph Binder, and b) a copolymerizable agent in an amount of at least 1 and at most 80 pph Binder.

Preferably the Composition comprises the Binder in an amount of at least 1 and at most 100 pph Composition, and wherein the Binder comprises:

a) a Polymer in an amount of at least 1 and at most 99.999 pph Binder, and b) an organic metal salt in an amount of at least 0.001 and at most 5 pph Binder.

Preferably the Composition comprises the Binder in an amount of at least 1 and at most 100 pph Composition, and wherein the Binder comprises:

a) a Polymer in an amount of at least 1 and at most 99.999 pph Binder, and b) a thermal initiator in an amount of at least 0.001 and at most 20 pph Binder.

Preferably the Composition comprises the Binder in an amount of at least 1 and at most 100 pph Composition, and wherein the Binder comprises:

a) a Polymer in an amount of at least 1 and at most 99.999 pph Binder, and b) a photoinitiator in an amount of at least 0.001 and at most 15 pph Binder.

Preferably the Composition comprises the Binder in an amount of at least 1 and at most 100 pph Composition, and wherein the Binder comprises:

a) a Polymer as disclosed in anyone of paragraphs 1.128 to 1.132, in an amount of at least 1 and at most 99.999 pph Binder, and b) the constituent A in an amount of at least 0.001 and at most 90 pph.

Preferably the Composition comprises the Binder in an amount of at least 1 and at most 100 pph Composition, and wherein the Binder comprises:
  a) a Polymer as disclosed in anyone of paragraphs 1.133 to 1.136, in an amount of at least 1 and at most 99.999 pph Binder, and
  b) a constituent A in an amount of at least 0.001 and at most 90 pph.

Preferably the Composition comprises the Binder in an amount of at least 1 and at most 100 pph Composition, and wherein the Binder comprises:
  a) a Polymer as disclosed in anyone of paragraphs 1.128 to 1.132, in an amount of at least 1 and at most 99.999 pph Binder, and
  b) an organic metal salt in an amount of at least 0.001 and at most 5 pph Binder.

Preferably the Composition is liquid and comprises the Binder in an amount of at least 1 and at most 100 pph Composition, and wherein the Binder comprises:
  a) a Polymer as disclosed in anyone of paragraphs 1.128 to 1.132, in an amount of at least 1 and at most 99.999 pph Binder, and
  b) an organic metal salt in an amount of at least 0.001 and at most 5 pph Binder.

Preferably the water-borne Composition comprises the Binder in an amount of at least 1 and at most 100 pph Composition, and wherein the Binder comprises:
  a) a Polymer as disclosed in anyone of paragraphs 1.128 to 1.132, in an amount of at least 1 and at most 99.999 pph Binder, and
  b) an organic metal salt in an amount of at least 0.001 and at most 5 pph Binder.

Preferably the water-reducible Composition comprises the Binder in an amount of at least 1 and at most 100 pph Composition, and wherein the Binder comprises:
  a) a Polymer as disclosed in anyone of paragraphs 1.128 to 1.132, in an amount of at least 1 and at most 99.999 pph Binder, and
  b) an organic metal salt in an amount of at least 0.001 and at most 5 pph Binder.

Preferably the Composition is an emulsion and comprises the Binder in an amount of at least 1 and at most 100 pph Composition, and wherein the Binder comprises:
  a) a Polymer as disclosed in anyone of paragraphs 1.128 to 1.132, in an amount of at least 1 and at most 99.999 pph Binder, and
  b) an organic metal salt in an amount of at least 0.001 and at most 5 pph Binder.

Preferably the solvent-borne Composition comprises the Binder in an amount of at least 1 and at most 100 pph Composition, and wherein the Binder comprises:
  a) a Polymer as disclosed in anyone of paragraphs 1.128 to 1.132, in an amount of at least 1 and at most 99.999 pph Binder, and
  b) an organic metal salt in an amount of at least 0.001 and at most 5 pph Binder.

Preferably the Composition is a powder composition and comprises the Binder in an amount of at least 1 and at most 100 pph Composition, and wherein the Binder comprises:
  a) a Polymer as disclosed in paragraphs 1.133 to 1.136, in an amount of at least 1 and at most 99 pph Binder, and
  b) a copolymerizable agent in an amount of at least 1 and at most 80 pph Binder.

Preferably the Composition is a heat-curable powder composition and comprises the Binder in an amount of at least 1 and at most 100 pph Composition, and wherein the Binder comprises:
  a) a Polymer as disclosed in paragraphs 1.133 to 1.136, in an amount of at least 1 and at most 99 pph Binder, and
  b) a copolymerizable agent in an amount of at least 1 and at most 80 pph Binder.

Preferably the Composition is a heat-curable powder coating composition and comprises the Binder in an amount of at least 1 and at most 100 pph Composition, and wherein the Binder comprises:
  a) a Polymer as disclosed in paragraphs 1.133 to 1.136 in an amount of at least 1 and at most 99 pph Binder, and
  b) a copolymerizable agent in an amount of at least 1 and at most 80 pph Binder.

The Composition may optionally comprise a constituent B.

The constituent B is selected from the group consisting of pigment, dye, additive and mixtures thereof. In general the amount of constituent B in the Composition may be at least 0.1 and at most 100 pph Binder, preferably at least 0.1 and at most 60 pph Binder.

Pigments are insoluble, fine particle size materials (typical particle ranges from 0.01 to 100 micron) that are mainly used to provide color and reduce cost. In general the amount of pigment in the Composition may be at least 0.1 and at most 100 pph Binder, preferably at least 0.1 and at most 60 pph Binder. Pigments are divided into four broad classes: white, colour, inert, and functional pigments. Exemplary pigments include but are not limited to carbon black, shepard black No. 1, titanium dioxide white, chromium oxide green, zinc oxide, iron oxide yellows, reds, browns and blacks, such as ferrite yellow oxide, ferric oxides, raw sienna and burnt sienna, lead chromate, copper phthalonitrile blue, phthalocyanine blues and greens, ultramarine blue, toluidine red, parachlor red, cadmium reds and yellows, phthaloorganamine blues and greens, iron blues, organic maroons, anatase titanium dioxide, zinc sulfide, and the mixed metal oxide pigments, such as manganese ferrite black, chromium green black hematite, cobalt aluminate blue spinel, copper chromite black spinel, and sodium alumina sulfosilicate, metallics made with aluminum, mica, or brass. Fillers are inert pigments typically used to occupy volume in the coating and reduce the coating's cost. Exemplary fillers include but are not limited to silica, such as fumed silica, glass frit, flour, calcium carbonate, barium sulfate, mica, ammonium chloride, ammonium bromide, boric acid, antimony trioxide, fumed alumina, clays such as kaolin, china clay, talc, lithopone, zinc sulfide, lead titanate, zirconium oxide, white lead, barium oxide, calcium oxide or hydroxide, magnesium oxide or hydroxide, chalk, asbestos, ceramic, hollow glass, resin microspheres, pearl essence, barytes, diatomaceous earth, aluminum trihydrate, onyx flour, calcium silicate, mixed silicates.

Dyes are soluble colored substances used to impart color to a coating. In general the amount of dyes in the Composition may be at least 0.01 and at most 7 pph Binder, preferably at least 0.1 and at most 5 pph Binder. Exemplary dyes include but are not limited to metal complex dyes, anionic dyes, and azo dyes. Metal complex dyes consist of a metal atom (generally Cr, Cu, Co, Ni) which is coordinated with chelating ligands mainly azo dyes via O and N atoms. Anionic dyes (known also as acid dyes) are azo dyes containing one or more sulphonic groups. Pararosanil, methyl violet, crystal violet, methyl green are typical examples of dyes.

Additives are substances added to a composition in small quantities (typically from 0.1 to 8 pph Binder) in order to impart specific properties to the composition or to the coating produced from the composition. Exemplary additives include but are not limited to gloss control aids, flow aids, thixotropic agents, leveling agents, wetting and dispersing agents, anti-cratering agents, light stabilizers, biocides, surface active additives. Exemplary gloss control agents are polyethylene waxes, oxidized polyethylenes, polyamides, teflons. Exemplary flow aids include but are not limited to acrylic or silicone flow aids, which are composed of acrylic or silicone resins, respectively. The acrylic resins are generally liquids which have been converted to powder form by absorption onto silica-type materials. Examples of acrylic flow aids are Resiflow® P67 which is a 2-propenoic acid, ethyl ester polymer BYK® 352 and BYK® 300. Anti-cratering aids can be used in these formulations to reduce or eliminate bubbles or trapped gas from the substrate or coating. Typical anti-cratering agents include, benzoin (2-hydroxy-1,2-diphenylethanone) and its analogs, and plasticizers, such as low molecular weight phenoxies and phthalates.

If the Composition is liquid, then it may or may not comprise an organic solvent. Exemplary organic solvents include but are not limited mineral spirits, benzene, xylene, naphtha type solvents, toluene, n-butyl acetate, isobutyl acetate, t-butyl acetate, ethyl acetate, n-propyl acetate, isopropyl acetate, ethyl acetate, methyl acetate, trimethylpentanediol mono-isobutyrate, ethylene glycol mono-octyl ether, diacetone alcohol, ester alcohols e.g. those available by Eastman under the trade name Texanol™, alcohol ethers, alcohol ether acetates, ethyl diglycol, ethyl glycol acetate, butyl glycol, butyl glycol acetate, butyl diglycol, butyl diglycol acetate, and methoxypropylene glycol acetate, methyl ethyl ketone, acetone, methyl isobutyl ketone, methyl isoamyl ketone, methyl amyl ketone, hydrocarbons e.g. aliphatic hydrocarbons, cycloaliphatic hydrocarbons, aromatic hydrocarbons, some of them available by Shell under the trade name ShellSol® e.g. ShellSol® H, ShellSol® K, AB, ShellSol® T, some others available by Esso under the trade names Solvesso™ and Exxsol™ e.g. Solvesso™ 150, Exxsol™ D30, Exxsol™ D40, Exxsol™ D60, and any combination of any one of the above mentioned in this paragraph. If the Composition comprises an organic solvent, then the preferably the Composition comprises organic solvent in an amount of at most 40, more preferably at most 30, even more preferably at most 20, most preferably at most 10, especially at most 5, more especially at most 2, most especially at most 1 pph Composition.

If the Composition is liquid, then it may or may not comprise an organic cosolvent. If the Composition comprises an organic cosolvent, then the preferably the Composition comprises organic cosolvent in an amount of at most 15 Composition, more preferably at most 10, even more preferably at most 8, most preferably at most 5, especially at most 3, more especially at most 2, most especially at most 1 pph Composition.

Each of the Polymer, the Binder and the Composition is particularly suitable for paints and coatings. Paints include water-borne, solvent-borne and powder paints. Hence, Compositions that are suitable for paints and coatings are herein called coating Compositions. Preferably the Composition is a coating composition, more preferably the Composition is a coating composition selected from the group consisting of water-borne coating composition, solvent-borne coating composition, and powder coating composition.

Preferably the Composition is a water-borne coating composition (or equally water-borne coating Composition). Water-borne coating compositions include: a) water-reducible coating compositions, b) latex coating compositions, and c) emulsions. Thus, the water-borne coating compositions of the invention may be water-reducible coating compositions (also known as aqueous dispersions), latex coating compositions or emulsions. The water-borne coating compositions may comprise organic cosolvent as this and its amount was disclosed above. Z. W. Wicks, Jr., F. N. Jones, S. P. Pappas, in 'Organic Coatings—Science & Technology', J. Wiley & Sons, 1999, $2^{nd}$ edition, Ch. 8, pp. 143-161, Ch. 25, pp. 467-476, explain the terminology used in the art of water-borne coating compositions and provide ways and methods for their preparation and further literature on this matter. Preferably the water-borne coating Compositions are r.t.-curable coating compositions.

Preferably the Composition is a solvent-borne coating composition, (or equally solvent-borne coating Composition) more preferably the Composition is a high-solids solvent-borne coating composition (or equally high-solids coating Composition). The solvent-borne coating compositions of the invention may comprise organic solvent as this and its amount was disclosed above. Z. W. Wicks, Jr., F. N. Jones, S. P. Pappas, in 'Organic Coatings—Science & Technology', J. Wiley & Sons, 1999, $2^{nd}$ edition, Ch. 24, pp. 453-466, explain the terminology used in the art of solvent-borne coating compositions and provide ways and methods for their preparation and further literature on this matter. Preferably the solvent-borne coating Compositions are r.t.-curable coating compositions.

3.1 the Powder Composition of the Invention ('Powder Composition)

In a preferred embodiment, the Composition is a powder composition (or equally powder Composition). In this sub-section 3.1 (including any and all sub-paragraphs 3.1.1-3.1.3, further (additional) preferment are disclosed. Any reference this sub-section 3.1 (including any and all sub-paragraphs under 3.1) to 'this embodiment' encompasses any and all disclosures of this sub-section 3.1 (including any and all sub-paragraphs).

This embodiment applies also and can be combined with the disclosures of the rest of the application, and as to the section 2 and 4 for as long as sections 2 and 4 are in connection to a powder Compositions or any sub-class of powder Compositions, e.g. heat-curable powder Compositions, heat-curable powder coating Compositions etc.

Any disclosure, preferment and combination of preferments disclosed in this embodiment in connection with the HCPCC (including processes, cured HCPCC etc.) applies equally and analogously for the powder coating Composition and the powder Composition that may be mentioned anywhere in this application. Any disclosure, preferment and combination of preferments disclosed in the entire application embodiment in connection with a powder Composition or a powder Composition (including processes, cured HCPCC etc.) applies equally and analogously for the HCPCC.

In the context of this embodiment, the copolymerizable agent is able to react with the Polymer P (including any one of Polymer P's preferments) and with the copolymerizable polymer A (including polymer B which is a preferment of a copolymerizable polymer A).

Preferably, the Composition is a heat-curable powder composition (or equally heat-curable powder Composition). Preferably, the Composition is a 1K heat-curable powder composition (or equally 1K heat-curable powder Composition). Preferably the Composition is a heat-curable powder coating composition (or equally heat-curable powder coating Composition, or equally HCPCC). Preferably the Composition is a 1K heat-curable powder coating composition (or equally 1K heat-curable powder coating Composition, or equally 1K-HCPCC). A Composition in the form of a powder suitable for being used to powder coat articles is a powder coating composition. Any preferments, combination of preferments disclosed in the entire application as to a heat-curable powder coating Composition apply equally for a heat-curable powder composition, 1K heat-curable powder composition, 1K heat-curable powder coating composition. Z. W. Wicks, Jr., F. N. Jones, S. P. Pappas, in 'Organic Coatings—Science & Technology', John Wiley & Sons, 1999, $2^{nd}$ edition, Ch. 27, pp. 486-507, and T. A. Misev in 'Powder Coatings—Chemistry & Technology', John Wiley & Sons, 1991, Ch. 2-6, pp. 9-360 (especially Ch. 3, pp. 42-173 for heat-curable powder coating compositions) explain the terminology used in the art of powder coating compositions and provide ways and methods for their preparation and further literature on this matter.

Thus, broadly in accordance with the invention, there is provided a powder Composition comprising a Binder in an amount of at least 10 and at most 100 pph powder Composition, and wherein the Binder comprises:
a) a Polymer in an amount of at least 10 and at most 99 pph Binder, preferably in an amount of at least and
b) a copolymerizable agent able to react with the Polymer in an amount of at least 1 and at most 90 pph Binder.

Broadly in accordance with the invention, there is provided a heat-curable powder Composition comprising a Binder in an amount of at least 10 and at most 100 pph heat-curable powder Composition, and wherein the Binder comprises:
a) a Polymer in an amount of at least 10 and at most 99 pph Binder, preferably in an amount of at least and
b) a copolymerizable agent able to react with the Polymer, in an amount of at least 1 and at most 90 pph Binder.

Broadly in accordance with the invention, there is provided a heat-curable powder coating Composition (HCPCC) comprising a Binder in an amount of at least 10 and at most 100 pph HCPCC, and wherein the Binder comprises:
a) a Polymer in an amount of at least 10 and at most 99 pph Binder, preferably in an amount of at least and
b) a copolymerizable agent able to react with the Polymer in an amount of at least 1 and at most 90 pph Binder.

Broadly in accordance with the invention, there is provided a heat-curable powder Composition comprising a Binder in an amount of at least 10 and at most 100 pph heat-curable powder Composition, and wherein the Binder comprises:
a) a Polymer as disclosed in anyone of paragraphs 1.133 to 1.136, in an amount of at least 10 and at most 99 pph Binder, preferably in an amount of at least and
b) a copolymerizable agent able to react with the Polymer in an amount of at least 1 and at most 90 pph Binder.

Broadly in accordance with the invention, there is provided a heat-curable powder coating Composition (HCPCC) comprising a Binder in an amount of at least 10 and at most 100 pph HCPCC, and wherein the Binder comprises:
a) a Polymer as disclosed in anyone of paragraphs 1.133 to 1.136, in an amount of at least 10 and at most 99 pph Binder, preferably in an amount of at least and
b) a copolymerizable agent able to react with the Polymer in an amount of at least 1 and at most 90 pph Binder.

The Polymer suitable for use in this embodiment is as disclosed in the entire application and as described in the claims. Further preferments for the Polymer suitable for use in the powder Composition or in the heat-curable powder Composition or in the heat-curable powder coating Composition, are provided in this embodiment and said preferments can be combined with the disclosures and preferments in connection with the Polymer shown in the entire application. For convenience and brevity the terms: i) 'the Polymer suitable for use in the powder Composition', ii) 'the Polymer suitable for use in the heat-curable Composition, and iii) 'the Polymer suitable for use in the HCPCC', are collectively encompassed and abbreviated as 'the Polymer P').

The Binder suitable for use in this embodiment is as disclosed in the entire application and as described in the claims. Further preferments for the Binder suitable for use in the powder Composition or in the heat-curable powder Composition or in the heat-curable powder coating Composition, are provided in this embodiment and said preferments can be combined with the disclosures and preferments in connection with the Binder shown in the entire application. For convenience and brevity the terms: i) 'the Binder suitable for use in the powder Composition', ii) 'the Binder suitable for use in the heat-curable Composition, and iii) 'the Binder suitable for use in the HCPCC', are collectively encompassed and abbreviated as 'the Binder P').

Preferably the Polymer P is PolymerCS. Preferably the Polymer is acid-functional (or equally acid-functional Polymer P). Preferably the Polymer P is PolymerCS P (that is a PolymerCS which is: i) suitable for use in the powder Composition, and ii) suitable for use in the heat-curable Composition, and iii) suitable for use in the HCPCC'). Preferably the Polymer is acid-functional PolymerCS P (or equally acid-functional PolymerCS P). Preferably, the acid-functional Polymer P and the acid-functional PolymerCS P are as disclosed in section 1 of this application. Any disclosure, preferment and combination of preferments disclosed in this embodiment in connection to the acid-functional PolymerCS P apply equally for the Polymer P1,1 P, the acid-functional Polymer P, and the Polymer P. Any disclosure, preferment and combination of preferments disclosed in this embodiment in connection to the Polymer P apply equally for the Polymer P1,1, the acid-functional Polymer P and the acid-functional PolymerCS P.

The Polymer has an AV of at least 105 and at most 180 mg KOH/g. Preferably the Polymer has an AV of at least 105 and at most 175, more preferably at most 170, most preferably at most 165, especially at most 160 mg KOH/g. Preferably the Polymer has an AV of at least 110 and at most 180, more preferably at most 175, most preferably at most 170, especially at most 165, more especially at most 160 mg KOH/g. Preferably the Polymer has an AV of at least 115 and at most 180, more preferably at most 175, most preferably at most 170, especially at most 165, more especially at most 160 mg KOH/g. Preferably the Polymer has an AV of at least 120 and at most 180, more preferably at most 175, most preferably at most 170, especially at most 165, more especially at most 160 mg KOH/g. Preferably the Polymer has an AV of at least 125 and at most 180, more preferably at most 175, most preferably at most 170, especially at most 165, more especially at most 160 mg KOH/g. Preferably the Polymer has an AV of at least 130 and at most 180, more preferably at most 175, most preferably at most 170, especially at most 165, more especially at most 160 mg KOH/g. Preferably the Polymer has an AV of at least 130 and at most 170 mg KOH/g.

The Polymer has a $T_g$ of at least 30 and at most 140° C.; preferably the Polymer P has a $T_g$ of at most 95° C. Preferably the Polymer has a $T_g$ of at least 35 and at most 140° C. Preferably the Polymer has a $T_g$ of at most 95, more preferably at most 90, even more preferably at most 85, most preferably at most 80, especially at most 75° C. Preferably the Polymer has a $T_g$ of at least 35, more preferably at least 40, even more preferably at least 45° C. Preferably the Polymer has a $T_g$ of at least 40 and at most 95, more preferably of at least 40 and at most 85° C., even more preferably of at least 40 and at most 80, most preferably of at least 40 and at most 75° C.

The acid-functional Polymer has a $T_g$ of at least 30 and at most 140° C.; preferably the acid-functional Polymer P has a $T_g$ of at most 95° C. Preferably the acid-functional Polymer has a $T_g$ of at least 35 and at most 140° C. Preferably the acid-functional Polymer has a $T_g$ of at most 95, more preferably at most 90, even more preferably at most 85, most preferably at most 80, especially at most 75° C. Preferably the acid-functional Polymer has a $T_g$ of at least 35, more preferably at least 40, even more preferably at least 45° C. Preferably the acid-functional Polymer has a $T_g$ of at least 40 and at most 95, more preferably of at least 40 and at most 85° C., even more preferably of at least 40 and at most 80, most preferably of at least 40 and at most 75° C.

The acid-functional Polymer has an AV of at least 105 and at most 180 mg KOH/g. Preferably the acid-functional Polymer has an AV of at least 105 and at most 175, more preferably at most 170, most preferably at most 165, especially at most 160 mg KOH/g. Preferably the acid-functional Polymer has an AV of at least 110 and at most 180, more preferably at most 175, most preferably at most 170, especially at most 165, more especially at most 160 mg KOH/g. Preferably the acid-functional Polymer has an AV of at least 115 and at most 180, more preferably at most 175, most preferably at most 170, especially at most 165, more especially at most 160 mg KOH/g. Preferably the acid-functional Polymer has an AV of at least 120 and at most 180, more preferably at most 175, most preferably at most 170, especially at most 165, more especially at most 160 mg KOH/g. Preferably the acid-functional Polymer has an AV of at least 125 and at most 180, more preferably at most 175, most preferably at most 170, especially at most 165, more especially at most 160 mg KOH/g. Preferably the acid-functional Polymer has an AV of at least 130 and at most 180, more preferably at most 175, most preferably at most 170, especially at most 165, more especially at most 160 mg KOH/g. Preferably the acid-functional Polymer has an AV of at least 130 and at most 170 mg KOH/g.

The acid-functional Polymer CS has a $T_g$ of at least 30 and at most 140° C.; preferably the acid-functional Polymer CS has a $T_g$ of at most 95° C. Preferably the acid-functional Polymer CS has a $T_g$ of at least 35 and at most 140° C. Preferably the acid-functional Polymer CS has a $T_g$ of at most 95, more preferably at most 90, even more preferably at most 85, most preferably at most 80, especially at most 75° C. Preferably the acid-functional Polymer CS has a $T_g$ of at least 35, more preferably at least 40, even more preferably at least 45° C. Preferably the acid-functional Polymer CS has a $T_g$ of at least 40 and at most 95, more preferably of at least 40 and at most 85° C., even more preferably of at least 40 and at most 80, most preferably of at least 40 and at most 75° C.

The acid-functional Polymer CS has an AV of at least 105 and at most 180 mg KOH/g. Preferably the acid-functional Polymer CS has an AV of at least 105 and at most 175, more preferably at most 170, most preferably at most 165, especially at most 160 mg KOH/g. Preferably the acid-functional Polymer CS has an AV of at least 110 and at most 180, more preferably at most 175, most preferably at most 170, especially at most 165, more especially at most 160 mg KOH/g. Preferably the acid-functional Polymer CS has an AV of at least 115 and at most 180, more preferably at most 175, most preferably at most 170, especially at most 165, more especially at most 160 mg KOH/g. Preferably the acid-functional Polymer CS has an AV of at least 120 and at most 180, more preferably at most 175, most preferably at most 170, especially at most 165, more especially at most 160 mg KOH/g. Preferably the acid-functional Polymer CS has an AV of at least 125 and at most 180, more preferably at most 175, most preferably at most 170, especially at most 165, more especially at most 160 mg KOH/g. Preferably the acid-functional Polymer CS has an AV of at least 130 and at most 180, more preferably at most 175, most preferably at most 170, especially at most 165, more especially at most 160 mg KOH/g. Preferably the acid-functional Polymer CS has an AV of at least 130 and at most 170 mg KOH/g.

The acid-functional Polymer P1,1 P has an AV of at least 105 and at most 180 mg KOH/g. Preferably the acid-functional Polymer P1,1 P has an AV of at least 105 and at most 175, more preferably at most 170, most preferably at most 165, especially at most 160 mg KOH/g. Preferably the acid-functional Polymer P1,1 P has an AV of at least 110 and at most 180, more preferably at most 175, most preferably at most 170, especially at most 165, more especially at most 160 mg KOH/g. Preferably the acid-functional Polymer P1,1 P has an AV of at least 115 and at most 180, more preferably at most 175, most preferably at most 170, especially at most 165, more especially at most 160 mg KOH/g. Preferably the acid-functional Polymer P1,1 P has an AV of at least 120 and at most 180, more preferably at most 175, most preferably at most 170, especially at most 165, more especially at most 160 mg KOH/g. Preferably the acid-functional Polymer P1,1 P has an AV of at least 125 and at most 180, more preferably at most 175, most preferably at most 170, especially at most 165, more especially at most 160 mg KOH/g. Preferably the acid-functional Polymer P1,1 P has an AV of at least 130 and at most 180, more preferably at most 175, most preferably at most 170, especially at most 165, more especially at most 160 mg KOH/g. Preferably the acid-functional Polymer P1,1 P has an AV of at least 130 and at most 170 mg KOH/g.

Preferably the acid-functional PolymerCS P has a OHV lower than 14 mg KOH/g, and an AV of at least 105 and at most 180, more preferably at least 110 and at most 175, even more preferably at least 120 and at most 170 mg KOH/g, most preferably at least 130 and at most 170 mg KOH/g.

Preferably the acid-functional Polymer P1,1 P has a OHV lower than 14 mg KOH/g, and an AV of at least 105 and at most 180, more preferably at least 110 and at most 175, even more preferably at least 120 and at most 170 mg KOH/g, most preferably at least 130 and at most 170 mg KOH/g.

The acid-functional Polymer P has an AV of at least 105 and at most 180 mg KOH/g. Preferably the acid-functional Polymer P has an AV of at least 105 and at most 175, more preferably at most 170, most preferably at most 165, especially at most 160 mg KOH/g. Preferably the acid-functional Polymer P has an AV of at least 110 and at most 180, more preferably at most 175, most preferably at most 170, especially at most 165, more especially at most 160 mg KOH/g. Preferably the acid-functional Polymer P has an AV of at least 115 and at most 180, more preferably at most 175, most preferably at most 170, especially at most 165, more especially at most 160 mg KOH/g. Preferably the acid-functional Polymer P has an AV of at least 120 and at most 180, more preferably at most 175, most preferably at most 170, especially at most 165, more especially at most 160 mg KOH/g. Preferably the acid-functional Polymer P has an AV of at least 125 and at most 180, more preferably at most 175, most preferably at most 170, especially at most 165, more especially at most 160 mg KOH/g. Preferably the acid-functional Polymer P has an AV of at least 130 and at most 180, more preferably at most 175, most preferably at most 170, especially at most 165, more especially at most 160 mg KOH/g. Preferably the acid-functional Polymer P has an AV of at least 130 and at most 170 mg KOH/g.

The acid-functional Polymer P has a $T_g$ of at least 30 and at most 140° C.; preferably the acid-functional Polymer P has a $T_g$ of at most 95° C. Preferably the acid-functional Polymer P has a $T_g$ of at least 35 and at most 140° C. Preferably the acid-functional Polymer P has a $T_g$ of at most 95, more preferably at most 90, even more preferably at most 85, most preferably at most 80, especially at most 75° C. Preferably the acid-functional Polymer P has a $T_g$ of at least 35, more preferably at least 40, even more preferably at least 45° C. Preferably the acid-functional Polymer P has a $T_g$ of at least 40 and at most 95, more preferably of at least 40 and at most 85° C., even more preferably of at least 40 and at most 80, most preferably of at least 40 and at most 75° C.

Preferably the acid-functional Polymer P has a OHV lower than 14 mg KOH/g, and an AV of at least 105 and at most 180, more preferably at least 110 and at most 175, even more preferably at least 120 and at most 170 mg KOH/g, most preferably at least 130 and at most 170 mg KOH/g.

Preferably the Polymer P has a functionality of at least 2; preferably the Polymer P has a functionality of at most 100. Preferably the Polymer P has a functionality of at most 90, more preferably at most 80, even more preferably at most 70, most preferably at most 60, especially at most 50, more especially at most 40, even more especially at most 30, most especially at most 25, for example at most 20, for example at most 18, for example at most 16, for example at most 15, for example at most 14, for example at most 12, for example at most 10 for example at most 9, for example at most 8, for example at most 7, for example at most 6, for example at most 5. Preferably the Polymer P has a functionality of at least 2.1, more preferably at least 2.2, even more preferably at least 2.3, most preferably at least 2.4, especially at least 2.5, more especially at least 2.6, even more especially at least 2.7, most especially at least 2.8, for example at least 2.9, for example at least 3, for example at least 4, for example at least 4.5, for example at least 5, for example at least 5.5, for example at least 6 for example at least 6.5, for example at least 6.8, for example at least 7, Preferably the Polymer P has a functionality of at least 3 and at most 25, more preferably at least 4 and at most 22, even more preferably at least 5 and at most 20, most preferably at least 6 and at most 19, especially at least 7 and at most 18. Preferably the Polymer P has a functionality of at least 1 and at most 5, more preferably the Polymer P has a functionality of at least 2 and at most 5, most preferably the Polymer P has a functionality of at least 3 and at most 7.

Preferably the Polymer P has a MRQ of at most 100.000. Preferably the Polymer P has a MRQ of at least 1 and at most 100.000. More preferably the Polymer P has a MRQ of at most 10.000, even more preferably at most 1.000, most preferably at most 200, especially at most 100, more especially at most 25, even more especially at most 22, most especially at most 17, for example at most 15, for example at most 13, for example at most 11, for example at most 9, for example at most 7.5, for example at most 6, for example at most 5, for example at most 4.3, for example at most 3.8, for example at most 3.5, for example at most 3.2, for example at most 3.2, for example at most 3.2, for example at most 3.2, for example at most 3, for example at most 2.8, for example at most 2.6, for example at most 2.5, for example at most 2.4, for example at most 2.3, for example at most 2.2, for example at most 2.1, for example at most 2, for example at most 1.9, for example at most 1.8, for example at most 1.7, for example at most 1.6, for example at most 1.5, for example at most 1.4, for example at most 1.3, for example at most 1.2, for example at most 1.1, for example at most 1.05, for example at most 1.02, for example at most 1.01, for example the MRQ is 1. Preferably the Polymer P has a MRQ of at least 1 and at most 15, even more preferably of at least 1 and at most 10, most preferably of at least 1 and at most 5, especially of at least 1 and at most 1.4, more especially of at least 1 and at most 1.3, most especially of at least 1 and at most 1.2, for example of at least 1 and at most 1.15, for example of at least 1 and at most 1.1, for example of at least 1 and at most 1.05, for example of at least 1 and at most 1.03, for example the Polymer P has a MRQ of 1.

Preferably the Polymer P has a $M_n$ of at least $3 \times 10^2$ Da; preferably the Polymer P has a $M_n$ of at most $20 \times 10^3$ Da. Preferably the Polymer P has a $M_n$ of at least $3.5 \times 10^2$ at most $15 \times 10^3$ Da. Preferably the Polymer P has a $M_n$ of at most $12 \times 10^3$, more preferably at most $10 \times 10^3$, even more preferably at most $9 \times 10^3$, most preferably at most $8 \times 10^3$, especially at most $7.5 \times 10^3$, more especially at most $7 \times 10^3$, even more especially at most $6 \times 10^3$, most especially at most $5 \times 10^3$, for example at most $4 \times 10^3$, Preferably the Polymer P has a $M_n$ of at least $4 \times 10^2$, more preferably at least $5 \times 10^2$, even more preferably at least $6 \times 10^2$, most preferably at least $7 \times 10^2$, especially at least $8 \times 10^2$, more especially at least $9 \times 10^2$, even more especially at least $10^3$, most especially at least $1.1 \times 10^3$, for example at least $1.2 \times 10^3$, for example at least $1.3 \times 10^3$, for example at least $1.4 \times 10^3$, for example at least $1.5 \times 10^3$, for example at least $1.6 \times 10^3$, for example at least $1.7 \times 10^3$, for example at least $1.8 \times 10^3$ for example at least $1.9 \times 10^3$, for example at least $2 \times 10^3$, Preferably the Polymer P has a $M_n$ of at least $3.5 \times 10^2$ and at most $10 \times 10^3$, more preferably at least $7 \times 10^2$ and at most $9 \times 10^3$, even more preferably at least $8 \times 10^2$ and at most $8 \times 10^3$, most preferably at least $9 \times 10^2$ and at most $7 \times 10^3$, especially at least $1 \times 10^3$ and at most $6 \times 10^3$, more especially at least $1.1 \times 10^3$ and at most $5 \times 10^3$, most especially at least $1.2 \times 10^3$ and at most $4 \times 10^3$ Da.

The Polymer P has a polydispersity (D) of at least 1.

Preferably the Polymer P has a polydispersity of at most 40. Preferably the Polymer P has a D of at most 20, more preferably at most 15, even more preferably at most 12, most preferably at most 10, especially at most 9.5, more especially at most 9, even more especially at most 8.5, most especially at most 8, for example at most 7.8, for example at most 7.5, for example at most 7.2, for example at most 7, for example at most 6.8, for example at most 6.6, for example at most 6.5 for example at most 6.4, for example at most 6.3, for example at most 6.2, for example at most 6.1, for example at most 6, for example at most 5.9, for example at most 5.8 for example at most 5.7 for example at most 5.6, example at most 5, example at most 4, example at most 3, for example at most 2.5. Preferably the Polymer P has a D of at least 1.01, more preferably at least 1.02, even more preferably at least 1.03, most preferably at least 1.04, especially at least 1.05, more especially at least 1.06, even more especially at least 1.07, most especially at least 1.08, for example at least 1.09, for example at least 1.1, for example at least 1.12, for example at least 1.15, for example at least 1.17, for example at least 1.19, for example at least 1.2, for example at least 1.25. Preferably the polymer has a polydispersity of at least 1.05 and at most 5, more preferably at least 1.1 and at most 4, even more preferably at least 1.1 and at most 3, most preferably at least 1.1 and at most 2. Preferably the Polymer P has a polydispersity of at least 1.05 and at most 5, more preferably the Polymer P has a polydispersity of at least 1.15 and at most 4, even more preferably at least 1.2 and at most 3, most preferably at least 1.25 and at most 2.5.

The Polymer P has a $T_g$ of at least 30 and at most 140° C.; preferably the Polymer P has a $T_g$ of at most 95° C. Preferably the Polymer P has a $T_g$ of at least 35 and at most 140° C. Preferably the Polymer P has a $T_g$ of at most 95, more preferably at most 90, even more preferably at most 85, most preferably at most 80, especially at most 75° C. Preferably the Polymer P has a $T_g$ of at least 35, more preferably at least 40, even more preferably at least 45° C. Preferably the Polymer P has a $T_g$ of at least 40 and at most 95, more preferably of at least 40 and at most 85° C., even more preferably of at least 40 and at most 80, most preferably of at least 40 and at most 75° C.

Preferably, each of the Polymer P and the Binder P is solid. Preferably, the Binder P has a $T_g$ of at least 20 and at most 160, more preferably at least 25 and at most 140, most preferably at least 30 and at most 120, especially at least 35 and at most 100, more especially at least 40 and at most 90° C.

Preferably the HCPCC comprises a Binder P in an amount of at least 15, more preferably of at least 20, even more preferably of at least 30, most preferably of at least 35, especially of at least 40, more especially of at least 45, even more especially of at least 50, most especially of at least 60, for example of at least 70, for example of at least 75, for example of at least 80, for example of at least 85, for example of at least 90, for example of at least 92, for example of at least 94, for example of at least 96, for example of at least 97, for example of at least 98, for example of at least 99 pph HCPCC. Preferably the HCPCC comprises a Binder P in an amount of at most 99, more preferably of at most 98, even more preferably of at most 97, most preferably of at most 96, especially of at most 94, more especially of at most 92, even more especially of at most 90, most especially of at most 85, for example of at most 80, for example of at most 75, for example of at most 70, for example of at most 60, for example of at most 50, for example of at most 45, for example of at most 40, for example of at most 35, for example of at most 30, for example of at most 20, for example of at most 15 pph HCPCC.

The Binder P comprises a Polymer P in an amount of at least 10 and at most 99 pph Binder P. Preferably, the Binder P comprises a P1 in an amount of at least 15, more preferably in an amount of at least 20, even more preferably in an amount of at least 25, most preferably of at least 30, especially in an amount of at least 35, more especially in an amount of at least 40, even more especially in an amount of at least 45 most especially in an amount of at least 50 pph Binder P. Preferably, the Binder P comprises a P1 in an amount of at most 98, more preferably in an amount of at most 97, even more preferably in an amount of at most 95, most preferably of at most 93, especially in an amount of at most 92, more especially in an amount of at most 90, even more especially in an amount of at most 85, most especially in an amount of at most 80, for example in an amount of at most 75, for example in an amount of at most 70, for example in an amount of at most 65, for example in an amount of at most 60, for example in an amount of at most 55, for example in an amount of at most 50 pph Binder P.

The Binder P comprises a copolymerizing agent in an amount of at least 1 and at most 90 pph binder. Preferably, the Binder P comprises a copolymerizing agent in an amount of at least 2, more preferably in an amount of at least 3, even more preferably in an amount of at least 5, most preferably of at least 7, especially in an amount of at least 6, more especially in an amount of at least 8, even more especially in an amount of at least 9, most especially in an amount of at least 10, for example in an amount of at least 11, for example in an amount of at least 12, for example in an amount of at least 13, for example in an amount of at least 14, for example in an amount of at least 15, for example in an amount of at least 20, for example in an amount of at least 25, for example in an amount of at least 30, for example in an amount of at least 35, for example in an amount of at least 40, for example in an amount of at least 45, for example in an amount of at least 50 pph Binder P. Preferably, the Binder P comprises a copolymerizing agent in an amount of at most 85, more preferably in an amount of at most 80, even more preferably in an amount of at most 75, most preferably of at most 70, especially in an amount of at most 65, more especially in an amount of at most 60, even more especially in an amount of at most 55, most especially in an amount of at most 50, for example in an amount of at most 45, for example in an amount of at most 40, for example in an amount of at most 35, for example in an amount of at most 30, for example in an amount of at most 25, for example in an amount of at most 20, for example in an amount of at most 18, for example in an amount of at most 16, for example in an amount of at most 15, for example in an amount of at most 14, for example in an amount of at most 13, for example in an amount of at most 12 for example in an amount of at most 10, for example in an amount of at most 9, for example in an amount of at most 8, for example in an amount of at most 7 for example in an amount of at most 5 for example in an amount of at most 3, for example in an amount of at most 2 for example in an amount of at most 1 pph Binder P.

Preferably, the copolymerizing agent is selected from the group consisting of BHA compounds, EPX compounds and mixtures thereof; more preferably the copolymerizing agent is selected from the group consisting of BHA compounds and EPX compounds; even more preferably the copolymerizing agent is selected from the group consisting of BHA compounds or equally the copolymerizing agent is a BHA compound.

Preferably the BHA compound has at least 3 β-hydroxyalkylamide groups, even more preferably the BHA compound has at least 4 β-hydroxyalkylamide groups, most preferably the BHA compound has at least 2 and at most 4 β-hydroxyalkylamide groups, especially the BHA compound has at least 3 and at most 4 β-hydroxyalkylamide groups, more especially the BHA compound has 4 β-hydroxyalkylamide groups.

Some BHA compounds are disclosed in U.S. Pat. Nos. 4,727,111, 4,788,255, 4,076,917, EP 322834 and EP 473380.

Suitable examples of commercially available BHA compounds are for example N,N,N',N'-tetrakis-(2-hydroxyethyl)-adipamide (Primid® XL-552) and N,N,N',N'-tetrakis-(2-hydroxypropyl)-adipamide (Primid® QM 1260) available from EMS Chemie AG. Primid® XL-552 is an example of a BHA compound comprising 4β-hydroxyalkylamide groups.

If the copolymerizing agent is a BHA compound, then the Binder P comprises a BHA compound preferably in an amount of at least 1, more preferably in an amount of at least 2 pph Binder P. If the copolymerizing agent is a BHA compound, then the Binder P comprises a BHA compound preferably in an amount of at most 25, more preferably in an amount of at most 20, even more preferably in an amount of at most 15, most preferably in an amount of at most 13, especially in an amount of at most 10, more especially in an amount of at most 9, even more especially in an amount of at most 8, most especially in an amount of at most 7 pph Binder P.

If the copolymerizing agent is a BHA compound, then the Binder P comprises an Polymer P preferably in an amount of at least 75, more preferably in an amount of at least 80, even more preferably in an amount of at least 85, most preferably in an amount of at least 87, especially in an amount of at least 90, more especially in an amount of at least 91, even more especially in an amount of at least 92 most especially in an amount of at least 93 pph Binder P. If the copolymerizing agent is a BHA compound, then the Binder P comprises a Polymer P preferably in an amount of at most 99, more preferably in an amount of at most 98 pph Binder P.

Suitable examples of EPX compounds include bisphenol-A resins, bisphenol-F epoxy resins, glycidylesters, triglycidylisocyanurates and combinations thereof. It is preferred to use an EPX compound chosen from the group consisting of bisphenol-A resins, bisphenol-F epoxy resins, glycidylesters and combinations thereof. More preferably, the EPX compound is chosen from the group consisting of bisphenol-A resins, glycidylesters and combinations thereof. Suitable examples of commercially available bisphenol-A epoxy resins include Araldite® GT-7004 (Huntsman), Epikote® 1002 (Shell) and DER 662®, DER 663® and DER 664® (Dow). Suitable examples of commercially available glycidylesters include Araldite® PT910 and Araldite® PT912. Examples of triglycidylisocyanurates include TGIC (triglycidylisocyanurate), which is commercially available as Araldite® PT810. Preferably, the EPX compound is selected from the group consisting of bisphenol-A epoxy resins, triglycidylisocyanurates, and mixtures thereof; more preferably the EPX compound is selected from the group consisting of bisphenol-A epoxy resins, and triglycidylisocyanurates, even more preferably the EPX compound is a bisphenol-A epoxy resin.

The EPX compounds can vary considerably in molecular weight. This is most often expressed as the epoxy equivalent weight (EEW). The epoxy equivalent weight is the weight of an EPX compound containing exactly one mole of epoxy groups, expressed in g/mol. Preferably the EEW ranges from 100 to 1500, more preferably from 150 to 1200, even more preferably from 200 to 900 and most preferably from 400 to 850 g/mol.

If the copolymerizing agent is an EPX compound, then the Binder P comprises an EPX compound preferably in an amount of at least 2, more preferably in an amount of at least 3, even more preferably in an amount of at least 4, most preferably in an amount of at least 5, especially in an amount of at least 6, more especially in an amount of at least 7, even more especially in an amount of at least 8, most especially in an amount of at least 9, for example in an amount of at least 10, for example in an amount of at least 11, for example in an amount of at least 12, for example in an amount of at least 13, for example in an amount of at least 14 pph Binder P. If the copolymerizing agent is an EPX compound, then the Binder P comprises an EPX compound preferably in an amount of at most 70, more preferably in an amount of at most 65, even more preferably in an amount of at most 60, most preferably in an amount of at most 55, especially in an amount of at most 50, more especially in an amount of at most 45, most especially in an amount of at most 40, for example of at most 35, for example of at most 30, for example of at most 25, for example of at most 20 pph Binder P.

If the copolymerizing agent is an EPX compound, then the Binder P comprises an Polymer P preferably in an amount of at least 40, more preferably in an amount of at least 45, even more preferably in an amount of at least 50, most preferably in an amount of at least 55, especially in an amount of at least 60 pph Binder P. If the copolymerizing agent is an EPX compound, then the Binder P comprises a Polymer P preferably in an amount of at most 98, more preferably in an amount of at most 97, even more preferably in an amount of at most 96, most preferably in an amount of at most 95, especially in an amount of at most 94, more especially in an amount of at most 93, even more especially in an amount of at most 92, most especially in an amount of at most 91, for example in an amount of at most 90, for example in an amount of at most 89, for example in an amount of at most 88, for example in an amount of at most 87, for example in an amount of at most 86, for example in an amount of at most 80, for example in an amount of at most 75, for example in an amount of at most 70 pph Binder P.

If the copolymerizing agent is an EPX compound, preferably the HCPCC comprises a catalyst to promote the crosslinking reaction of the copolymerizing agent with the polymer P. Suitable catalysts include amine containing compounds, such as tertiary amines, phosphines, imidazoles, quaternary ammonium salts, phosphonium salts, metal salts. Specific samples of these catalysts are tetrabutylammonium and choline chloride. These catalysts may be used either alone or in combination.

Preferably the Binder P further comprises a copolymerizable polymer other than the Polymer P, able to react with the copolymerizing agent; said copolymerizable polymer is herein mentioned as copolymerizable polymer A. Obviously, in a HCPCC the copolymerizable agent is able to react with the Polymer P (e.g. the PolymerCS, the acid-functional Polymer P, the acid-functional PolymerCS, the acid-functional PolymerCS P) and the copolymerizable polymer A (and obviously the polymer B) since the HCPCC comprises the Binder P.

By the term 'polymer B' is meant for the purpose of this embodiment only, that said polymer B is a polymer which is not a Polymer (thus obviously also not a Polymer P).

Broadly in accordance with the invention, there is provided a heat-curable powder coating Composition comprising a Binder P in an amount of at least 10 and at most 100 pph Composition, and wherein the Binder P comprises:
   a) an acid-functional Polymer P in an amount of at least 10 and at most 99 pph Binder, and
   b) an acid-functional copolymerizable polymer A which is an acid-functional polyester B, in an amount of at least 10 and at most 99 pph, and
   c) a copolymerizable agent able to react with the acid-functional Polymer P and the acid-functional copolymerizable polymer A, in an amount of at least 1 and at most 90 pph Binder.

Broadly in accordance with the invention, there is provided a heat-curable powder coating Composition comprising a Binder P in an amount of at least 10 and at most 100 pph Composition, and wherein the Binder P comprises:
   a) an acid-functional Polymer P in an amount of at least 10 and at most 99 pph Binder, and
   b) an acid-functional copolymerizable polymer A which is an acid functional polyester B, in an amount of at least 10 and at most 99 pph, and c) a copolymerizable agent able to react with the acid-functional Polymer P and the acid-functional copolymerizable polymer A, in an amount of at least 1 and at most 90 pph Binder,
wherein
the acid-functional Polymer P is as Polymer P is disclosed in any one of paragraphs 1.133 to 1.136.

In case the HCPCC comprises a Binder P which comprises a copolymerizable agent, a Polymer P and a copolymerizable polymer A the copolymerizable agent is as disclosed in the entire of sub-section 3.1.

In case the HCPCC comprises a Binder P which comprises a copolymerizable agent, a Polymer P and a copolymerizable polymer A, then the total amount of the Polymer P and the copolymerizable polymer A in the Binder P is at least 10 and at most 99 pph Binder P. Preferably the total amount of the Polymer P and the copolymerizable polymer A in the Binder P is at least 15, more preferably at least 20, most preferably at least 30, especially at least 40, more especially at least 45, most especially at least 50 pph Binder P. Preferably the total amount of the Polymer P and the copolymerizable polymer A in the Binder P is at most 98, more preferably at most 97, most preferably at most 95, especially at most 90, more especially at most 85, most especially at most 80, for example at most 70, for example at most 60, for example at most 50 pph Binder P.

In case the HCPCC comprises a Binder P which comprises a copolymerizable agent, a Polymer P and a copolymerizable polymer A, then preferably the $$\text{Weight Ratio } R = \frac{\text{Weight of copolymerizable polymer } A}{\text{Weight of Polymer } P}$$

(said weight ratio R is herein abbreviated as 'WR'), is at least 0.01 and at most 99.

Preferably the WR is at least 0.1, more preferably at least 0.2, even more preferably at least 0.3, most preferably at least 0.4, especially at least 0.5, more especially at least 0.6, most especially at least 0.7, for example at least 0.75, for example at least 0.8. Preferably, the WR is at most 9, more preferably at most 8.5, even more preferably at most 8, most preferably at most 7.5, especially at most 7. Preferably the WR is at least 0.1 and at most 9, more preferably at least 0.2 and at most 8, even more preferably at least 0.3 and at most 7, most preferably at least 0.4 and at most 7, especially at least 0.5 and at most 7, more especially at least 0.6 and at most 7, most especially at least 0.7 and at most 7, for example at least 0.8 and at most 7, for example at least 1 and at most 7, for example at least 1.1 and at most 7, for example at least 1.5 and at most 7, for example at least 2 and at most 7, for example at least 2.5 and at most 7, for example at least 3 and at most 7, for example at least 3.2 and at most 7, for example at least 3.4 and at most 7. Preferably the WR is at least 2, preferably at least 2.5, more preferably at least 3.0, even more preferably at least 3.2, most preferably at least 3.4, and at most 10, more preferably at most 9.5, even more preferably at most 9, most preferably at most 8.5, especially at most 8, more especially at most 7.5, most especially at most 7.

Here it must be stressed a further very desired inventive use of the Polymer P and its heat-curable powder coating compositions. The heat-curable powder coating compositions according to the invention that comprise a Polymer P and a copolymerizable polymer A in a weight ratio R (WR) of at least 2, preferably at least 2.5, more preferably at least 3.0, even more preferably at least 3.2, most preferably at least 3.4, and at most 10, more preferably at most 9.5, even more preferably at most 9, most preferably at most 8.5, especially at most 8, more especially at most 7.5, most especially at most 7, have apart from the unique combination of the following three very desired properties:
i) excellent chemical resistance, and
ii) excellent reverse impact resistance, and
iii) good physical storage stability,
also very low gloss 60° (gloss 60°≤20), thus enhancing even further the matting effect for 1K powder coating compositions. Evidence for this is provided in the examples (see Table 1) where only the inventive examples having a WR of at least 2 and at most 10 (more specifically of at least 3 and at most 8) had very low gloss 60° in combination with just above mentioned properties i) to iii); none of the comparative polymers and their compositions was able to afford powder coatings of very low gloss 60° (whilst of course these comparatives also failed on—at least—chemical resistance and RIR). This further inventive use is particularly enhanced by a heat-curable powder coating composition comprising a binder in an amount of at least 1 and at most 100 pph composition, and wherein the binder comprises:
a) a Polymer in an amount of at least 10 and at most 99 pph binder, and
b) an acid-functional copolymerizable polymer A which is an acid functional polyester B, in an amount of at least 10 and at most 99 pph, and
c) a copolymerizable agent able to react with the polymer and the acid-functional copolymerizable polymer A, in an amount of at least 1 and at most 90 pph binder, preferably in an amount of at least 2 and at most 15, preferably the copolymerizable agent is a BHA compound, and wherein
the acid-functional polyester B is different from the polymer, and
the difference between the AV of the polymer and the AV of the copolymerizable polymer A (DeltaAV) each of the AV measured titrimetrically according to ISO 2114 is at least 30 preferably at least 75, more preferably at least 100 mg KOH/g, and wherein the AV of the copolymerizable polymer A is lower than the AV of the polymer, and wherein the Weight Ratio R (WR)

$$\text{Weight Ratio } R = \frac{\text{Weight of acid} - \text{functional copolymerizable polymer } A}{\text{Weight of polymer}}$$

is at least 1 and most 10, more preferably at least 2 and at most 9, even more preferably at least 3 and at most 8, most preferably at least 3.2 and at most 7, and wherein the acid-functional copolymerizable polymer A has an AV measured titrimetrically according to ISO 2114 of at least 15 and at most 40 mg KOH/g, and a $T_g$ measured via Differential Scanning Calorimetry as described in the description, of at least 40 and at most 80° C.

Preferably the copolymerizable polymer A is acid-functional (equally referred herein as an acid-functional copolymerizable polymer A) having an OHV lower than 14, preferably lower than 8 mg KOH/g, and an AV of at least 14 and at most 120, more preferably at least 15 and at most 100, even more preferably at least 16 and at most 70, most preferably at least 17 and at most 18, especially at least 19 and at most 50, more especially at least at least 20 and at most 40, even more especially at least 20 and at most 35, most especially at least 20 and at most 30, mg KOH/g. Preferably the acid-functional copolymerizable polyester A has a functionality of at least 2 and at most 6, more preferably of at least 2 and at most 5.5, most preferably at least 2 and at most 5, especially at least 2 and at most 4.5, more especially at least 2 and at most 4, most especially at least 2 and at most 3.5, for example at least 2 and at most 3.

In the context of the embodiment of sub-section 3.1, the Polymer B is a copolymerizable polymer A on its own accord (thus, copolymerizable Polymer B). Preferably the polymer B is acid-functional (acid-functional polymer B) having an OHV lower than 14, preferably lower than 8 mg KOH/g, and an AV of at least 14 and at most 100, more preferably at least 15 and at most 100, even more preferably at least 16 and at most 70, most preferably at least 17 and at most 60, especially at least 19 and at most 50, more especially at least at least 20 and at most 40, even more especially at least 20 and at most 35, most especially at least 20 and at most 30 mg KOH/g. Preferably the acid-functional polymer B has a functionality of at least 2 and at most 6, more preferably of at least 2 and at most 5.5, most preferably at least 2 and at most 5, especially at least 2 and at most 4.5, more especially at least 2 and at most 4, most especially at least 2 and at most 3.5, for example at least 2 and at most 3. As to the $T_g$ and $M_n$ of the acid-functional Polymer B, these are as disclosed in paragraph 3.1 for the copolymerizable polymer A. Preferably the acid-functional polymer B is an acid-functional polyester (acid-functional polyester B). Polyesters are well-known polymers in the art. Polyesters may be prepared according to conventional condensation polymerization procedures by esterification or transesterification, optionally in the presence of customary esterification catalysts for example dibutyltin oxide, butyl stanoic acid or tetrabutyl titanate. The preparation conditions and the —COOH/—OH ratio may be selected so as to obtain polyester that have an acid value and/or a hydroxyl value within a targeted range of values. The polyesters may be prepared in solution, in bulk that is without the use of a solvent. Preferably the polyesters are prepared in bulk without the use of a solvent. The condensation polymerization reaction may occur at a temperature of from 100 to 350° C., preferably 290° C. or less, more preferably from 150 to 270° C. Reaction times may range from 2 to 96 hours, preferably less than 72 hours, more preferably less than 60 hours. The condensation polymerization reaction is preferably carried out in a reaction vessel (the term reaction vessel is used in the entire application interchangeably with the term reactor). The condensation polymerization reaction is preferably carried out in a nitrogen atmosphere. Preferably the reaction is carried out under vacuum to remove water produced during the condensation polymerization reaction whilst vacuum is typically applied at the last stage of the synthesis of a polyester in order to achieve the desired specifications of the polyester. Once prepared and while still in the reactor at temperatures in the range of 130 to 240° C., the polyester is in a liquid state. The polyester solidifies as soon as it is brought to a temperature below its glass transition temperature for example when the polyester is discharged from a reactor onto a cooling belt which is kept at room temperature or lower temperatures or on a metal tray that may be at a room temperature or below. Typical temperatures of the cooling belt or tray are 15-25° C. A substantially dry polyester can be isolated in any known way including direct discharge from a reactor, from a temperature as high as for example 205° C. and as low as 140° C., any known way of spray drying, freeze drying, flashing or through devolatization after the condensation polymerization reaction or combinations thereof. A polyester may be obtained in two-steps comprising mixing and reacting the polyacid constituent with excess of the polyalcohol constituent to form a hydroxyl functional polyester (precursor of the end polyester) at the end of the first step; next, the hydroxyl functional polyester is reacted further with excess of carboxylic functional monomers to obtain the polyester B. Typically and depending on the reaction set up, one skilled in the art knows that an additional amount of alcohols e.g. diols, during the synthesis of a polyester such as a polyester B, may be necessary to compensate for alcohol losses that may take place during the synthesis of a polyester; one skilled in the art knows and can easily calculate said amount of alcohols e.g. diols, given the experimental set up, the composition of a polyester, said polyester's desired (targeted) AV and desired (targeted) OHV. If desired, additives such anti-oxidants, flow additives, tribo additives can be added to the polyester whilst the polyester is in the reaction vessel and prior the polyester is discharged as mentioned herein; this addition typically takes place at temperatures in the range of 170-195° C. or in the range of 160-210° C. If said additives are mixed within the polyester, a reasonable amount of time to ensure proper mixing of the additive into the polyester is carried out; for example the mixing can last from 15 to 60 min at temperatures in the range of 170-195° C.; subsequently, the polyester is ready for being discharged and collected.

Preferably the difference between the AV of the Polymer P and the AV of the copolymerizable polymer A (DeltaAV) is at least 30, more preferably at least 40, even more preferably at least 50, most preferably at least 60, especially at least 70, more especially at least 80, most especially at least 90, for example at least 100, for example at least 110, for example at least 120, for example at least 130, for example at least 140, for example at least 150, for example at least 160, for example at least 170, for example at least 175 mg KOH/g. Preferably the difference between the AV of the Polymer P and the AV of the copolymerizable polymer A (DeltaAV) is at most 175, more preferably at most 170, even more preferably at most 160, most preferably at most 150, especially at most 140, more especially at most 130, most especially at most 120, for example at most 110, for example at most 105 mg KOH/g. Preferably the difference between the AV of the Polymer P and the AV of the copolymerizable polymer A (DeltaAV) is at least 30 and at most 175, more preferably at least 50 and at most 175 mg KOH/g.

Preferably the difference between the AV of the acid-functional Polymer P and the AV of the acid-functional copolymerizable polymer A (DeltaAV) is at least 30, more preferably at least 40, even more preferably at least 50, most preferably at least 60, especially at least 70, more especially at least 80, most especially at least 90, for example at least 100, for example at least 110, for example at least 120, for example at least 130, for example at least 140, for example at least 150, for example at least 160, for example at least 170, for example at least 175 mg KOH/g. Preferably the difference between the AV of the acid-functional Polymer P and the AV of the acid-functional copolymerizable polymer A is at most 175, more preferably at most 170, even more preferably at most 160, most preferably at most 150, especially at most 140, more especially at most 130, most especially at most 120, for example at most 110, for example at most 105 mg KOH/g. Preferably the difference between the AV of the acid-functional Polymer P and the AV of the acid-functional copolymerizable polymer A (DeltaAV) is at least 30 and at most 175, more preferably at least 50 and at most 175 mg KOH/g.

Preferably the difference between the AV of the acid-functional Polymer P wherein the acid-functional Polymer P is an acid-functional polyester, and the AV of the acid-functional copolymerizable polyester A (DeltaAV) is at least 30, more preferably at least 40, even more preferably at least 50, most preferably at least 60, especially at least 70, more especially at least 80, most especially at least 90, for example at least 100, for example at least 110, for example at least 120, for example at least 130, for example at least 140, for example at least 150, for example at least 160, for example at least 170, for example at least 175 mg KOH/g. Preferably the difference between the AV of the acid-functional Polymer P wherein the acid-functional Polymer P is an acid-functional polyester, and the AV of the acid-functional copolymerizable polyester A (DeltaAV) is at most 175, more preferably at most 170, even more preferably at most 160, most preferably at most 150, especially at most 140, more especially at most 130, most especially at most 120, for example at most 110, for example at most 105 mg KOH/g. Preferably the difference between the AV of the acid-functional Polymer P wherein the acid-functional Polymer P is an acid-functional polyester, and the AV of the acid-functional copolymerizable polyester A (DeltaAV) is at least 30 and at most 175, more preferably at least 50 and at most 175 mg KOH/g.

Preferably the AV of the copolymerizable polymer A is lower than the AV of the Polymer P. Preferably the AV of the acid-functional copolymerizable polymer A is lower than the AV of the acid-functional Polymer P. Preferably the AV of the acid-functional copolymerizable polyester A is lower than the AV of the acid-functional Polymer P wherein the acid-functional Polymer P is an acid-functional polyester.

The disclosure of any and all fours paragraphs just above this paragraph concerning the DeltaAV between the Polymer P and the copolymerizable polymer A, applies analogously for the Polymer B.

As to the $T_g$ and $M_n$ of the acid-functional copolymerizable polyester A, these are as disclosed in paragraph 3.1.

The HCPCC may optionally comprise a constituent B as the latter is disclosed in the entire application.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in 3.1 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

3.1.1 Process for Making the HCPCC

The HCPCC of the invention may be prepared by mixing the separately weighed-out components in a premixer, heat the obtained premix, for example in a kneader, preferably in an extruder to obtain an extrudate, cool down the obtained extrudate until it solidifies and grind it into granules or flakes that are further ground to reduce the particle size followed by appropriate classification to obtain a powder coating composition of the right particle size.

Preferably, the HCPCC of the invention is prepared by a process comprising the steps of:
a. mixing the components of the HCPCC of the invention to obtain a premix;
b. heating the premix, preferably in an extruder, to obtain an extrudate;
c. cooling down the extrudate to obtain a solidified extrudate; and
d. grinding the solidified extrudate into smaller particles to obtain the HCPCC.

Preferably, the premix is heated to a temperature at least 5° C., more preferably at least 10° C. below the temperature at which it is intended to cure the powder coating composition. If the premix is heated in an extruder, it is preferred to use a temperature control in order to avoid too high temperatures that could lead to curing of the composition of the invention in the extruder.

Preferably, the HCPCC of the invention is prepared by a process comprising the steps of:
a. mixing the components of the Binder P to obtain a premix 1;
b. heating the premix 1, preferably in an extruder, to obtain an extrudate of the Binder P, namely extrudate 1;
c. cooling down the extrudate 1 to obtain a solidified extrudate 1; and
d. grinding the solidified extrudate 1 into smaller particles to obtain mixture 1; and
e. mixing the rest of the components of the HCPCC of the invention with the mixture 1, to obtain a premix 2;
f. heating the premix 2, preferably in an extruder, to obtain an extrudate 2;
g. cooling down the extrudate 2 to obtain a solidified extrudate 2; and
h. grinding the solidified extrudate 2 into smaller particles to obtain the HCPCC.

Preferably, the premix 1 and/or 2 is/are heated to a temperature at least 5, more preferably at least 10° C. below the temperature at which it is intended to cure the heat-curable powder coating composition. If the premix 1 and/or 2 is/are heated in an extruder, it is preferred to use a temperature control in order to avoid too high temperatures that could lead to curing of the heat-curable powder coating composition of the invention in the extruder.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in 3.1.1 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

3.1.2 Cured Heat-Curable Powder Coating Composition (Cured HCPCC) and Process for Curing the HCPCC and Object Obtainable by and/or Obtained by Said Process Broadly in accordance with the invention there is provided a cured heat-curable powder coating composition (cured HCPCC), as the HCPCC is disclosed herein. The cured HCPCC, is derived upon curing of the HCPCC, as the HCPCC is described herein. Preferably the cured HCPCC is a powder coating, said powder coating can be a primer, top coat or an intermediate coating.

Broadly in accordance with the invention there is provided a process for curing the HCPCC comprising the steps of:

i) providing the HCPCC; and ii) heating and optionally radiating the HCPCC to cure it.

Preferably step ii) above is carried out via heating.

Broadly in accordance with the invention there is provided a object obtainable and/or obtained by the aforementioned process for curing the HCPCC; said object is the cured HCPCC and said cured HCPCC is preferably a powder coating, said powder coating can be a primer, top coat or an intermediate coating.

In case of heating the HCPCC in order to cure it, the heating of the HCPCC can be carried out at a temperature and for a time suitable to cure the HCPCC.

Heating of the HCPCC may be done using conventional methods, such as with a convection oven and/or with an (N)IR lamp and/or infrared laser and/or microwave equipment may be used to heat the HCPCC.

The temperature, at which the HCPCC is cured, is preferably in the range of 140 to 225, more preferably from 145 to 200, even more preferably from 150 to 190, most preferably from 155 to 180, especially from 160 to 170, more especially at 160° C. Preferably the curing time of the HCPCC is at most 60, more preferably is at most 45, even more preferably is at most 30, most preferably is at most 20, especially is at most 15, more especially is at most 12, even more especially is at most 10, most especially is at most 5 minutes, for example at most 3 minutes. Preferably the HCPCC is cured at a temperature in the range of 140-160° C. for a time in the range of 3-30 minutes. Preferably the HCPCC is low baked cured.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in 3.1.2 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

3.1.3 Process for Coating an Article with the HCPCC and Process for Coating and Curing an Article Having the HCPCC Coated and Cured Thereon.

The HCPCC may be applied onto an article using the techniques known to the person skilled in the art, for example using electrostatic spray or electrostatic fluidized bed or flame spray.

The invention relates also to a process for making an article having coated thereon the HCPCC, comprising the step of applying the HCPCC to an article to obtain the article having coated thereon the HCPCC.

The invention further relates to a process for making an article having coated and cured thereon the HCPCC comprising the steps of:

a. applying the HCPCC to an article;

b. heating and optionally radiating the HCPCC for enough time (curing time) and at a suitable temperature (curing temperature) to cure the HCPCC to obtain the article having coated and cured thereon a HCPCC.

Preferably step b. above is carried out via heating.

Heating of the coated substrate may be done using conventional methods, such as with a convection oven and/or with an (N)IR lamp. Even microwave equipment may be used to heat the substrate.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in 3.1.3 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in 3.1 including any one and all of 3.1.1 to 3.1.3 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

4. Further Aspects of the Invention

The invention further relates to methods for coating articles having the Compositions coated thereon, to methods for coating articles having the coating Compositions coated thereon, methods for coating articles having the water-borne Compositions coated thereon, methods for coating articles having the solvent-borne coating Compositions coated thereon, methods for coating articles having the high-solids Compositions coated thereon, and to methods for coating articles having the powder coating Compositions coated thereon. Any one of the Compositions e.g. coating Compositions, mentioned in this paragraph may be applied to an article by any conventional and well-known paint (coating) application methods taking into account their perhaps different physical forms (liquid vs. powder); exemplary paint application methods include but are not limited to brushing, dipping, autodeposition, flow coating, spraying, deposition, electro-deposition, electrostatic spray, rolling, roll-to-roll, web-based coating, curtain coating, slot die coating. Wire-wound rod coating, screen printing, rotary screen coating, flexography, ink-jet printing, sputtering, embossing, in-mould finish, fluidized bed, electrostatic fluidized bed, flame spray. Some of these methods are particularly suited for certain types of coating Compositions mainly depending on the physical form said compositions are available. One skilled in the art knows well what paint application to use for a particular coating Composition. Details as to these methods are also available by A. A. Tracton in 'Coatings Technology Handbook' CRC Taylor & Francis Group, 2005, $3^{rd}$ edition, Ch. II, from 18-1 to 45-1 and also in Z. W. Wicks, Jr., F. N. Jones, S. P. Pappas, in 'Organic Coatings—Science & Technology', John Wiley & Sons, 1999, $2^{nd}$ edition, Ch.

22, pp. 417-432, as well as in the literature cited above and concerned the water-borne, solvent-borne and powder coatings.

Broadly in accordance with the invention there is provided a process for preparing an article having a Composition coated thereon, said process comprising the steps of:
i) providing a Composition and an article; and
ii) depositing the Composition onto the article via any one of the following ways: brushing, dipping, autodeposition, flow coating, spraying, vapour deposition, deposition, electro-deposition, electrostatic spray, rolling, roll-to-roll, web-based coating, curtain coating, slot die coating. Wire-wound rod coating, screen printing, rotary screen coating, flexography, ink-jet printing, sputtering, embossing, in-mould finish, fluidized bed, electrostatic fluidized bed, flame spray, to obtain the article having the Composition coated thereon.

The Compositions may be one or multiple of curable, heat-curable, radiation curable, heat/radiation in any combination. Preferably the Compositions are curable. Preferably the Compositions are heat-curable. Preferably the Compositions are radiation curable. Preferably the Compositions are heat/radiation curable. The coating Compositions may be one or multiple of curable, heat-curable, radiation curable, heat/radiation curable in any combination. Preferably the coating Compositions are curable. Preferably the coating Compositions are heat-curable. Preferably the coating Compositions are radiation curable. Preferably the Compositions are heat/radiation curable. The water-borne coating Compositions may be one or multiple of curable, heat-curable and radiation curable, in any combination. Preferably the water-borne coating Compositions are curable. Preferably the water-borne coating Compositions are heat-curable. Preferably the water-borne coating Compositions are radiation curable. Preferably the water-borne coating Compositions are heat/radiation curable. The solvent-borne coating Compositions may be one or multiple of curable, heat-curable and radiation curable, in any combination. Preferably the solvent-borne coating Compositions are curable. Preferably the solvent-borne coating Compositions are heat-curable. Preferably the solvent-borne coating Compositions are radiation curable. Preferably the solvent-borne coating Compositions are heat/radiation curable. The powder coating Compositions may be one or multiple of curable, heat-curable and radiation curable, in any combination. Preferably the powder coating Compositions are curable. Preferably the powder coating Compositions are heat-curable. Preferably the powder coating Compositions are radiation curable. Preferably the powder coating Compositions are heat/radiation curable.

Once the Compositions are cured they may form an object. The object is thus derived upon, and/or obtainable by and/or obtained by, and/or resulting from partial or full curing of a Composition; in other words a cured Composition is a cross-linked Composition; said curing may be effected with or without the use of one or both of heat and radiation, preferably the curing is effected via heat. The object may have any shape, size or form and said object may for example be a coating. Hence, the invention further relates to cured Compositions, cured coating Compositions, to cured water-borne coating Compositions, to cured solvent-borne coating Compositions, to cured high-solids coating Compositions, to cured powder coating Compositions and cured heat-curable powder coating Compositions.

The invention further relates to methods for coating articles having the Compositions coated and cured thereon, to methods for coating articles having the coating Compositions coated and cured thereon, methods for coating articles having the water-borne Compositions coated and cured thereon, methods for coating articles having the solvent-borne coating Compositions coated and cured thereon, methods for coating articles having the high-solids Compositions coated and cured thereon, and to methods for coating articles having the powder coating Compositions coated and cured thereon.

Broadly in accordance with the invention there is provided a process for preparing an having a Composition coated and cured thereon, said process comprising the steps of:
i) providing a Composition and an article; and
ii) depositing the Composition onto the article via any one of the following ways: brushing, dipping, autodeposition, flow coating, spraying, vapour deposition, deposition, electro-deposition, electrostatic spray, rolling, roll-to-roll, web-based coating, curtain coating, slot die coating. Wire-wound rod coating, screen printing, rotary screen coating, flexography, ink-jet printing, sputtering, embossing, in-mould finish, fluidized bed, electrostatic fluidized bed, flame spray, to obtain an article having the Composition coated thereon, and
iii) curing the Composition at a temperature and for time enough to crosslink the Composition.

Preferably, step iii) is carried out at any temperature ranging from room temperature up 240° C., and optionally radiating the Composition, and for a time ranging from a few seconds up to 48 hours, more preferably from 60 seconds up to 24 hours.

The invention further relates to a use of:
i) a polymer as described in the claims and as disclosed herein ('Polymer'), or
ii) a binder as described in the claims and as disclosed herein ('Binder'), or
iii) a composition as described in the claims and as disclosed herein ('Composition'), or
iv) a cured composition as described in the claims and as disclosed herein ('cured Composition'), or
v) an article having a composition as described in the claims and as disclosed herein coated thereon,
vi) an article having a composition as described in the claims and as disclosed herein, coated and cured thereon, in paints (waterborne paints, solventborne paints, powder paints, lacquers, varnishes), polishes, inks, adhesives, pastes, 3D-printing, automotive applications (car parts, agricultural machines, composite structures, ceramic structures, etc.), marine applications (ships, boats), aerospace applications (planes, helicopters, composite structures, ceramic structures, etc.), medical applications (artificial joints, meshes, woven or non-woven sheets, tapes, ribbons, bands, cables, tube-like products for e.g. ligament replacement, composite structures, ceramic structures, etc.), defense applications (ballistic protection, body armour, ballistic vests, ballistic helmets, ballistic vehicle protection, composite structures, ceramic structures, etc.), sports/recreational applications (fencing, skates, skateboarding, snowboarding, suspension lines on sport parachutes, paragliders, kites, kite lines for kite sports, climbing equipment, composite structures, ceramic structures, etc.), architectural applications (windows, doors, (pseudo-)walls, cables, etc.), bottling applications, household applications (household appliances, white goods, furniture, computer housings, etc.), machinery applications (can and bottle handling machine parts, moving parts on weaving machines, bearings, gears, composite structures, ceramic structures, computer housings, etc.), can applications, coil applications, energy applications for e.g. generators for wind, tide or solar energy, textile applications for e.g. fabrics, this can be very broad from impregnation technical textiles to for example complete composites both as coating and as a binder for composites, and electrical applications (cabinets for electrical wire or switch boards).

The powder Compositions as disclosed in anywhere in the entire application including their preferments, processes, their cured forms, etc, are particularly preferred for any and all the aspects of the invention shown in section 4 for as long as they are not associated with disclosures concerning liquid Compositions.

Thus, the invention further relates to a use of:
i) a polymer as described in the claims and as disclosed herein ('Polymer'), or
ii) a binder as described in the claims and as disclosed herein ('Binder'), or
iii) a powder composition as described in the claims and as disclosed herein (powder Composition), or
iv) a cured powder composition as described in the claims and as disclosed herein ('cured powder Composition'), or
v) an article having a powder composition as described in the claims and as disclosed herein coated thereon,
vi) an article having a powder composition as described in the claims and as disclosed herein, coated and cured thereon,
in paints, polishes, inks, adhesives, pastes, 3D-printing, automotive applications, marine applications, aerospace applications, medical applications, defense applications, sports/recreational applications, architectural applications, bottling applications, household applications, machinery applications, can applications, coil applications, energy applications, textile applications and electrical applications.

There is an increasing demand to use raw materials e.g. monomers for polymerization, additives, etc., derived from biorenewable resources (biomass) (referred herein as biorenewable monomers) in order to improve the sustainability of the polymers. In view of concerns about depletion of fossil fuel resources or an increase in carbon dioxide in the atmosphere that poses a global-scale environmental problem in recent years, methods for producing raw materials (e.g. monomers for polymers) from biomass have attracted a lot of attention. Since biomass is renewable and therefore has a carbon-neutral foot-print, such methods are expected to gain in particular importance in future. It is therefore a preferred feature of the present invention and the aspects described herein that where possible the components used herein for preparing the Polymer, the Binder, the Composition, are as far as possible biorenewable.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in 4 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

Yet, another aspect of the invention is a polymer according to the invention as shown in the Examples.

Yet, another aspect of the invention is a composition according to the invention as shown in the Examples.

Yet, another aspect of the invention is a cured composition e.g. a coating according to the invention as shown in the Examples.

Many other variations, preferments and embodiments of the invention will be apparent to those skilled in the art and such variations preferments and embodiments are contemplated within the scope of the claims. All embodiments disclosed and preferments disclosed herein may be combined with each other and/or with preferments of the invention as disclosed herein.

Further aspects of the invention and preferred features thereof are given in the claims herein.

Any and all citations to scientific or patent literature e.g. scientific papers, patents or patent applications mentioned in the description or in the examples, are incorporated herein by reference.

The invention will now be described in detail with reference to the following non limiting examples which are by way of illustration only.

EXAMPLES

The invention is explained in more detail with reference to the following non-limiting examples.

1 Chemicals, Raw Materials; Analytical Methods and Techniques 1.1 Chemicals & Raw Materials Cardura™ E10P (supplied by HEXION; glycidyl ester of Versatic™ Acid 10, is a synthetic saturated monocarboxylic acid of highly branched $C_{10}$ isomers of the following formula:

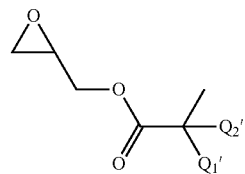

wherein each of Q1' and Q2' is a short chain alkyl group and wherein the total number of carbon atoms of both of these alkyl groups is 7. Primid® XL-552 ($T_m$=120-124° C., OHV=620-700 mg KOH/g) is a BHA-compound supplied from EMS Chemie and it was used as a crosslinker. Kronos® 2360 is titanium dioxide (white pigment) supplied from Kronos Titan GmbH. Resiflow® PV 5 is a flow control agent from Worlée-Chemie GmbH. Benzoin was used as degassing agent. Any other chemicals mentioned in the Examples and not explicitly mentioned in this paragraph, were supplied by Aldrich and they were used as supplied.

1.2 Analytical Methods and Techniques

The acid value (AV) was measured titrimetrically according to ISO 2114. The AV is given as the mass of potassium hydroxide (KOH) in milligrams that is required to neutralize one gram of the tested substance and is used as a measure of the concentration of carboxylic acid groups present.

The hydroxyl value (OHV) was measured titrimetrically according to ISO 4629. The OHV is given as the mass of potassium hydroxide (KOH) in milligrams that is required to neutralize one gram of the tested substance and is used as a measure of the concentration of hydroxyl groups present.

The glass transition temperature ($T_g$) of the Polymer was measured by Differential Scanning Calorimetry (DSC) at a heating rate of 5° C./min in $N_2$ atmosphere at a flow rate of 50 mL/minute, on a TA instruments DSC Q2000 apparatus according to the following method: a sample of 10±0.5 mg was weight and placed in the DSC cell at a temperature between 20 and 25° C. The sample was cooled down to −50° C. and the temperature was kept at −50° C. for time enough for the sample to reach equilibrium; upon equilibration the sample was heated up from −50° C. up to 160° C. at a heating rate of 5° C./minute; the sample was kept at that temperature for 2 minutes and it was subsequently cooled down to −50° C. at a cooling rate of 20° C./min; once the sample reached −50° C. the temperature was maintained for 5 minutes; subsequently, the sample was heated up from −50° C. up to 220° C. at a heating rate of 5° C./minute (thermograph A). The $T_g$ was measured from this last thermograph (thermograph A) as the inflection point of the DSC signal (DSC thermograph, Heat Flow vs. Temperature) The processing of the DSC signal and the determination of the $T_g$ was carried out using Universal Analysis 2000 software version 4.5a provided by TA instruments.

The glass transition temperature ($T_g$) of the Binder is measured by Differential Scanning Calorimetry (DSC) at a heating rate of 5° C./min in $N_2$ atmosphere at a flow rate of 50 mL/minute, on a TA instruments DSC Q2000 apparatus according to the following method: a sample of 10±0.5 mg is weight and placed in the DSC cell at a temperature between 20 and 25° C. The sample is cooled down to −50° C. and the temperature is kept at −50° C. for time enough for the sample to reach equilibrium; upon equilibration the sample is heated up from −50° C. up to 220° C. at a heating rate of 5° C./minute (thermograph A). The $T_g$ was measured from this last thermograph (thermograph A) as the inflection point of the DSC signal (DSC thermograph, Heat Flow vs. Temperature) The processing of the DSC signal and the determination of the $T_g$ was carried out using Universal Analysis 2000 software version 4.5a provided by TA instruments.

The number average molecular weight ($M_n$) and the weight average molecular weight ($M_w$) were measured via gel permeation chromatography (GPC) calibrated with a set of polystyrene standards with a molecular weight range of from 500 up to $7 \times 10^6$ g/mol and using as eluent stabilized tetrahydrofuran (THF) modified with 0.8% acetic acid at a flow rate of 1 mL/min at 40° C. The GPC measurements were carried out on a Waters Alliance system equipped with: i) an Waters Alliance 2414 refractive index detector at 40° C., and ii) a Waters Alliance 2695 separation module equipped with two consecutive PL-gel columns of Mixed-C type with l/d=300/7.5 mm and filled with particles having a particle size of 10 μm (supplied by the Polymer Laboratories).

The polydispersity (D) was calculated according to the following equation: $D=M_w/M_n$.

$^1$H-NMR or $^{13}$C-NMR or $^{31}$P-NMR spectroscopy or combinations thereof were used to characterize chemical entities shown herein. $^1$H-NMR spectra were recorded on a Varian Mercury Vx (400 MHz) spectrometer or on a Bruker Advance (400 MHz) spectrometer at 25° C. in chloroform-d1 unless stated otherwise and referenced versus residual solvent shifts. $^{13}$C-NMR spectra were recorded on a Varian Mercury Vx (100 MHz) spectrometer or on a Bruker Advance (100 MHz) spectrometer at 25° C. in chloroform-d1 unless stated otherwise and referenced versus residual solvent shifts. $^{31}$P-NMR spectra were recorded on a Varian Mercury Vx (162 MHz) spectrometer or on a Bruker Advance (162 MHz) spectrometer at 25° C. in chloroform-d1: pyridine (70:30 v/v) and referenced versus residual solvent shifts (the $^{31}$P-NMR method according to P. Dais and A. Spyros described in Magnetic Resonance in Chemistry 2007; 45:367, may be used).

The coating (film) thickness of the cured coatings, was measured with a PosiTector 6000 coating thickness gauge from DeFelsko Corporation according to EN ISO 2808: 2007.

Gloss 60° of the powder coatings derived upon curing of the corresponding heat-curable powder coating compositions on ALQ-46 panels were measured according to ASTM D523 with a BYK-Gardner GmbH Haze-Gloss meter. The gloss was measured at a film thickness of 50±5 μm on ALQ-46 panels, recorded at an angle of 60°, and it was reported in gloss units.

The physical storage stability (PSS) is tested at 23° C. for 3 weeks. Prior to assessing the PSS the heat-curable powder coating composition is left to cool down to room temperature for about 3 hours. The greater the extend of agglomeration or sintering the poorer the PSS, thus the lower its ranking according to the following scale. The extent of agglomeration is visually assessed and ranked according to the following rating on a 1-10 scale (1 representing the worst PSS and 10 the best PSS):

10: No change.
9: No agglomeration, very good fluidity.
8: No agglomeration, good fluidity.
7: Very low agglomeration; agglomeration can be dispersed by one light tap into a fine powder.
6: Very low agglomeration; agglomeration can be dispersed by several taps into a fine powder.
5: Low agglomeration; agglomeration can be dispersed by hand pressure into a fine powder.
4: Low agglomeration; agglomeration cannot be dispersed by hand pressure in a fine powder.
3: Severe agglomeration into several large lumps, material is pourable.
2: Severe agglomeration into several large lumps, material is not pourable.
1: product sintered to one lump, volume reduced.

The reverse impact resistance (RIR) (inch/lbs, 1 inch/lbs=0.055997 m/kg) was tested according to ASTM D 2794, with a ⅝" ball at 60 inch/lbs and at a film thickness of 50±5 μm on ALQ-46 panels, one day after the coating was applied, cured at 200° C. for 15 minutes and subsequently cooled at room temperature. If the coating withstood the impact of 60 inch/lbs, then this result was reported as a 'pass'; if the coating did not withstand the impact of 60 inch/lbs then this result was recorded as 'fail'.

The chemical resistance (CR) of the coatings was assessed via acetone double rubs (ADR). With one acetone double rub (ADR) is meant one continuous back and forward movement, in a cycle time of about one second, over the surface of a coating having a thickness of 50±5 microns using a cotton cloth drenched in acetone, which cotton cloth covers a hammer head having a weight of about 980 grams and a contact surface area with the coating of about 2 cm$^2$. Every 10 rubs the cloth was drenched in acetone. The measurement was carried out at room temperature, and it was performed on coatings that were left at room temperature for 168 hours before been tested, and within 2 h from the lapse of the time period of 168 hours; the measurement was continued either until the coating was removed and the number of ADR at which the coating was removed was reported, or until 500 ADR were reached. For example, a result reported as 200 ADR indicates that there was no coating left after 200 ADR.

By the term 'Molar Ratio Q' (abbreviated as MRQ and referring to a polymer comprising units selected from the group consisting of S1, S2, S3, S4, and combinations thereof, as each of S1, S2, S3 and S4 is disclosed herein) is meant herein:

$$MRQ = \frac{S_{total}}{S_{specific}} = \frac{S_{specific} + S_{rest}}{S_{specific}},$$

wherein
$S_{total} = S_{specific} + S_{rest}$, and
$S_{specific} =$ (total moles S1)+(total moles S2)+(total moles S3)+ (total moles S4), and
$S_{rest} =$ the total moles of all the units of a polymer wherein said units are not any one of S1, S2, S3, S4.
The MRQ is by definition equal to or higher than 1.
The MRQ can be determined by a combination of well-known analytical techniques and a methodology such as those described just below.

At first, one may determine the composition of the polymer via high resolution NMR spectroscopy e.g. $^1$H-NMR (≥400 MHz), $^{13}$C-NMR (≥100 MHz), $^{31}$P-NMR (≥162 MHz) [after phosphorylation reaction of the hydroxyl and carboxylic acid groups with 2-chloro-4,4,5,5-tetramethyldioxaphospholane (1) and the related derivative product (II); see method as reported by P. Dais and A. Spyros in Magnetic Resonance in Chemistry 2007, 45:367], or combinations thereof may be used; this is to say that the kind of constitutional units that make up the polymer e.g. monomer residues, or groups of atoms that form distinct residues, and their corresponding amounts are determined. Various well-known 2D NMR techniques such as COSY (homonuclear correlation spectroscopy), HSQC (heteronuclear single-quantum correlation spectroscopy) and HMBC (heteronuclear multiple-bond correlation spectroscopy) may be applied.

Subsequently, and having determined the polymer composition as described above, one may determine:
  i) the total mol of ester groups ( . . . —O—C(=O)— . . . ) originating from the units S1, S2, S3, S4, and
  ii) the total mol of any other repeating unit from sequences of monomer residues or group of atoms that form distinct residues, wherein each of said units is different than those of S1, S2, S3, S4.
The determination of i) can be carried out by $^{13}$C-NMR spectroscopy assisted by the co-employment of $^1$H-NMR and $^{31}$P-NMR spectroscopies, focusing on:
  ia) all the carbon atoms present in respectively S1, S2, S3 and S4 (excluding the carbon atoms belonging to X, Y, Z and T) and;
  ib) the first carbon atom of X, Y, Z and T that is directly connected to the ester group of S1, S2, S3, S4, respectively.
If a carbon atom is a tertiary carbon atom, then only $^{13}$C-NMR; if a carbon atom is primary or secondary $^1$H-NMR may be also applied and assist the analysis from the $^{13}$C-NMR spectroscopy. Typically, $^{31}$P-NMR is used to determine the type of present carboxylic acid and hydroxyl groups present in these units. Various well-known 2D (see above) and/or 3D NMR techniques (e.g. experiments consisting of '2D experiments after another', the triple resonance experiments, etc.) may be used alone or in combination. Upon the completion of this part of the analysis, one is able to determine the total mol of S1, S2, S3 and S4 units, and thus the $S_{specific}$.

The determination of ii) can be carried out by $^{13}$C-NMR spectroscopy assisted by the co-employment of 1H-NMR and $^{31}$P-NMR spectroscopies, focusing on the carbon atoms present in the sequences of monomer residues or group of atoms that that form distinct residues, and especially to the carbon atoms which are immediately next to the bonds connecting the various units together.

If a carbon atom is a tertiary carbon atom, then only $^{13}$C-NMR; if a carbon atom is primary or secondary $^1$H-NMR may be also applied and assist the analysis from the $^{13}$C-NMR spectroscopy. Typically, $^{31}$P-NMR is used to determine the type of present carboxylic acid and hydroxyl groups present in these units. Various well-known 2D (see above) and/or 3D NMR techniques (e.g. experiments consisting of '2D experiments after another', the triple resonance experiments, etc.) may be used alone or in combination. Upon the completion of this part of the analysis, one is able to determine the total mol of any unit other than S1, S2, S3 and S4 units, and thus the $S_{rest}$.

Subsequently, given the values for the $S_{specific}$ and $S_{rest}$, one is able to calculate the MRQ by factoring in the equation concerning the MRQ (see above in this paragraph) the values for the $S_{specific}$ and $S_{rest}$.

2 Example of a Polymer According to the Invention and Example of a Process (According the Invention) for Making Said Polymer 2.1 Example 1: Preparation of a Polymer According to § 1.1 Consisting of One S1 Unit, Wherein X is L30

(PEX1)

Cardura™ E10P (228.33 g 1.00 mol) and trimellitic anhydride (192.13 g, 1.00 mol) were charged and mixed into a reactor vessel under a nitrogen flow to form a mixture. The mixture was subsequently polymerized at a temperature ranging from 130 to 150° C. for 2.5 hours. The progress of the polymerization reaction was being tracked via measurements of the acid and hydroxyl values. Once an acid value of 147 mg KOH/g was reached, the obtained polymer was discharged from the reaction vessel and collected. The polymer (an acid-functional PolymerCS P) was characterized as follows: solid, MRQ=1, $T_g$=48° C., $M_n$=2189 Da, D=5.3, AV=147 mg KOH/g, OHV=6 mg KOH/g; $^{31}$P-NMR (δ, ppm, 162 MHz; chloroform-d1:pyridine=: 70:30 v/v): 135.5-136.0 (br, m; three groups of resonances, one of them is attributed to the carboxylic acid group of the S1 unit).

3. Examples of Comparative Polymers 3.1 Example 2: Preparation of a Comparative Polymer Comprising One S1, One S2, One S3 and One S4 Unit, Wherein X is L30

(CPEX1)

Cardura™ E10P (490 g, 2.15 mol) and citric acid (192 g, 1.00 mol) as reagent A were charged and mixed into a reactor vessel under a nitrogen flow to form a mixture. The mixture was subsequently polymerized at a temperature of 120° C. for 3 hours. Subsequently, after cooling the reaction mixture to 80° C., isophorone diisocyanate (78 g, 0.35 mol) was added thereto and reacted for 6 hours at 80° C. Furthermore, trimellitic anhydride (115 g, 0.60 mol) as reagent A was added and reacted for 1 hour at 180° C. The progress of the polymerization reaction was being tracked via measurements of the acid and hydroxyl values. Once an acid value of 65 mg KOH/g was reached, the obtained polymer was discharged from the reaction vessel and collected. The polymer was characterized as follows: solid, MRQ=1.8, $T_g$=19.6° C., $M_n$=1536 Da, D=2.2, AV=65 mg KOH/g, OHV=113 mg KOH/g).

This example represented an effort to reproduce the example 8 of U.S. Pat. No. 7,838,076 B2 (=example 8 of EP 1788049 A1). Although the same monomers and amounts were used and the same process was applied, it was not possible to fully reproduce the polymer of example 8 of U.S. Pat. No. 7,838,076 B2 as far as its properties AV and OHV were concerned (the AV and OHV reported by the U.S. Pat. No. 7,838,076 B2 (=EP 1788049 A1) for the polymer of example 8 were 80 and 67 mg KOH/g, respectively.

3.2 Example 3: Preparation of a Comparative Polymer Comprising One S1 Unit, Wherein X is L13

(CPEX2)

Trimellitic anhydride (192.13 g, 1.00 mol) was charged and mixed into a reactor vessel with xylene (290 g) under a nitrogen flow to form a mixture. Cyclohexene oxide (98.14 g, 1.00 mol) was added dropwise to the reactor. The mixture was subsequently polymerized at a temperature ranging from 130 to 150° C. for 5 hours. The progress of the polymerization reaction was being tracked via measurements of the acid and hydroxyl values. Once an acid value of 280 mg KOH/g was reached, the solvent was removed by applying vacuum and the obtained polymer was discharged from the reaction vessel and collected. The polymer, after drying, was characterized as follows: solid, MRQ=1, $T_g$=80° C., AV=280 mg KOH/g, OHV=0.5 mg KOH/g).

4. Example of a Copolymerizable Polymer A

4.1 Example 4: Preparation of an Acid-Functional Polyester (POL1)

The polyester resins POL1 was prepared via a two phase (or two step) polycondensation reaction. At the end of the first step a hydroxyl functional polyester (mentioned herein as precursor) was obtained; next the hydroxyl functional polyester was reacted further with excess of carboxylic acid functional monomers to obtain the carboxylic acid functional polyester POL1. More particularly: A reactor vessel fitted with a thermometer, a stirrer and a distillation device for the removal of water formed during the synthesis, was filled with butyl stannoic acid (0.25 g) (catalyst), neopentyl glycol (432.4 g, 4.15 mol). The vessel was heated up to 150° C. until the mixture was molten. Then terephthalic acid (501.6 g, 3.02 mol) and isophthalic acid (122.4 g, 0.74 mol) were added and under a nitrogen flow the temperature was gradually increased to 260° C. while distilling off the reaction water, until the reaction mixture was clear and the acid value of the precursor of the polyester was between 5 and 15 mg KOH/g; that marked the completion of the first step. For the second step the reaction mixture was cooled to 200° C. and subsequently the adipic acid (40.9 g, 0.28 mol) and isophthalic acid (50.3 g, 0.30 mol) were added. The temperature was raised to 250° C. while distilling off water; subsequently vacuum was applied until the polyester reached the desired acid value range (25 mg KOH/g). Subsequently, the vacuum was stopped and the polyester was cooled down to 195° C. (marking the end of the second step), prior being discharged onto an aluminum foil that was kept at room temperature. The polyester (acid-functional one) was characterized as follows: $T_g$=60° C., AV=25 mg KOH/g, OHV=4 mg KOH/g, $M_n$=3901 Da, D=2.7).

5. Preparation of Heat-Curable Powder Coating Compositions According to the Invention (Inventive) and Coatings Thereof PEX1 (which was prepared according to the process of the invention) was used to prepare:

i) four (individual) 1K white heat-curable inventive powder coating compositions namely PCCA1, PCCA2, PCC3, and PCCA4 (see Table 1), and ii) white inventive powder coatings PCA1, PCA2, PCA3 and PCA4 derived upon heat curing of the PCCA1. PCCA2, PCCA3 and PCCA4, respectively.

The composition of each of the 1K white heat-curable inventive powder coating compositions PCCA1, PCCA2, PCCA3 and PCCA4 is shown in Table 1.

6. Preparation of Heat-Curable Comparative Powder Coating Compositions not According to the Invention (Comparative) and Coatings Thereof CPEX1 and CPEX2 were each used to prepare:
i) two (individual) 1K white heat-curable comparative powder coating compositions namely PCCC1 and PCCC2 (see Table 1), and
ii) white comparative powder coatings PCC1 and PCC2 derived upon heat curing of the PCCC1 and PCCC2, respectively.

The composition of each of the 1K white heat-curable comparative powder coating compositions PCCC1 and PCCC2 is shown in Table 1.

Each one of the comparative and inventive 1K white heat-curable powder coating compositions was prepared by mixing its components in a blender and subsequently extruding the obtained mixture in a PRISM TSE16 PC twin screw at 125° C. in which the screw speed was adapted to have a high torque (>80%) to ensure good mixing. The extrudate was allowed to cool at room temperature and it was then chopped into chips. The chips were milled in a Retsch ZM100 with a 0.5 mm ring sieve at 18.000 rpm and then sieved. The sieve fraction with particle size below 90 µm was collected, to afford each of the comparative and inventive powder coating compositions. Subsequently, each of the comparative and inventive powder coating compositions was individually and separately electrostatically sprayed (corona, 60 kV) onto 0.8 mm thick chromate aluminium Q-panels (type: ALQ-46) to a coating thickness of 50±5 µm and cured at 200° C. for 15 minutes in an air-circulation oven (Heraeus Instruments UT6120) at atmospheric pressure to afford the white comparative and inventive powder coatings.

The object of the invention was to provide for powder coatings that have all of the following very desired properties:
i) excellent chemical resistance, and
ii) excellent reverse impact resistance, and
iii) low gloss 60° (matt finish), and
iv) (their corresponding 1K powder coating compositions have) good physical storage stability.

By the term 'matt finish' or 'matt powder coatings' or 'low gloss powder coatings' is meant herein a white powder coating having a thickness of 50±5 µm that is obtained upon low bake curing of a white heat-curable powder coating composition, said white powder coating having a gloss 60°—as gloss 60° is defined and measured herein—of at most 50, preferably at most 48, more preferably at most 46, most preferably at most 45, especially at most 43, more especially at most 41, even more especially at most 40, most especially at most 38, for example at most 37, for example at most 36, for example at most 35, for example at most 33, for example at most 32, for example at most 30, for example at most 28, for example at most 26, for example at most 25, for example at most 24, for example at most 22, for example at most 20, for example at most 18, for example at most 16, for example at most 15, for example at most 12, for example at most 10, for example at most 8, for example at most 6.

By the term 'very low gloss powder coatings' is meant herein a white powder coating having a thickness of 50±5 µm that is obtained upon low bake curing of a white heat-curable powder coating composition, said white powder coating having a gloss 60°—as gloss 60° is defined and measured herein—of at most 20.

By the term 'excellent physical storage stability' (or equally 'excellent storage stability') (when referring to powder coating compositions) is meant herein that a white heat-curable powder coating composition has a physical storage stability (PSS) of at least 9, on a scale from 1 (very poor storage stability) up to 10 (excellent storage stability), as the PSS is defined and measured herein.

By the term 'good physical storage stability' (or equally 'good storage stability') (when referring to powder coating compositions) is meant herein that a white heat-curable powder coating composition has a physical storage stability (PSS) of at least 7 and at most 8, on a scale from 1 (very poor storage stability) up to 10 (excellent storage stability), as the PSS is defined and measured herein.

By the term 'poor physical storage stability' (or equally 'poor storage stability') (when referring to powder coating compositions) is meant herein that a white heat-curable powder coating composition has a physical storage stability (PSS) of at most 6, on a scale from 1 (very poor storage stability) up to 10 (excellent storage stability), as the PSS is defined and measured herein.

By the term 'good reverse impact resistance' (RIR) (or equally 'without compromising the reverse impact resistance') is meant herein that a white heat-curable powder coating composition scored a 'pass' on the relevant test for measuring the reverse impact resistance as this is defined and measured herein.

By the term 'poor reverse impact resistance' (RIR) (or equally 'compromising the reverse impact resistance') is meant herein that a white heat-curable powder coating composition scored a 'fail' on the relevant test for measuring the reverse impact resistance as this is defined and measured herein.

By the term 'excellent chemical resistance' is meant herein a white powder coating having a thickness of 50±5 µm that is obtained upon low bake curing of a white heat-curable powder coating composition, said white powder coating has a chemical resistance of at least 160 ADR, as the chemical resistance is defined and measured herein.

By the term 'good chemical resistance' is meant herein a white powder coating having a thickness of 50±5 µm that is obtained upon low bake curing of a white heat-curable powder coating composition, said white powder coating has a chemical resistance of at least 141 and at most 159 ADR, as the chemical resistance is defined and measured herein.

By the term 'mediocre chemical resistance' is meant herein a white powder coating having a thickness of 50±5 µm that is obtained upon low bake curing of a white heat-curable powder coating composition, said white powder coating has a chemical resistance of at least 100 and at most 140 ADR, as the chemical resistance is defined and measured herein.

By the term 'poor chemical resistance' is meant herein a white powder coating having a thickness of 50±5 µm that is obtained upon low bake curing of a white heat-curable powder coating composition, said white powder coating has a chemical resistance of at most 100 ADR, as the chemical resistance is defined and measured herein.

It was surprisingly found (see Table 1) that only the polymers of the invention (and the compositions of the invention) were able to afford powder coatings that had a unique combination of four very desired properties, such as:
 i) excellent chemical resistance, and
 ii) excellent reverse impact resistance, and
 iii) low gloss 60° (matt coatings), and
 iv) good physical storage stability.

Each of the comparative polymers and their compositions failed to afford powder coatings that combined all of the four above-mentioned properties. The reason being the CPEX1 had an AV (65 mg KOH/g) and a $T_g$ (19.6° C.) outside of the claimed range, whilst the CPEX2 had an AV (280 mg KOH/g) outside of the claimed range.

Therefore, only the inventive polymers (and their powder compositions) offered a surprising solution to the problem of improving on the reverse impact resistance (RIR) and the chemical resistance of low gloss (matt) powder coatings by maintaining at the same time a good physical storage stability of their corresponding powder coating compositions.

TABLE 1

|  | Comparative | | Inventive | | | |
| --- | --- | --- | --- | --- | --- | --- |
|  | PCCC1 | PCCC2 | PCCA1 | PCCA2 | PCCA3 | PCCA4 |
| Composition of the powder coating composition | | | | | | |
| PEX1 (g) (Polymer P) |  |  | 61 | 123 | 48 | 36 |
| CPEX1 (g) (polymer not accordng to the invention) | 68 |  |  |  |  |  |
| CPEX2 (g) (polymer not accordng to the invention) |  | 53 |  |  |  |  |
| POL1 (copolymerizable polymer A) | 216 | 216 | 217 | 145 | 230 | 245 |
| PRIMID ® XL-552 (g) | 16 | 31 | 22 | 32 | 22 | 19 |
| Kronos ® 2360 | 150 | 150 | 150 | 150 | 150 | 150 |

TABLE 1-continued

| | | | | | | |
|---|---|---|---|---|---|---|
| Restflow ® PV5 (g) | 4.5 | 4.5 | 4.5 | 4.5 | 4.5 | 4.5 |
| Benzoin | 1.5 | 1.5 | 1.5 | 1.5 | 1.5 | 1.5 |
| Property of the powder coating composition | | | | | | |
| Physical storage stability (PSS) | 5 | 9 | 7 | 7 | 7 | 7 |
| Property of the coating | PCC1 | PCC2 | PCA1 | PCA2 | PCA3 | PCA4 |
| Gloss60° | 28 | 5 | 4 | 39 | 6 | 12 |
| Reverse impact resistance | Fail | Pass | Pass | Pass | Pass | Pass |
| Chemical resistance (ADR) | 140 | 80 | 200 | 180 | 220 | 300 |

(Note: numbers or words describing achieved properties in Table 1 in plain and italics represent properties that are below the desired performance level)

The invention claimed is:

1. A heat-curable powder coating composition comprising a binder in an amount of at least 1 and at most 100 pph of the composition, wherein the binder comprises:
   a) at least 10 and at most 99 pph of the binder of a polymer having:
      (a1) an acid value (AV) measured titrimetrically according to ISO 2114 of at least 105 and at most 180 mg KOH/g,
      (a2) a glass transition temperature ($T_g$) measured via Differential Scanning Calorimetry, of at least 30 and at most 140° C., and
      (a3) a number average molecular weight ($M_n$) measured via Gel Permeation Chromatography (GPC) of at least $2.1 \times 10^3$ Da, and wherein
      the polymer comprises one or more units selected from the group consisting of S1, S2, and combinations thereof, wherein each of S1 and S2 is represented by the following corresponding formula:

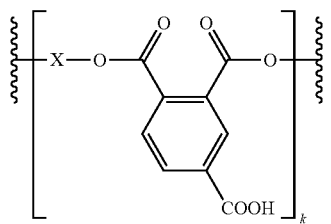

S1

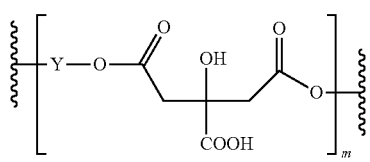

S2 wherein
   (i) k is an integer equal to or higher than 0, and
   (ii) m is an integer equal to or higher than 0, and
   (iii) the sum of k and m is equal to or higher than 1, and
   (iv) X is selected from the group consisting of L4, L6, L7, L8, L9, L10, L11, L12, L13, L18, L19, L20, L23, L24, L25, L26, L27, L28, L29, L30, and L31 as each of L4 to L31 is defined below, and wherein the black bold dots shown in the formulae of any one of L4 to L31 represent the attachment points of each of L4 to L31 to the S1, and wherein the attachment points are carbon atoms,
   (v) Y is selected from the group consisting of L4, L6, L7, L8, L9, L10, L11, L12, L13, L18, L19, L20, L23, L24, L25, L26, L27, L28, L29, L30, and L31 as each of L4 to L31 is defined below, and wherein the black bold dots shown in the formulae of any one of L4 to L31 represent the attachment points of each of L4 to L31 to the S2, and wherein the attachment points are carbon atoms,

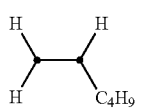

L4

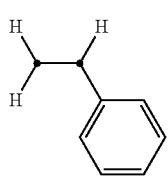

L6

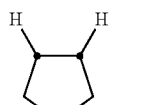

L7

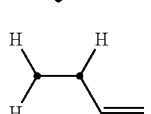

L8

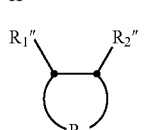

L9

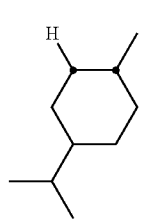

L10

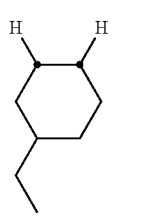

L11

-continued

L12 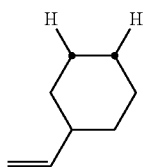

L13 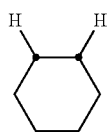

L18 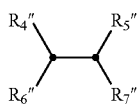

L19 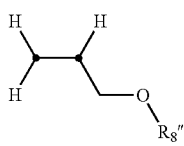

L20 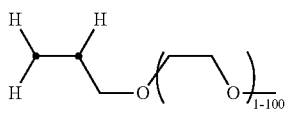

L23 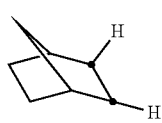

L24 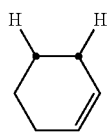

L25 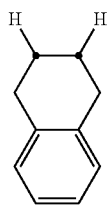

L26 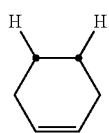

L27 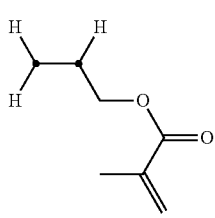

-continued

L28 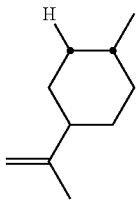

L29 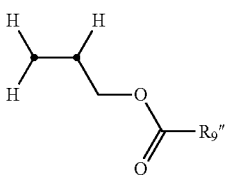

L30 

L31 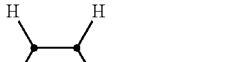

wherein $R_1''$, $R_2''$ is independently selected from the group consisting of H and $CH_3$, $R_3''$, is a $CH_2$ or $C_2$-$C_{34}$ optionally-substituted-hydrocarbylene, $R_4''$ $R_5''$ $R_6''$ $R_7''$ is independently selected from the group consisting of H, $CH_3$, and $C_2$-$C_{34}$ optionally-substituted-hydrocarbyl, $R_8''$, $R_9''$ is independently selected from $C_1$-$C_{34}$ optionally-substituted-hydrocarbyl, $R_{10}''$, $R_{11}''$ is independently selected from $C_1$-$C_{12}$ saturated-hydrocarbyl, and $R_{12}''$ is $C_4$-$C_{34}$ unsaturated-acyclic-hydrocarbyl, b) at least 10 and at most 99 pph of the binder of an acid-functional copolymerizable polymer A which is an acid-functional polyester B different from the polymer and wherein polymer A has a hydroxyl value lower than 14 and an acid value (AV) of at least 15 and at most 100 mg KOH/g, and c) a copolymerizable agent able to react with the polymer and the acid-functional copolymerizable polymer A, in an amount of at least 2 and at most 15 pph of the binder, wherein the copolymerizable agent is a compound which comprises at least two β-hydroxyalkylamide groups (BHA compound), and wherein a difference between the AV of the polymer and the AV of the copolymerizable polymer A (DeltaAV) is at least 30 mg KOH/g where each AV is measured titrimetrically according to ISO 2114, and wherein the AV of the copolymerizable polymer A is lower than the AV of the polymer, wherein the polymer has a MRQ of at least 1 and at most 3.8, wherein the MRQ is determined via NMR spectroscopy and is defined as:

$$MRQ = \frac{S_{total}}{S_{specific}} = \frac{S_{specific} + S_{rest}}{S_{specific}},$$

and wherein
$S_{total} = S_{specific} + S_{rest}$,
$S_{specific} =$ (total moles S1)+(total moles S2), and
$S_{rest} =$ the total moles of all the units of the polymer wherein said units are not any one of S1 or S2.

2. The heat-curable powder coating composition of claim 1, wherein the AV of the polymer is at most 170 mg KOH/g.

3. The heat-curable powder coating composition of claim 2, wherein the $T_g$ of the polymer is at least 40 and at most 95° C.

4. The heat-curable powder coating composition polymer according to claim 3, wherein the polymer is an acid-functional polyester.

5. The heat-curable powder coating composition of claim 2, wherein the $T_g$ of the polymer is at least 40 and at most 85° C.

6. The heat-curable powder coating composition polymer according to claim 5, wherein the polymer is an acid-functional polyester.

7. The heat-curable powder coating composition of claim 1, wherein the AV of the polymer is at least 110 and at most 170 mg KOH/g.

8. The heat-curable powder coating composition of claim 7, wherein the $T_g$ of the polymer is at least 40 and at most 95° C.

9. The heat-curable powder coating composition polymer according to claim 8, wherein the polymer is an acid-functional polyester.

10. The heat-curable powder coating composition of claim 7, wherein the $T_g$ of the polymer is at least 40 and at most 85° C.

11. The heat-curable powder coating composition of claim 10, wherein the polymer is an acid-functional polyester.

12. The heat-curable powder coating composition of claim 11, wherein the DeltaAV is at least 75 mg KOH/g.

13. The heat-curable powder coating composition of claim 11, wherein the DeltaAV is at least 100 mg KOH/g.

14. The heat-curable powder coating composition of claim 1, wherein the AV of the polymer is at least 130 and at most 170 mg KOH/g.

15. The heat-curable powder coating composition of claim 14, wherein the $T_g$ of the polymer is at least 40 and at most 95° C.

16. The heat-curable powder coating composition polymer according to claim 15, wherein the polymer is an acid-functional polyester.

17. The heat-curable powder coating composition of claim 14, wherein the $T_g$ of the polymer is at least 40 and at most 85° C.

18. The heat-curable powder coating composition polymer according to claim 17, wherein the polymer is an acid-functional polyester.

19. The heat-curable powder coating composition of claim 1, wherein the $T_g$ of the polymer is at least 40 and at most 95° C.

20. The heat-curable powder coating composition polymer according to claim 19, wherein the polymer is an acid-functional polyester.

21. The heat-curable powder coating composition of claim 1, wherein the $T_g$ of the polymer is at least 40 and at most 85° C.

22. The heat-curable powder coating composition polymer according to claim 21, wherein the polymer is an acid-functional polyester.

23. The heat-curable powder coating composition of claim 1, wherein the polymer is an acid-functional polyester.

24. The heat-curable powder coating composition of claim 23, wherein the DeltaAV is at least 75 mg KOH/g.

25. The heat-curable powder coating composition of claim 23, wherein the DeltaAV is at least 100 mg KOH/g.

26. The heat-curable powder coating composition according to claim 1, wherein the MRQ is at most 1.4.

27. The heat-curable powder coating composition according to claim 26, wherein the $T_g$ of the polymer is at least 40 and at most 85° C., and the AV of the polymer is at least 110 and at most 170 mg KOH/g.

28. The heat-curable powder coating composition according to claim 27, wherein the polymer is an acid-functional polyester.

29. The heat-curable powder coating composition of claim 28, wherein the DeltaAV is at least 75 mg KOH/g.

30. The heat-curable powder coating composition of claim 28, wherein the DeltaAV is at least 100 mg KOH/g.

31. The heat-curable powder coating composition according to claim 1, wherein the MRQ is at most 2.5.

32. The heat-curable powder coating composition according to claim 1, wherein the MRQ is at most 2.0.

33. The heat-curable powder coating composition polymer according to claim 1, wherein the polymer has:
   i) a number average molecular weight ($M_n$) of at most $10^4$ Da,
   ii) a polydispersity (D) ($D = M_w/M_n$) of at least 1 and at most 10, where $M_w$ is the weight average molecular weight measured via GPC,
   iii) a $T_g$ of at least 40 and at most 85° C.,
   iv) an AV of at least 110 and at most 170 mg KOH/g,
   v) a hydroxyl value (OHV) measured titrimetrically via ISO 4629 of at least 0 and at most 400 mg KOH/g, and
   vi) a functionality (f) of at least 3 and at most 25, wherein $$f = \frac{[M_n \times (AV + OHV)]}{56110}.$$

34. The heat-curable powder coating composition polymer according to claim 33, wherein the AV of the polymer is at least 130 and at most 170 mg KOH/g.

35. The heat-curable powder coating composition polymer according to claim 34, wherein the polymer is an acid-functional polyester.

36. The heat-curable powder coating composition of claim 35, wherein the DeltaAV is at least 75 mg KOH/g.

37. The heat-curable powder coating composition of claim 36, wherein the composition has a Weight Ratio R (WR) of at least 1 and at most 10, wherein $$\text{Weight Ratio } R = \frac{\text{Weight of acid − functional copolymerizable polymer } A}{\text{Weight of polymer}}$$

38. The heat-curable powder coating composition of claim 37, wherein the WR is at least 2 and at most 8.

39. The heat-curable powder coating composition according to claim 38, wherein the acid-functional copolymerizable polymer A has an AV of at most 40 mg KOH/g, and a $T_g$ measured via Differential Scanning calorimetry of at least 40 and at most 80° C.

40. A composition as defined in claim 39, wherein the composition is cured.

41. A coated article having a coating comprised of the composition according to claim 39, wherein the composition is cured.

42. A composition as defined in claim 38, wherein the composition is cured.

43. A coated article having a coating comprised of the composition according to claim 38, wherein the composition is cured.

44. The heat-curable powder coating composition according to claim 37, wherein the acid-functional copolymerizable polymer A has an AV of at most 40 mg KOH/g, and a $T_g$ measured via Differential Scanning calorimetry of at least 40 and at most 80° C.

45. The heat-curable powder coating composition of claim 35, wherein the DeltaAV is at least 100 mg KOH/g.

46. The heat-curable powder coating composition of claim 45, wherein the composition has a Weight Ratio R (WR) of at least 1 and at most 10, wherein $$\text{Weight Ratio } R = \frac{\text{Weight of acid - functional copolymerizable polymer } A}{\text{Weight of polymer}}$$

47. The heat-curable powder coating composition according to claim 46, wherein the acid-functional copolymerizable polymer A has an AV of at most 40 mg KOH/g, and a $T_g$ measured via Differential Scanning calorimetry of at least 40 and at most 80° C.

48. The heat-curable powder coating composition of claim 35, wherein the composition has a Weight Ratio R (WR) of at least 1 and at most 10, wherein $$\text{Weight Ratio } R = \frac{\text{Weight of acid - functional copolymerizable polymer } A}{\text{Weight of polymer}}$$

49. The heat-curable powder coating composition of claim 48, wherein the WR is at least 2 and at most 8.

50. The heat-curable powder coating composition according to claim 49, wherein the acid-functional copolymerizable polymer A has an AV of at most 40 mg KOH/g, and a $T_g$ measured via Differential Scanning calorimetry of at least 40 and at most 80° C.

51. The heat-curable powder coating composition according to claim 48, wherein the acid-functional copolymerizable polymer A has an AV of at most 40 mg KOH/g, and a $T_g$ measured via Differential Scanning calorimetry of at least 40 and at most 80° C.

52. The heat-curable powder coating composition of claim 34, wherein the DeltaAV is at least 75 mg KOH/g.

53. The heat-curable powder coating composition of claim 34, wherein the DeltaAV is at least 100 mg KOH/g.

54. The heat-curable powder coating composition of claim 34, wherein the composition has a Weight Ratio R (WR) of at least 1 and at most 10, wherein $$\text{Weight Ratio } R = \frac{\text{Weight of acid - functional copolymerizable polymer } A}{\text{Weight of polymer}}$$

55. The heat-curable powder coating composition according to claim 54, wherein the acid-functional copolymerizable polymer A has an AV of at most 40 mg KOH/g, and a $T_g$ measured via Differential Scanning calorimetry of at least 40 and at most 80° C.

56. The heat-curable powder coating composition polymer according to claim 33, wherein the polymer is an acid-functional polyester.

57. The heat-curable powder coating composition of claim 56, wherein the DeltaAV is at least 75 mg KOH/g.

58. The heat-curable powder coating composition of claim 57, wherein the composition has a Weight Ratio R (WR) of at least 1 and at most 10, wherein $$\text{Weight Ratio } R = \frac{\text{Weight of acid - functional copolymerizable polymer } A}{\text{Weight of polymer}}$$

59. The heat-curable powder coating composition of claim 58, wherein the WR is at least 2 and at most 8.

60. The heat-curable powder coating composition according to claim 59, wherein the acid-functional copolymerizable polymer A has an AV of at most 40 mg KOH/g, and a $T_g$ measured via Differential Scanning calorimetry of at least 40 and at most 80° C.

61. The heat-curable powder coating composition according to claim 58, wherein the acid-functional copolymerizable polymer A has an AV of at most 40 mg KOH/g, and a $T_g$ measured via Differential Scanning calorimetry of at least 40 and at most 80° C.

62. The heat-curable powder coating composition of claim 56, wherein the DeltaAV is at least 100 mg KOH/g.

63. The heat-curable powder coating composition of claim 62, wherein the composition has a Weight Ratio R (WR) of at least 1 and at most 10, wherein $$\text{Weight Ratio } R = \frac{\text{Weight of acid - functional copolymerizable polymer } A}{\text{Weight of polymer}}$$

64. The heat-curable powder coating composition according to claim 63, wherein the acid-functional copolymerizable polymer A has an AV of at most 40 mg KOH/g, and a $T_g$ measured via Differential Scanning calorimetry of at least 40 and at most 80° C.

65. The heat-curable powder coating composition of claim 56, wherein the composition has a Weight Ratio R (WR) of at least 1 and at most 10, wherein $$\text{Weight Ratio } R = \frac{\text{Weight of acid - functional copolymerizable polymer } A}{\text{Weight of polymer}}$$

66. The heat-curable powder coating composition of claim 65, wherein the WR is at least 2 and at most 8.

67. The heat-curable powder coating composition according to claim 66, wherein the acid-functional copolymerizable polymer A has an AV of at most 40 mg KOH/g, and a $T_g$ measured via Differential Scanning calorimetry of at least 40 and at most 80° C.

68. The heat-curable powder coating composition according to claim 65, wherein the acid-functional copolymerizable polymer A has an AV of at most 40 mg KOH/g, and a $T_g$ measured via Differential Scanning calorimetry of at least 40 and at most 80° C.

69. The heat-curable powder coating composition of claim 33, wherein the DeltaAV is at least 75 mg KOH/g.

70. The heat-curable powder coating composition of claim 33, wherein the DeltaAV is at least 100 mg KOH/g.

71. The heat-curable powder coating composition of claim 33, wherein the composition has a Weight Ratio R (WR) of at least 1 and at most 10, wherein $$\text{Weight Ratio } R = \frac{\text{Weight of acid – functional copolymerizable polymer } A}{\text{Weight of polymer}}$$

72. The heat-curable powder coating composition according to claim 71, wherein the acid-functional copolymerizable polymer A has an AV of at most 40 mg KOH/g, and a $T_g$ measured via Differential Scanning calorimetry of at least 40 and at most 80° C.

73. The heat-curable powder coating composition of claim 1, wherein the DeltaAV is at least 75 mg KOH/g.

74. The heat-curable powder coating composition of claim 1, wherein the DeltaAV is at least 100 mg KOH/g.

75. The heat-curable powder coating composition according to claim 1, wherein the composition has a Weight Ratio R (WR) of at least 1 and at most 10, wherein $$\text{Weight Ratio } R = \frac{\text{Weight of acid – functional copolymerizable polymer } A}{\text{Weight of polymer}}$$

76. The heat-curable powder coating composition of claim 75, wherein the WR is at least 2 and at most 8.

77. The heat-curable powder coating composition according to claim 76, wherein the acid-functional copolymerizable polymer A has an AV of at most 40 mg KOH/g, and a $T_g$ measured via Differential Scanning calorimetry of at least 40 and at most 80° C.

78. The heat-curable powder coating composition according to claim 1, wherein the acid-functional copolymerizable polymer A has an AV of at most 40 mg KOH/g, and a $T_g$ measured via Differential Scanning calorimetry of at least 40 and at most 80° C.

79. A composition as defined in claim 1, wherein the composition is cured.

80. A coated article having a coating comprised of the composition as defined in claim 1.

81. A product which comprises the composition according to claim 1, wherein the product is selected from the group consisting of paints, polishes, inks, adhesives, pastes, 3D-printing materials, automotive products, marine products, aerospace products, medical products, defense products, sports/recreational products, architectural products, bottling products, household products, machinery products, can products, coil products, energy products, textiles and electrical products.

82. The heat-curable powder coating composition according to claim 1, wherein the MRQ is at most 1.7.

* * * * *